United States Patent
Mori et al.

(10) Patent No.: US 7,046,444 B2
(45) Date of Patent: May 16, 2006

(54) WAVE PLATE AND OPTICAL DEVICE USING THE SAME

(75) Inventors: Kazushi Mori, Hirakata (JP); Shingo Kameyama, Ibaraki (JP); Hitoshi Hirano, Nishinomiya (JP); Koutarou Furusawa, Higashiosaka (JP); Koji Tominaga, Hirakata (JP); Masayuki Shono, Hirakata (JP)

(73) Assignee: Sanyo Electric Oc., Ltd., Osaka (JP)

( * ) Notice: Subject to any disclaimer, the term of this patent is extended or adjusted under 35 U.S.C. 154(b) by 0 days.

(21) Appl. No.: 10/927,232

(22) Filed: Aug. 27, 2004

(65) Prior Publication Data

US 2005/0046946 A1 Mar. 3, 2005

(30) Foreign Application Priority Data

Aug. 28, 2003 (JP) .............................. 2003-303790
Mar. 23, 2004 (JP) .............................. 2004-084829

(51) Int. Cl.
*G02B 5/18* (2006.01)
(52) U.S. Cl. .................... 359/569; 359/558; 359/574; 359/350; 359/360; 359/485
(58) Field of Classification Search ................ 359/569, 359/566, 558, 574, 350, 352, 360, 485, 486
See application file for complete search history.

(56) References Cited

U.S. PATENT DOCUMENTS 4,514,479 A * 4/1985 Ferrante ...................... 430/2

2003/0089899 A1 * 5/2003 Lieber et al. ................. 257/9
2004/0095637 A1 * 5/2004 Nikolov et al. ............. 359/352
2004/0120041 A1 * 6/2004 Silverstein et al. ......... 359/486

OTHER PUBLICATIONS

Hambach, D., "Efficient High-Order Diffraction of Extreme-Ultraviolet Light and Soft X-Rays by Nanostructured Volume Gratings", Optic Letters, vol. 26, No. 15, Aug. 1, 2001, pp. 1200-1202.
Masuda, H. et al., "Highly Ordered Nanochannel-Array Architecture in Anodic Alumina", Appl. Phys. Letters, vol. 71 (19), Nov. 10, 1997, pp. 2770-2772.

* cited by examiner

*Primary Examiner*—Fayez G. Assaf
(74) *Attorney, Agent, or Firm*—McDermott Will & Emery LLP

(57) ABSTRACT

The present invention provides a wave plate capable of obtaining preferable phase conversion characteristic over a wide wavelength range. The wave plate includes an aluminum oxide film having linear grating groove patterns. The period L (μm) and the duty ratio De of the grating groove patterns are set at values within the first range specified by the following four formulas:

$L \leq 0.65$ $L \geq 2 \times 10^{-14} e^{31.263 De}$ $L \leq 6.0317 De^2 - 10.352 De + 5.0516$ $(De-0.85)^2/0.44^2 + (L-0.41)^2/0.39^2 \leq 1$

20 Claims, 55 Drawing Sheets

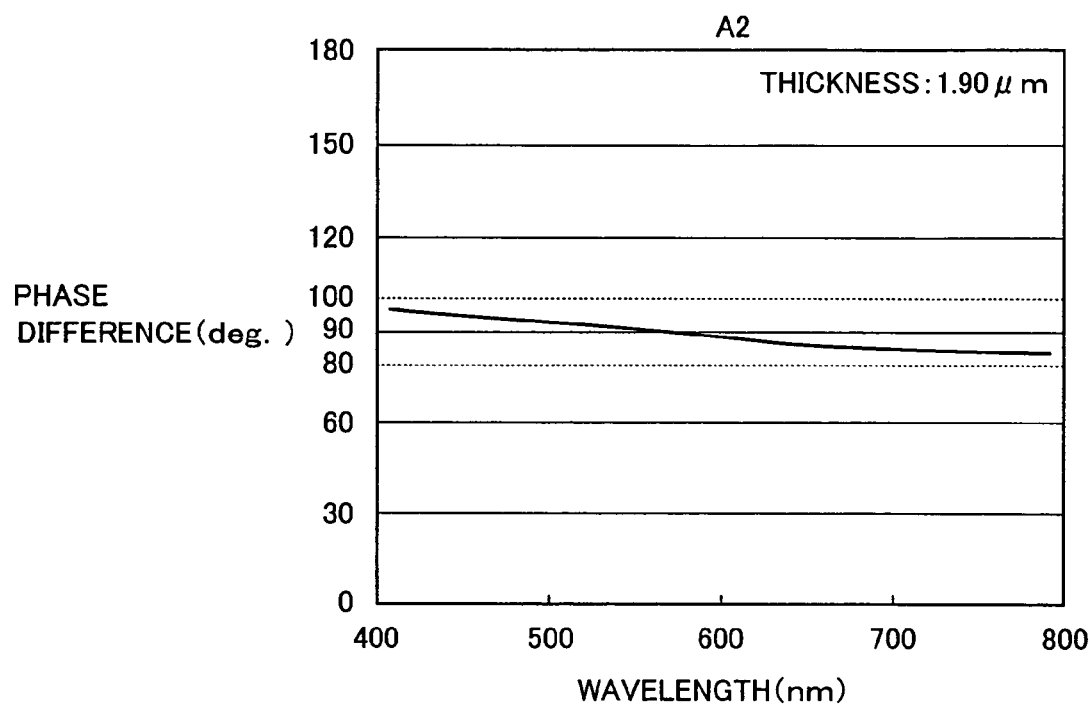
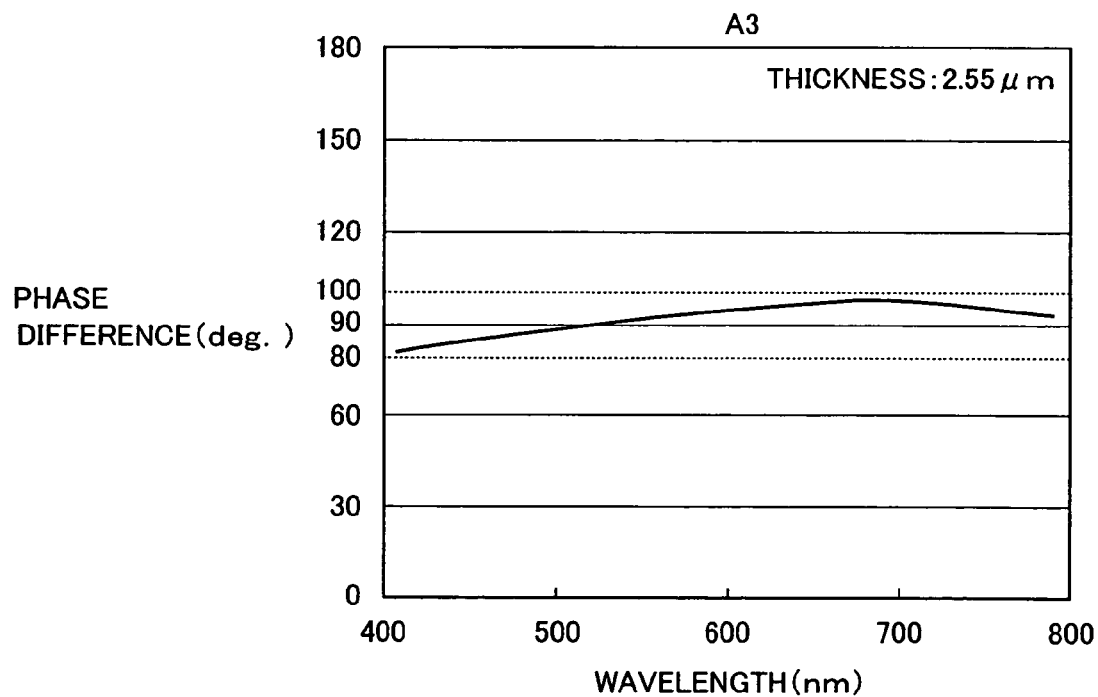

WAVE PLATE AND OPTICAL DEVICE USING THE SAME

BACKGROUND OF THE INVENTION

1. Field of the Invention

The present invention relates to a wave plate and an optical device using the same, and more particularly to a wave plate having linear grating groove patterns and an optical device using the same.

2. Description of the Background Art

In general, wave plate having linear grating groove pattern is known. A method employing photolithography and etching is known as a method of manufacturing the above conventional wave plate having linear grating groove patterns. This is disclosed in D. Hambach, G. Schneider and E. M. Gullikson "OPTICS LETTERS" Vol. 26, No. 15, Aug. 1, 2001, and pp. 1200–1202.

FIG. 93 is a perspective view showing the concept of a conventional wave plate having linear grating groove patterns. In the conventional wave plate 200, linear grating groove patterns are formed on a glass substrate 201, as shown in FIG. 93. The grating groove patterns are formed by air layers 202 and substrate material layers 203, having a width a, consisting of the same material as the glass substrate 201, and have a period P not more than the wavelength of light. It is assumed that the refractive indices of the air layers 202 and the substrate material layers 203 (the glass substrate 201) are 1 and n respectively. When light is incident upon the grating groove patterns of the wave plate 200, the wave plate 200 exhibits an effective refractive index corresponding to the mixture of the refractive indices 1 and n of the air layers 202 and the substrate material layers 203.

FIG. 94 is a correlation diagram showing the relation between the effective refractive index and the duty ratio of the conventional wave plate shown in FIG. 93. Referring to FIG. 94, the vertical axis shows the effective refractive index, and the horizontal axis shows the duty ratio (a/P), i.e., the ratio of the width a of the substrate material layers 203 to the period P of the grating groove patterns shown in FIG. 93. Further, symbol TE in FIG. 94 denotes light having a direction of polarization parallel to the extensional direction of the grating groove patterns, as shown in FIG. 93. Symbol TM denotes light having a direction of polarization perpendicular to the extensional direction of the grating groove patterns, as shown in FIG. 93.

Referring to FIG. 94, the effective refractive index varies with the duty ratio of the grating groove patterns. In this case, the effective refractive index of the light TE having the direction of polarization parallel to the extensional direction of the grating groove patterns differs from that of the light TM having the direction of polarization perpendicular to the extensional direction of the grating groove patterns. That is, when the duty ratio is D1, the effective refractive indices of TM and TE correspond to N1 and N2, respectively, as shown in FIG. 94. The characteristic of the effective refractive index varying with the direction of polarization of light is referred to as a birefringence property.

As a manufacturing process for the rectilinear grating groove patterns of the conventional wave plate 200 shown in FIG. 93, a method of forming rectilinear grating groove patterns by etching the surface of a glass substrate by photolithography and etching is conceivable, for example.

In the case of forming the rectilinear grating groove patterns of the conventional wave plate 200 shown in FIG. 93 by photolithography and etching, however, it is difficult to form grating groove patterns having a large depth with a uniform groove width along the depth direction. More specifically, grating groove patterns deeply formed by photolithography and etching have trapezoidal sections non-uniform in the depth direction as shown in FIG. 95, and hence duty ratios in upper and lower portions of the grating groove patterns disadvantageously differ from each other.

On the other hand, a process of manufacturing a triangular lattice pattern in the form of a regular triangle employing anodic oxidation is conventionally known. This manufacturing process is disclosed in H. Masuda et al. "Appl. Phys. Lett." Vol. 71 (19), 10 Nov. 1997, and pp.2770–2772, for example. The process of manufacturing a triangular lattice pattern disclosed in this literature, capable of forming a triangular lattice pattern having deep and uniform micropores, is proposed as a process of preparing a two-dimensional photonic crystal. More specifically, a valve metal such as aluminum, titanium or tantalum or a semiconductor such as Si or GaAs has such a characteristic that an oxide film having micropores arranged perpendicular to the film surface is formed when an anode is electrified in an acidic electrolyte. In particular, an oxide film of aluminum has such a material characteristic that micropores are easily arranged in the form of a triangular lattice. A triangular lattice pattern having deep and uniform micropores can be formed through this characteristic.

FIGS. 96 to 99 are sectional views for illustrating a conventional process of manufacturing a triangular lattice pattern by anodic oxidation. FIG. 100 is a plan view showing a two-dimensional photonic crystal formed by conventional anodic oxidation. The conventional process of manufacturing a triangular lattice pattern by anodic oxidation is now described with reference to FIGS. 96 to 100.

In the conventional process of manufacturing a triangular lattice pattern by anodic oxidation, projecting portions 211a arranged in the form of a triangular lattice are formed on the surface of a press member 221 consisting of a hard material such as SiC, as shown in FIG. 96. Texturing is performed by pressing the press member 211 against the surface of an aluminum material 211. Thus, concave portions 211a arranged in the form of a triangular lattice are formed on the surface of the aluminum material 211, as shown in FIG. 97. Then, the aluminum material 211 formed with the concave portions 211a is oxidized in an electrolyte 222, as shown in FIG. 98. In this case, a cathode 223 is prepared from platinum or the like, and the electrolyte 222 is prepared from an aqueous solution of sulfuric acid, oxalic acid, phosphoric acid and so on. Thus, an aluminum oxide (alumina) film 212 having deep and uniform micropores 212a, starting from the concave portions 211a (see FIG. 97), arranged in the form of a triangular lattice is formed in a self-organized manner, as shown in FIGS. 99 and 100. The micropores 113a can be formed to have a depth of at least several hundreds μm with respect to submicron diameters.

However, the aforementioned conventional method of manufacturing a triangular lattice pattern by anodic oxidation has been known as a method of forming two-dimensional photonic crystal micropores. In general, therefore, there has been no attempt of forming grating groove patterns of the wave plate 200 shown in FIG. 93 by anodic oxidation.

As hereinabove described, it has been difficult to form a grating groove pattern having a large depth with a uniform groove width along the depth direction in general, and hence there is a problem that improvement of characteristics of wave plate with grating groove patterns is difficult.

In addition, a wave plate consisting of a birefringent material is also conventionally known. As birefringent materials composing this wave plate, quartz crystal with a birefringent crystal, a birefringent resin, and so on are known. When light enters this quartz crystal or birefringent resin, phases of polarization components parallel to, and perpendicular to the optical axis of quartz crystal can be shifted. Thus, the quartz crystal or birefringent resin can be used as a ¼ or ½ wave plate by setting the shift of phases (phase difference) at a predetermined value.

FIGS. 101 and 102 are perspective diagrams showing the concept of ¼ and ½ wave plates consisting of quartz crystal, respectively. First, referring FIG. 101, with the ¼ wave plate 230 consisting of quartz crystal 231, the thickness of crystal 231 is set whereby the ¼ wave plate 230 has a phase difference of 90° between the polarization components parallel to, and perpendicular to the optical axis of quartz crystal. When linearly polarized light enters this ¼ wave plate 230 consisting of quartz crystal 231 at an inclined angle of about 45° relative to its optical axis, the phase difference between the polarization components perpendicular to each other corresponds about 90°. Thus, the incident linearly polarized light is converted into circularly polarized light as leaving light. Furthermore, referring FIG. 102, with the ½ wave plate 240 consisting of quartz crystal 241, the thickness of crystal 241 is set whereby the ½ wave plate 240 has a phase difference of 180° between the polarization components parallel to, and perpendicular to the optical axis of quartz crystal. Specifically, the quartz crystal 241 has twice the thickness of the quartz crystal 231 composing the ¼ wave plate 230 shown in FIG. 101. When linearly polarized light enters this ½ wave plate 240 consisting of quartz crystal 241 at an inclined angle of about 45° relative to its optical axis, the phase difference between the polarization components perpendicular to each other corresponds about 180°. Thus, the direction of polarization of the incident linearly polarized light is rotated about 90°.

However, when quartz crystal is used as a wave plate as shown in FIGS. 101 and 102, the following disadvantage arises. Namely, a refractive index usually has characteristics that the value varies depending on wavelengths of light (wavelength dispersion characteristics). For this reason, with the ¼ wave plate consisting of quartz crystal designed for light of wavelength about 633 nm, as shown in FIG. 103, if the wavelength of incident light is shifted from the designed wavelength (about 633 nm), there is a disadvantage that the phase difference between the polarization components perpendicular to each other considerably shifts from the phase difference near to 90°. Accordingly, there is a problem that it is difficult to obtain preferable phase conversion characteristics of a wave plate consisting of quartz crystal with respect to light with a wavelength other than designed wavelength.

Furthermore, when a wave plate consisting of quartz crystal is used for an optical device, there is also a problem that it is difficult to improve the characteristics of the optical device. Specifically, with a CD-R/DVD compatible optical pickup device which can be used for both record on CD-R (Compact Disk Recordable), and the reproduction from DVD (Digital Versatile Disk) as a conventional optical device, while a semiconductor laser with wavelength near to 790 nm is used as a semiconductor laser for CD-R, a semiconductor laser with wavelength near to 650 nm is used as a semiconductor laser for DVD. For this reason, when a ¼ wave plate consisting of quartz crystal with the characteristics as shown in FIG. 103 is commonly used for both semiconductor lasers for CD-R and DVD, the following disadvantage arises. With the common ¼ wave plate, conversion is preferable to the semiconductor laser for DVD with a wavelength near to 650 nm, on the other hand, it is difficult to obtain preferable conversion to the semiconductor laser for CD-R with a wavelength near to about 790 nm. Accordingly, if preferable conversion of the laser light is not obtained by the ¼ wave plate, laser light with the polarization direction other than the designed value is produced. In this case, when the laser light is reflected by a polarization beam splitter, a disadvantage that laser light returns to the semiconductor laser element for CD-R arises. As a result, since optical intensity noise (fluctuation of optical intensity) of the semiconductor laser element increases, a problem that it difficult to improve the characteristics of the CD-R/DVD compatible optical pickup device arises.

Moreover, with a liquid crystal projector device as a conventional optical device, a ½ wave plate is used in order to convert the polarization directions of the white light of a wide wavelength range including red, green and blue components and radiated from a light source into a single polarization direction. In this case, when the ½ wave plate, which consists of quartz crystal with the characteristics similar to the characteristics shown in FIG. 103, is used, the phase difference considerably shifts from the phase difference near to 180° depending on a wavelength, thus, there is a disadvantage that it is difficult to perform preferable conversion for the white light of a wide wavelength range. With the conventional liquid crystal projector device, if conversion of the light is not preferably performed by the ½ wave plate, light with the polarization direction that cannot enters a liquid crystal panel increases, thus, a disadvantage that the efficiency of light utilization reduces arises. As a result, since deviation of color and reduction of luminosity occur caused by reduction of the efficiency of light utilization, there is a problem that it difficult to improve the characteristics of the liquid crystal projector device.

Besides, with the aforementioned conventional CD-R/DVD compatible optical pickup device, a ¼ wave plate, which composed of two transparent substrates, two transparent substrates and a birefringent resin sheet sandwiched between them, is mostly used. In order to obtain the preferable phase conversion characteristic of the ¼ wave plate over a wide wavelength range, the ¼ wave plate with this birefringent resin sheet has two birefringent resin sheets where one sheet is overlaid on another so that they slightly shift in the birefringence direction. However, since a birefringent resin sheet has poor environmental resistance characteristics compared with quartz crystal, it is difficult to use it for a ¼ wave plate of a CD-R/DVD compatible optical pickup device for vehicles. With a liquid crystal projector device, the inside of which becomes high temperature caused by a light source, it is difficult to use a ½ wave plate having a birefringent resin sheet with poor environmental resistance characteristics.

SUMMARY OF THE INVENTION

The present invention is aimed at solving the above problems, and it is one object of the present invention to provide a wave plate capable of obtaining preferable phase conversion characteristic over a wide wavelength range.

It is another object of the present invention to provide an optical device having a wave plate capable of obtaining preferable phase conversion characteristic over a wide wavelength range.

To achieve the above object, a wave plate according to a first aspect of the invention comprises a substrate, and an aluminum oxide film formed on the substrate, the aluminum oxide film having linear grating groove patterns, wherein the period L (μm) of the linear grating groove patterns, and the duty ratio De defined as a ratio of the substantial width of the aluminum oxide film between the grating groove patterns adjacent to each other to the period L (μm) is set at values within the first range specified by the following four formulas:

$$L \leq 0.65$$

$$L \geq 2 \times 10^{-14} e^{31.263 De}$$

$$L \leq 6.0317 De^2 - 10.352 De + 5.0516$$

$$(De - 0.85)^2 / 0.44^2 + (L - 0.41)^2 / 0.39^2 \leq 1$$

With the wave plate according to the first aspect of the invention, the period L (μm) of the linear grating groove and the duty ratio De of the aluminum oxide film composing the wave plate are set at values within the first range specified by the above four formulas. Thus, when the wave plate is used as a ¼ wave plate, as for light corresponding to a plurality of different wavelength regions, the phase difference between two polarization components perpendicular to each other can be near to 90°. In addition, when the wave plate is used as a ½ wave plate, as for light corresponding to a plurality of different wavelength regions, the phase difference between two polarization components perpendicular to each other can be near to 180°. As a result, it is possible to obtain preferable phase conversion characteristic over a wide wavelength range. Furthermore, since the aluminum oxide film is an inorganic material, a wave plate with excellent environmental resistance characteristics can be obtained. Therefore, even when the wave plate having the aluminum oxide film with linear grating groove patterns is used under high temperature condition, deterioration of characteristics of the wave plate can be kept in check.

In this case, the period L (μm) and the duty ratio De within the first range are applied to light of at least the red and infrared wavelength regions. With this construction, it is possible to obtain preferable phase conversion characteristics at least in the red wavelength region and the infrared wavelength region.

In the wave plate according to the first aspect, preferably, the period L (μm) and the duty ratio De of the linear grating groove patterns are further set at values within the second range specified by the following four formulas:

$$De \geq 0.73$$

$$L \leq 0.4$$

$$L \geq 30.952 De^3 - 74.751 De^2 + 59.62 De - 15.328$$

$$L \leq 3.0776 De^2 - 5.1863 De + 2.5772$$

With this construction, it is possible to obtain preferable phase conversion characteristic over a wider wavelength range.

In this case, the period L (μm) and the duty ratio De within the second range are applied to light of all the red, infrared and blue wavelength regions. With this construction, it is possible to obtain preferable phase conversion characteristics in all of the red wavelength region, the infrared wavelength region and the blue wavelength region.

In the wave plate according to the first aspect, preferably, the aluminum oxide film has a plurality of pores, and the plurality of pores are classified into a first pore with a diameter larger than a reference value and a second pore with a diameter not larger than the reference value when the reference value is defined as the value obtained by multiplying the largest diameter in the plurality of pores by 0.5, and the period L (μm) of the grating groove patterns is the period of the grating groove patterns composed of a plurality of the first pores. In the case that the first and second pores are classified based on the reference value as mentioned above, the second pores have small effect on phase conversion characteristic. With the aluminum oxide film having the first and second pores, adjusting the period L (μm) of the grating groove patterns composed of the plurality of first pores can easily provide a wave plate with preferable phase conversion characteristic.

In this case, preferably, the grating groove patterns composed of the plurality of first pores are composed of pore groups including a plurality of pore columns with the plurality of first pores and being spaced at a predetermined interval from each other, and the period L (μm) of the grating groove patterns is a mean value of the distance between lines tangent to the outermost ends on one side of the pore groups adjacent to each other. With this construction, in the grating groove patterns where the plurality of pore groups include the plurality of pore columns with the plurality of first pores and are spaced at a predetermined interval from each other, adjusting the mean value of the distance between lines tangent to the outermost ends on one side of the pore groups adjacent to each other (the period L (μm) of the grating groove patterns) can easily provide a wave plate with preferable phase conversion characteristic.

A wave plate according to a second aspect of the invention comprises a substrate, and an aluminum oxide film formed on the substrate, the aluminum oxide film having linear grating groove patterns with a plurality of connected pores or linear grating pore patterns with a plurality of pores spaced at a predetermined interval from each other, wherein the plurality of pores composing the grating groove patterns or the grating pore patterns included in the aluminum oxide film are arranged in columns and consists of pore columns so that the pores adjacent to each other are spaced at a center-to-center distance of a pore interval T (μm) in a first direction from each other, and a plurality of the pore columns are arranged with a period L (μm) that is larger than the pore interval T (μm) in a second direction perpendicular to the first direction, and the period L (μm) and the pore interval T (μm) are set at values within the first range specified by the following two formulas:

$$L \leq 0.65$$

$$L \geq -1.2018 T^3 + 0.3022 T^2 + 1.2988 T + 0.01$$

With the wave plate according to the second aspect of the invention, the period L (μm) of the linear grating groove or the grating pore patterns and the pore interval T (μm) of the aluminum oxide film composing the wave plate are set at values within the first range specified by the above two formulas. Thus, when the wave plate is used as a ¼ wave plate, as for light corresponding to a plurality of different wavelength regions, the phase difference between two polarization components perpendicular to each other can be near to 90°. In addition, when the wave plate is used as a ½ wave plate, as for light corresponding to a plurality of different wavelength regions, the phase difference between two polarization components perpendicular to each other can be near to 180°. As a result, it is possible to obtain preferable phase conversion characteristic over a wide wavelength range. Furthermore, since aluminum oxide film is an inorganic material, a wave plate with excellent environmental resistance characteristics can be obtained. Therefore, even when the wave plate having the aluminum oxide film with grating groove patterns or grating pore patterns is used under high temperature condition, deterioration of characteristics of the wave plate can be kept in check.

In this case, the period L (μm) and the pore interval T (μm) within the first range are applied to light of at least the red and infrared wavelength regions. With this construction, it is possible to obtain preferable phase conversion characteristics at least in the red wavelength region and the infrared wavelength region.

In the wave plate according to the second aspect, preferably, the period L (μm) and the pore interval T (μm) are further set at values within the second range specified by the following three formulas:

$$L \leq 0.4$$

$$L \geq -440.16T^3 + 63.334T^2 - 3.4273T + 0.3439$$

$$L \geq 0.35(T-0.0825)^{0.434} + 0.245$$

With this construction, it is possible to obtain preferable phase conversion characteristic over a wider wavelength range.

In this case, the period L (μm) and the pore interval T (μm) within the second range are applied to light of all the red, infrared and blue wavelength regions. With this construction, it is possible to obtain preferable phase conversion characteristics in all of the red wavelength region, the infrared wavelength region and the blue wavelength region.

In the wave plate according to the second aspect, preferably, the plurality of pores are classified into a first pore with a diameter larger than a reference value and a second pore with a diameter not larger than the reference value when the reference value is defined as the value obtained by multiplying the largest diameter in the plurality of pores by 0.5, and the period L (μm) of the grating groove patterns or the grating pore patterns is the period of the grating groove patterns composed of the plurality of the first pores or the grating pore patterns composed of the plurality of first pores. In the case that the first and second pores are classified based on the reference value as mentioned above, the second pores have small effect on phase conversion characteristic. With the aluminum oxide film having the first and second pores, adjusting the period L (μm) of the grating groove patterns or grating pore pattern composed of the plurality of first pores can easily provide a wave plate with preferable phase conversion characteristic.

In this case, preferably, the grating groove patterns composed of the plurality of first pores or the grating pore patterns composed of the plurality of first pores are composed of pore groups including a plurality of pore columns with the plurality of first pores and being spaced at a predetermined interval from each other, and the period L (μm) of the grating groove patterns or the grating pore pattern is a mean value of the distance between lines tangent to the outermost ends on one side of the pore groups adjacent to each other. With this construction, in the grating groove patterns or grating pore patterns where the pore groups include the plurality of pore columns with the plurality of first pores and are spaced at a predetermined interval from each other, adjusting the mean value of the distance between lines tangent to the outermost ends on one side of the pore groups adjacent to each other (the period L (μm) of the grating groove patterns or grating pore patterns) can easily provide a wave plate with preferable phase conversion characteristic.

An optical device according to a third aspect of the invention comprises a light source having a plurality of wavelength regions, and a wave plate for producing a predetermined phase difference between two polarization components perpendicular to each other of light from the light source, the wave plate including a substrate and a metal oxide film that is formed on the substrate and has a linear grating groove patterns with birefringence property or a grating pore patterns with birefringence property.

With the optical device according to the third aspect, the metal oxide film that has the linear grating groove patterns with birefringence property or the grating pore patterns with birefringence property is formed on the substrate. Thus, forming this metal oxide film by anodic oxidation can form grating groove patterns or grating pore patterns having a large depth with a uniform groove width and diameter along the depth direction respectively in a self-organized manner. Accordingly, it is possible to obtain a wave plate with preferable grating groove patterns or grating pore patterns. As a result, since the characteristics of the wave plate can be improved, the characteristics of the optical device having the wave plate can be also improved. Furthermore, since the metal oxide film is an inorganic material, a wave plate with excellent environmental resistance characteristics can be obtained. Therefore, even when the wave plate having the metal oxide film with linear grating groove patterns or grating pore patterns is used for an optical device operating under high temperature condition, deterioration of characteristics of the wave plate can be kept in check.

In the optical device according to the third aspect of the invention, the metal oxide film includes an aluminum oxide film having the linear grating groove patterns, and the period L (μm) of the linear grating groove patterns, and the duty ratio De defined as a ratio of the substantial width of the aluminum oxide film between the grating groove patterns adjacent to each other to the period L (μm) are set at values within the first range specified by the following four formulas:

$$L \leq 0.65$$

$$L \geq 2 \times 10^{-14} e^{31.263De}$$

$$L \leq 6.0317De^2 - 10.352De + 5.0516$$

$$(De-0.85)^2/0.44^2 + (L-0.41)^2/0.39^2 \leq 1$$

With this construction, when the wave plate is used as a ¼ wave plate, as for light corresponding to a plurality of different wavelength regions, the phase difference between two polarization components perpendicular to each other can be near to 90°. In addition, when the wave plate is used as a ½ wave plate, as for light corresponding to a plurality of different wavelength regions, the phase difference between two polarization components perpendicular to each other can be near to 180°. As a result, it is possible to provide an optical device having a wave plate with preferable phase conversion characteristic over a wide wavelength range.

In this case, the wave plate having the period L (μm) and the duty ratio De within the first range is used for light of at least the red and infrared wavelength regions. With this construction, it is possible to obtain preferable phase conversion characteristics at least in the red wavelength region and the infrared wavelength region.

In the optical device according to the third aspect, preferably, the period L (μm) and the duty ratio De of the linear grating groove patterns are further set at values within the second range specified by the following four formulas:

$$De \geq 0.73$$

$$L \leq 0.4$$

$$L \geq 30.952De^3 - 74.751De^2 + 59.62De - 15.328$$

$$L \leq 3.0776De^2 - 5.1863De + 2.5772$$

With this construction, it is possible to provide an optical device having a wave plate with preferable phase conversion characteristic over a wider wavelength range.

In this case, the wave plate having the period L (μm) and the duty ratio De within the second range is used for light of all the red, infrared and blue wavelength regions. With this construction, it is possible to obtain preferable phase conversion characteristics in all of the red wavelength region, the infrared wavelength region and the blue wavelength region.

In the optical device according to the third aspect, preferably, the metal oxide film includes an aluminum oxide film having the linear grating groove patterns with a plurality of connected pores or the linear grating pore patterns with a plurality of pores spaced at a predetermined interval from each other, and the plurality of pores composing the grating groove patterns or the grating pore patterns included in the aluminum oxide film are arranged in columns and consists of pore columns so that the pore is spaced at a center-to-center distance of a pore interval T (μm) in a first direction from an adjacent pore, and a plurality of the pore columns are arranged with a period L (μm) that is larger than the pore interval T (μm) in a second direction perpendicular to the first direction, and the period L (μm) and the pore interval T (μm) are set at values within the first range specified by the following two formulas:

$$L \leq 0.65$$

$$L \geq -1.2018T^3 + 0.3022T^2 + 1.2988T + 0.01$$

With this construction, when the wave plate is used as a ¼ wave plate, as for light corresponding to a plurality of different wavelength regions, the phase difference between two polarization components perpendicular to each other can be near to 90°. In addition, when the wave plate is used as a ½ wave plate, as for light corresponding to a plurality of different wavelength regions, the phase difference between two polarization components perpendicular to each other can be near to 180°. As a result, it is possible to provide an optical device having a wave plate with preferable phase conversion characteristic over a wide wavelength range.

In this case, the wave plate having the period L (μm) and the pore interval T (μm) within the first range is used for light of at least the red and infrared wavelength regions. With this construction, it is possible to obtain preferable phase conversion characteristics at least in the red wavelength region and the infrared wavelength region.

In the optical device according to the third aspect, preferably, the period L (μm) and the pore interval T (μm) are further set at values within the second range specified by the following three formulas:

$$L \leq 0.4$$

$$L \geq -440.16T^3 + 63.334T^2 - 3.4273T + 0.3439$$

$$L \geq 0.35(T - 0.0825)^{0.434} + 0.245$$

With this construction, it is possible to provide an optical device having a wave plate with preferable phase conversion characteristic over a wider wavelength range.

In this case, the wave plate having the period L (μm) and the pore interval T (μm) within the second range is used for light of all the red, infrared and blue wavelength regions. With this construction, it is possible to obtain preferable phase conversion characteristics in all of the red wavelength region, the infrared wavelength region and the blue wavelength region.

BRIEF DESCRIPTION OF THE DRAWINGS

FIGS. 4 to 17 show simulation results of relationship between a wavelength and a phase difference of the coordinate points A1 to A17 to define the range shown in FIG. 2;

DESCRIPTION OF THE PREFERRED EMBODIMENTS

Embodiments of the present invention are now described with reference to the drawings.

First Embodiment

Figure 1:
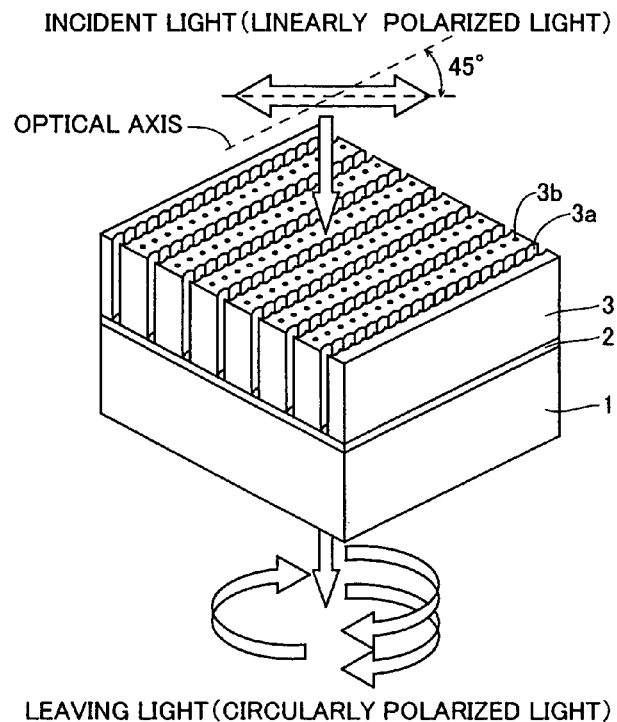
FIG. 1 is a perspective view showing construction of a ¼ wave plate according to a first embodiment of the present invention.

Referring to FIG. 1, a ¼ wave plate according to a first embodiment designed to have a phase difference of about 90° between the polarization components parallel to, and perpendicular to an optical axis (the direction of grating groove), and thus serves to convert incident linearly polarized light inclined about 45° relative to the optical axis (the direction of grating groove) into circularly polarized light as leaving light. The ¼ wave plate is an example of a "wave plate" in the present invention.

As for concrete construction of the ¼ wave plate according to this first embodiment, a transparent conductor film 2 consisting of ITO or ZnO is formed on a glass substrate 1 as shown in FIG. 1. The glass substrate 1 is an example of a "substrate" in the present invention.

In the first embodiment, an aluminum oxide film 3 with linear grating groove patterns is formed on the transparent conductor film 2. The linear grating groove patterns of the aluminum oxide film 3 are formed by linearly connecting micropores. A groove 3a of the linear grating groove patterns of the aluminum oxide film 3 has a depth that reaches the transparent conductor film 2, and is formed in a uniform groove width along the depth direction. In some cases, a plurality of pores 3b are formed on surface portions of the aluminum oxide film 3 located between the grooves 3a. The aluminum oxide film 3 is an example of a "metal oxide film" in the present invention.

Figure 2:
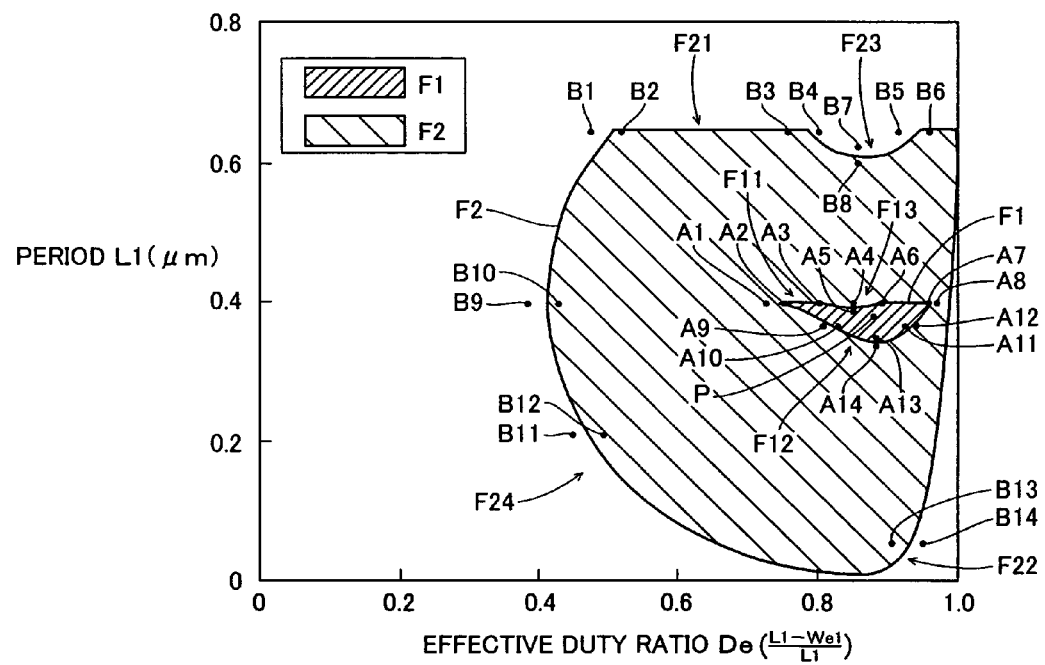
FIG. 2 is a graph showing the range of the effective duty ratio and the period of the ¼ wave plate having preferable phase conversion characteristic for light corresponding to a plurality of different wavelength regions.

The following description describes a method of specifying the range of the effective duty ratio and the period of the linear grating groove patterns (¼ wave plate) composed of the aluminum oxide film with preferable phase conversion characteristic for light containing a plurality of different wavelength regions with reference to FIGS. 1 to 31. The range F1 in FIG. 2 is a range where the phase difference between two polarization components perpendicular to each other can be set near to 90° (within a range of 90°±10°) for light of all the red, infrared and blue wavelength regions. The range F2 in FIG. 2 is a range where the phase difference between two polarization components perpendicular to each other can be set near to 90° (within a range of 90°±10°) for light of at least the red and infrared wavelength regions. The range F1 is an example of a "second range" in the present invention, and the range F2 is an example of a "first range" in the present invention.

Figure 3:
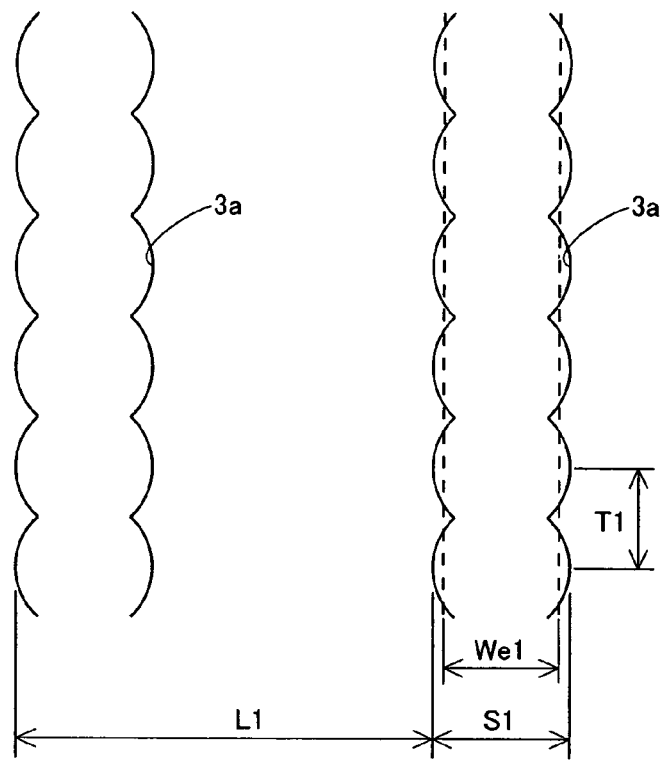
FIG. 3 is an enlarged plan view of grating groove pattern for explanation to define an effective duty ratio.
Figure 4:
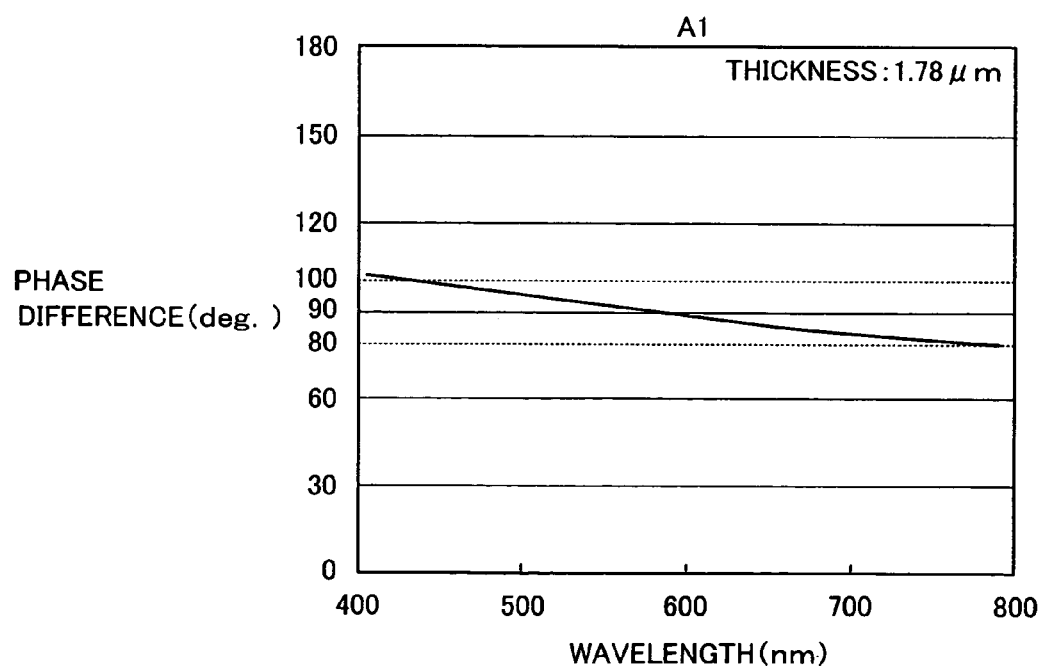
Figure 7:
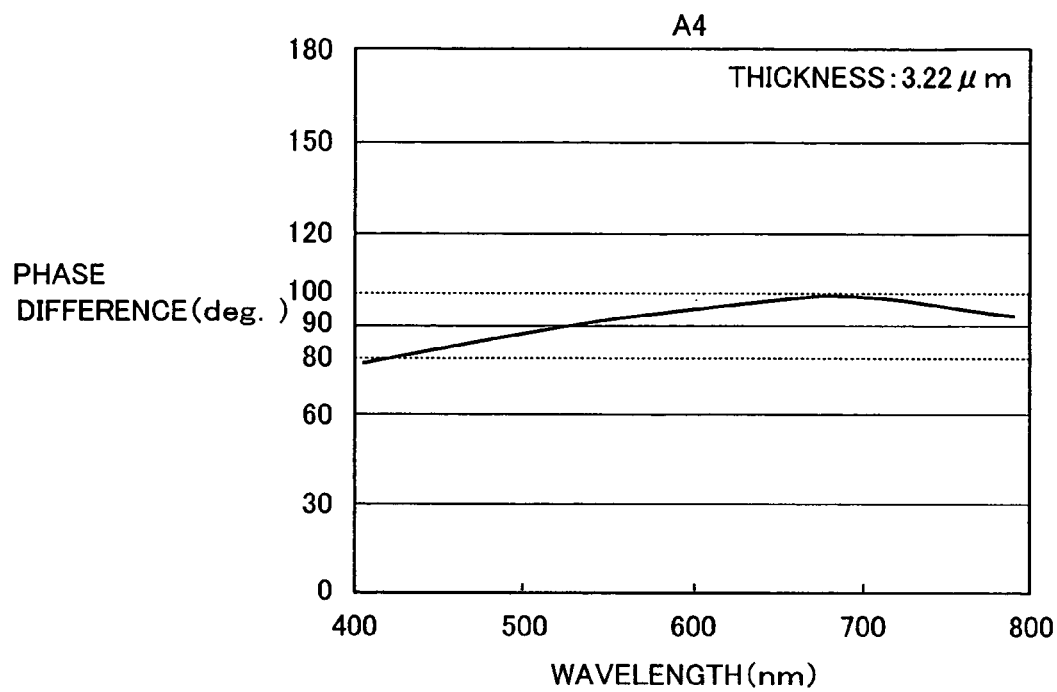
Figure 8:
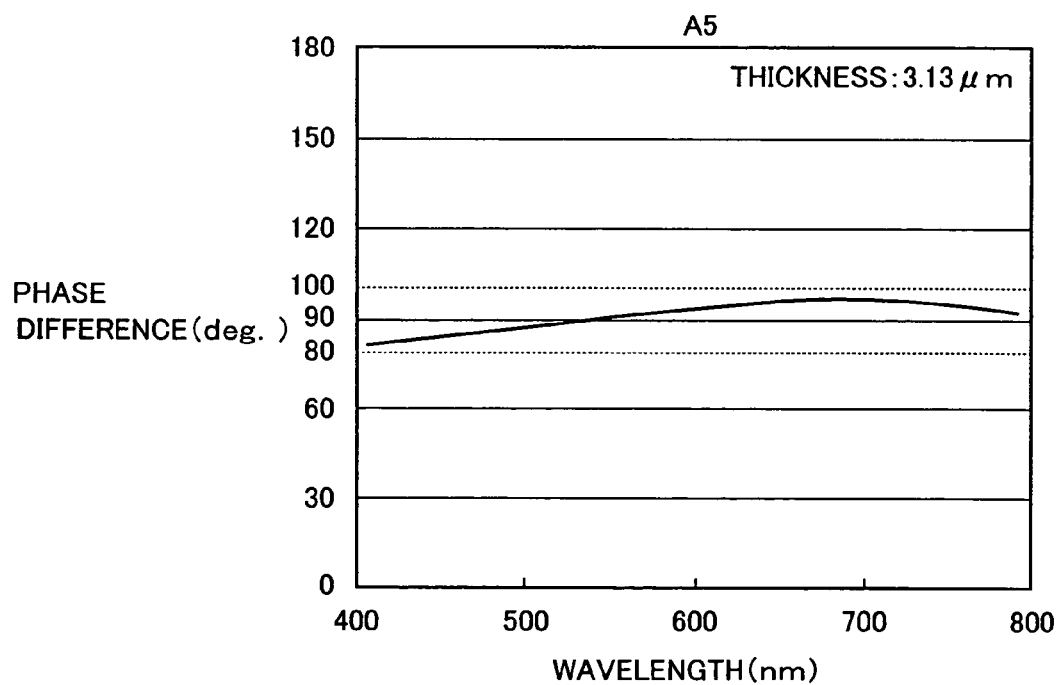
Figure 9:
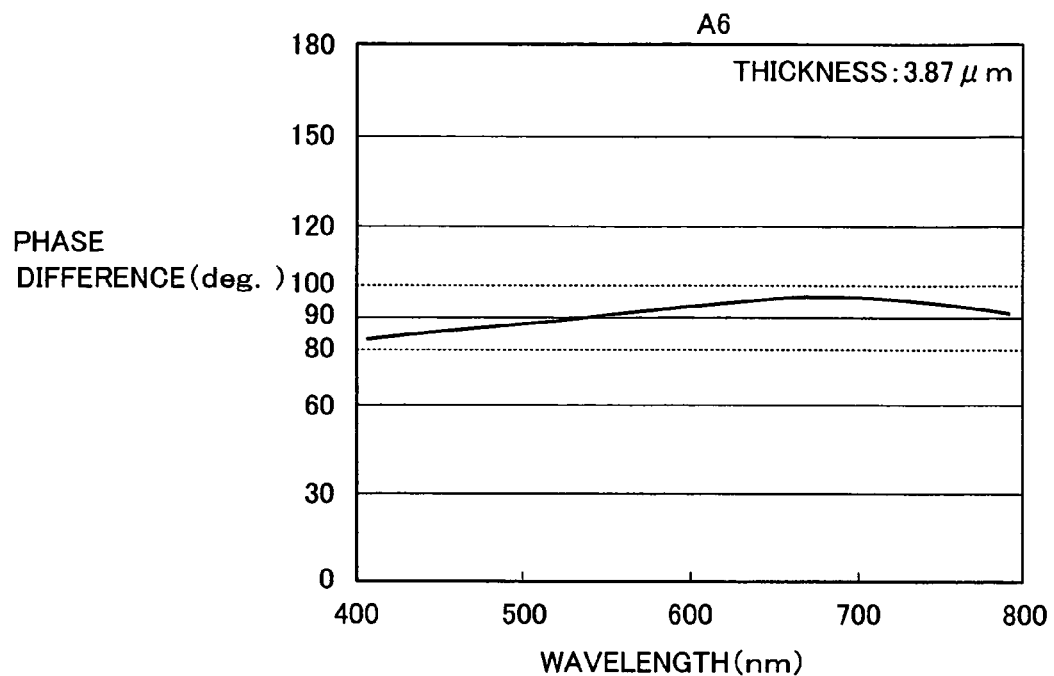
Figure 10:
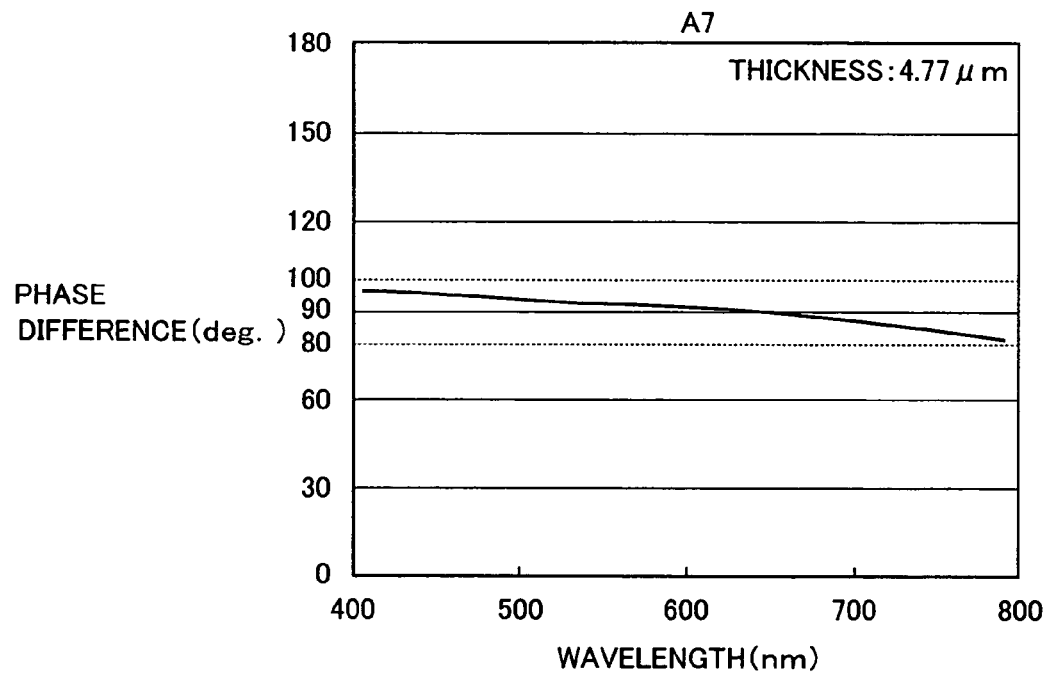
Figure 11:
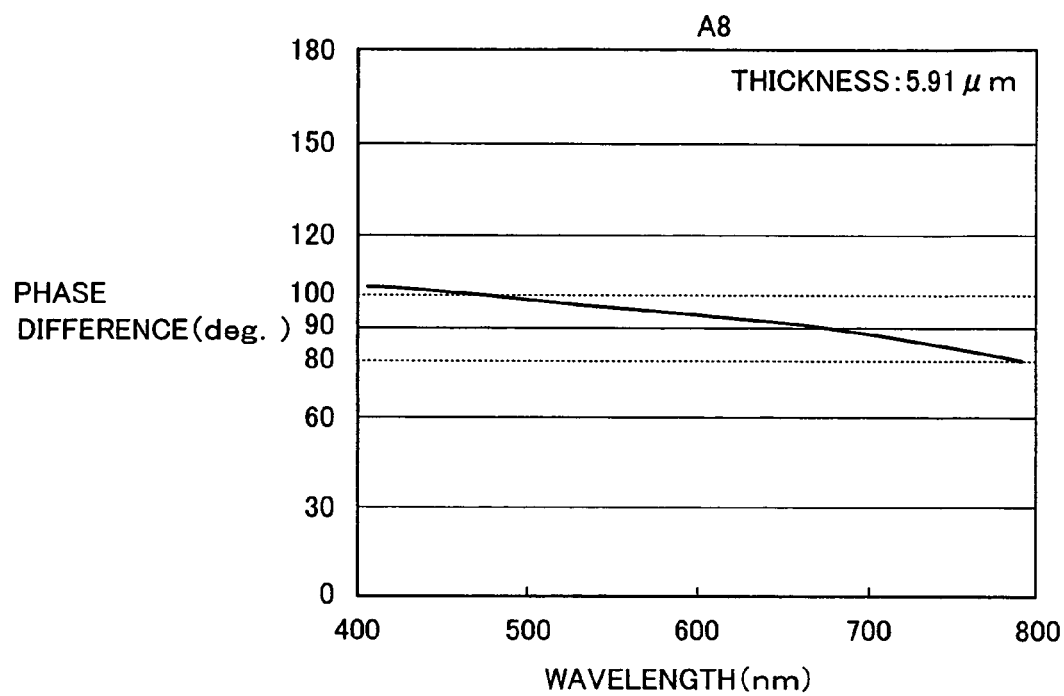
Figure 12:
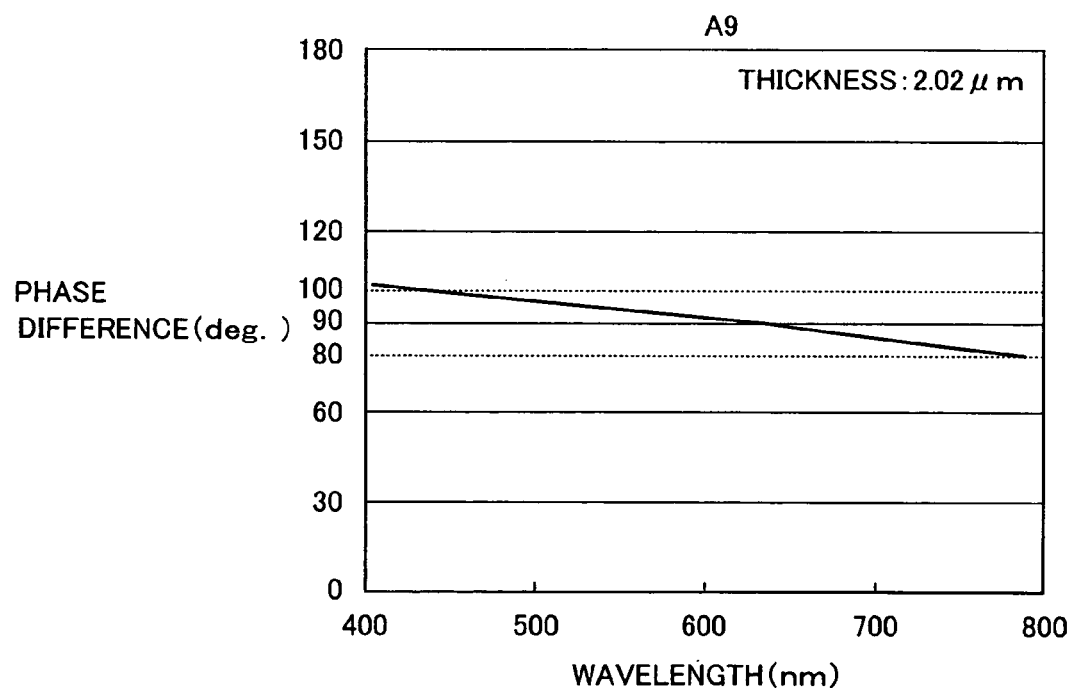
Figure 13:
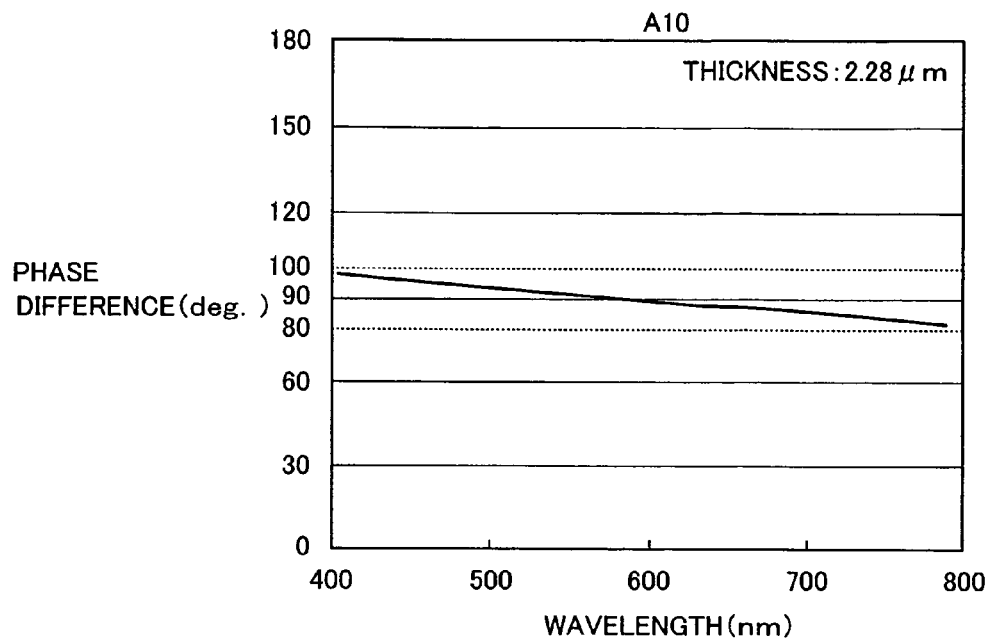
Figure 14:
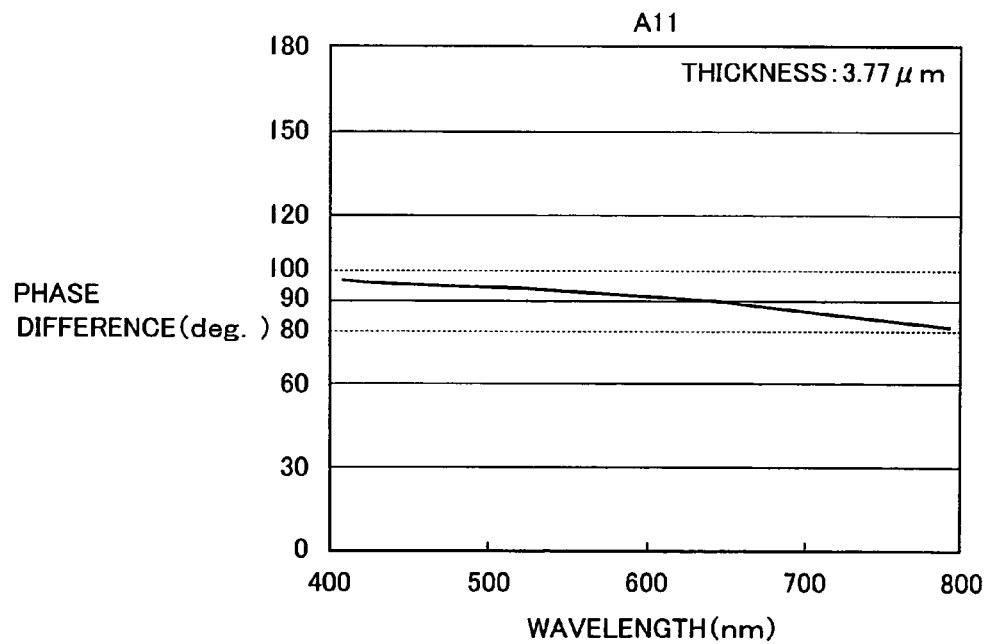
Figure 15:
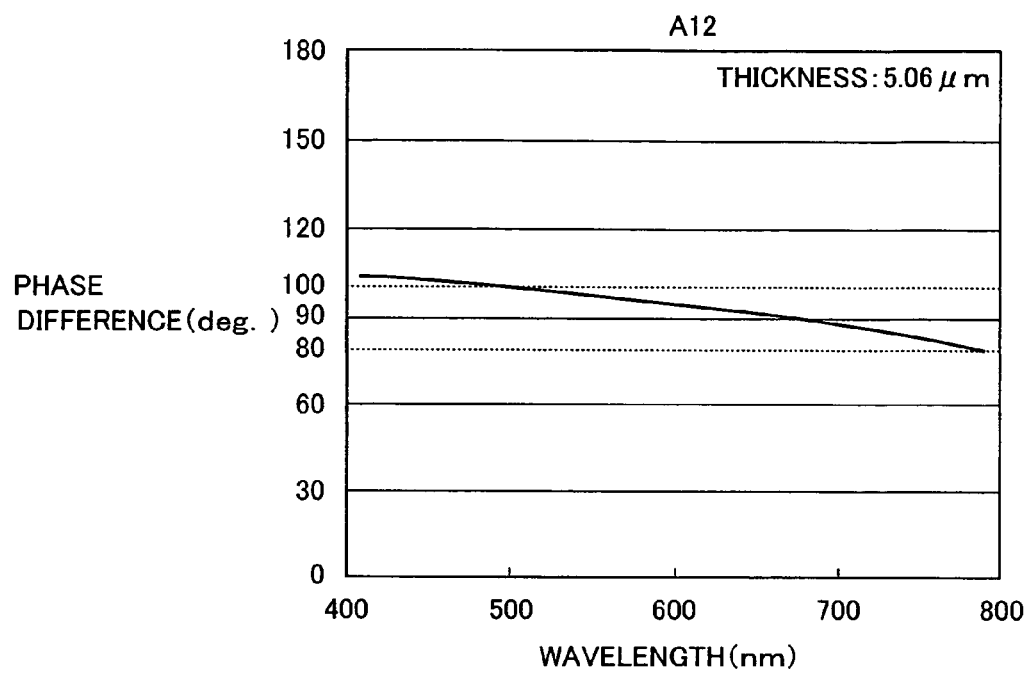
Figure 16:
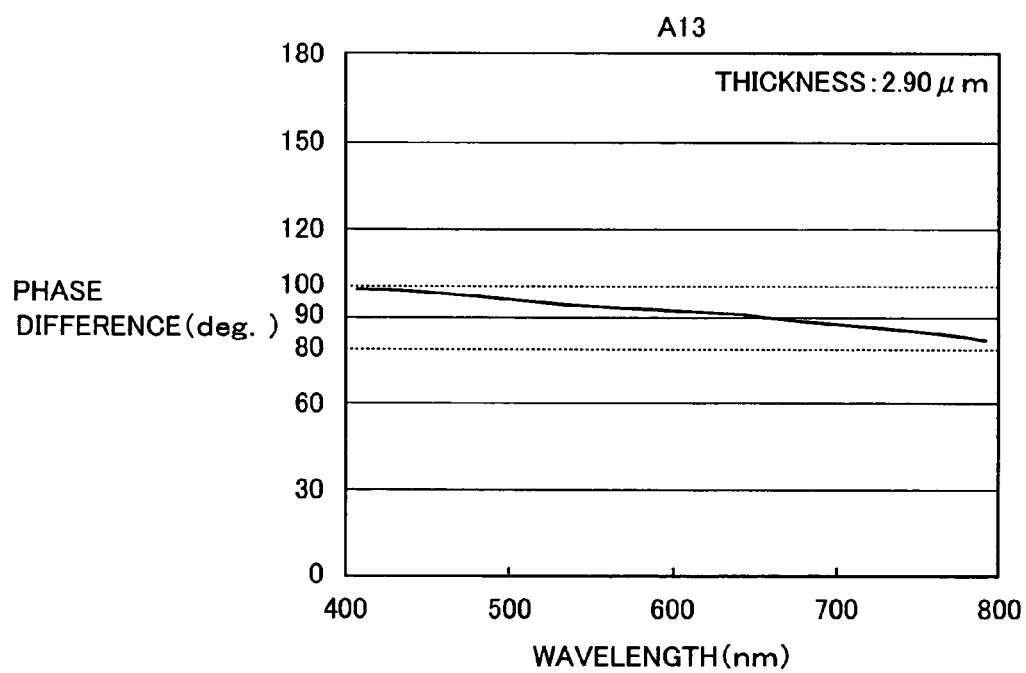
Figure 17:
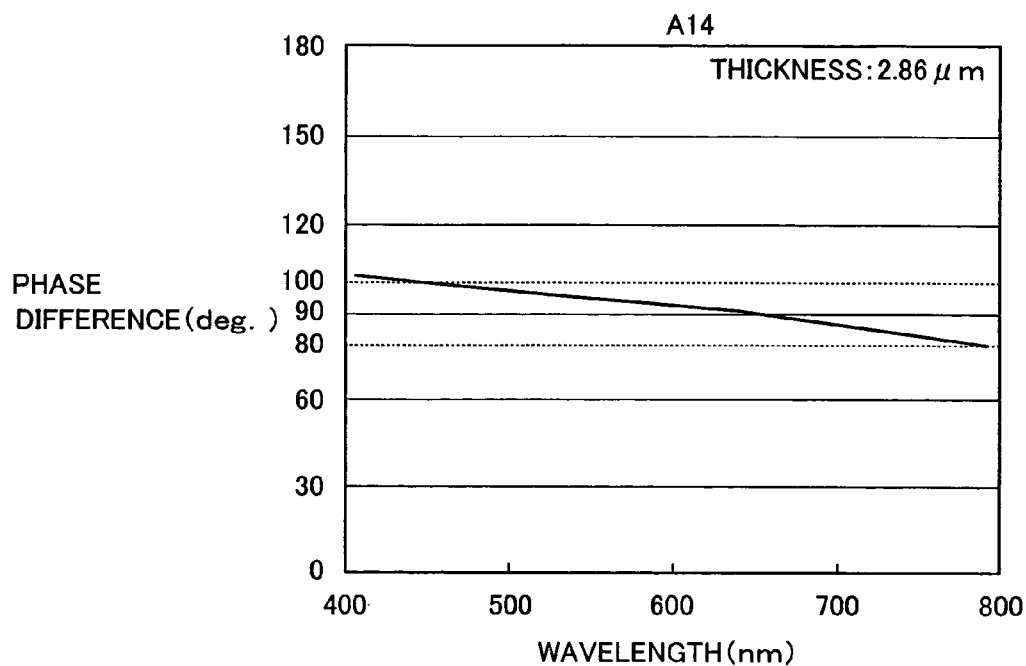
Figure 18:
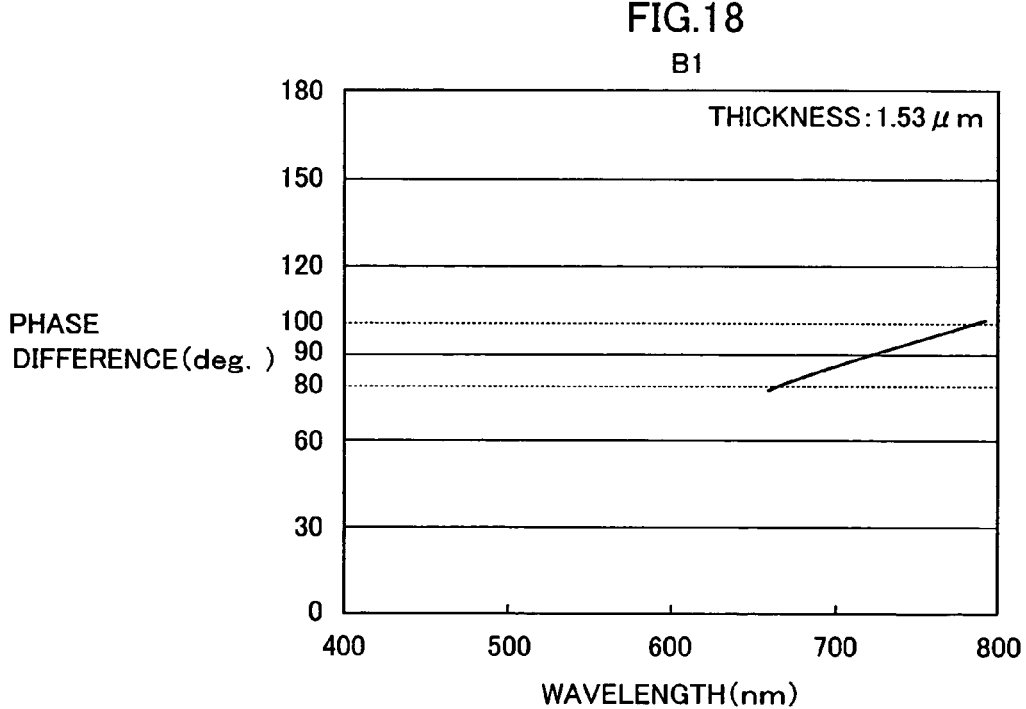
FIGS. 18 to 31 show simulation results of relationship between a wavelength and a phase difference of the coordinate points B1 to B14 to define the range shown in FIG. 2.
Figure 19:
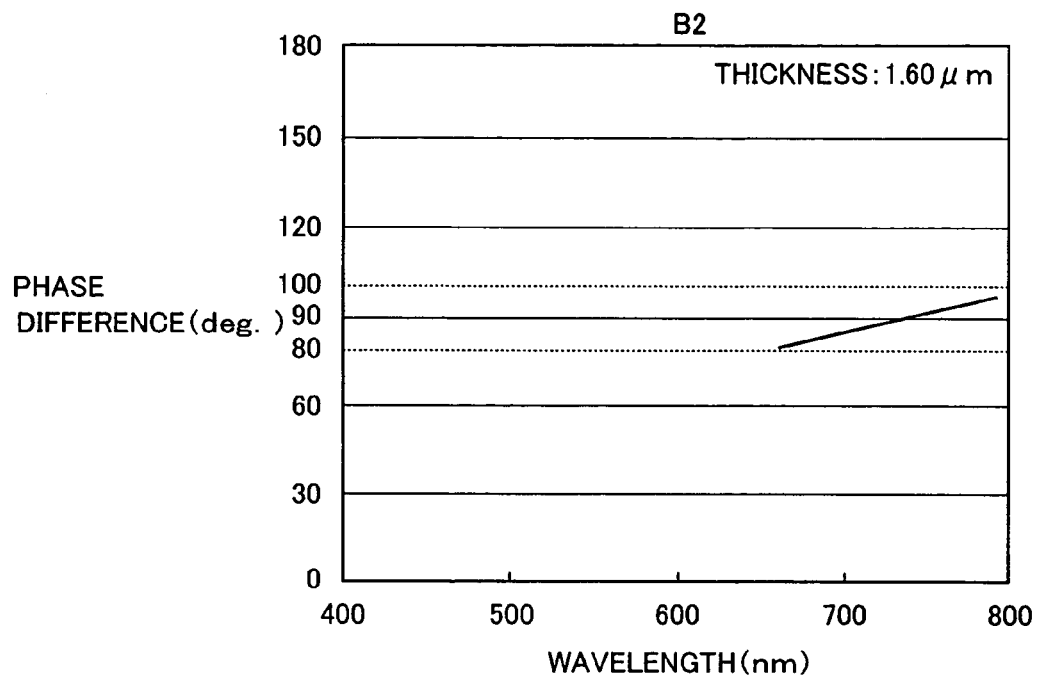
Figure 20:
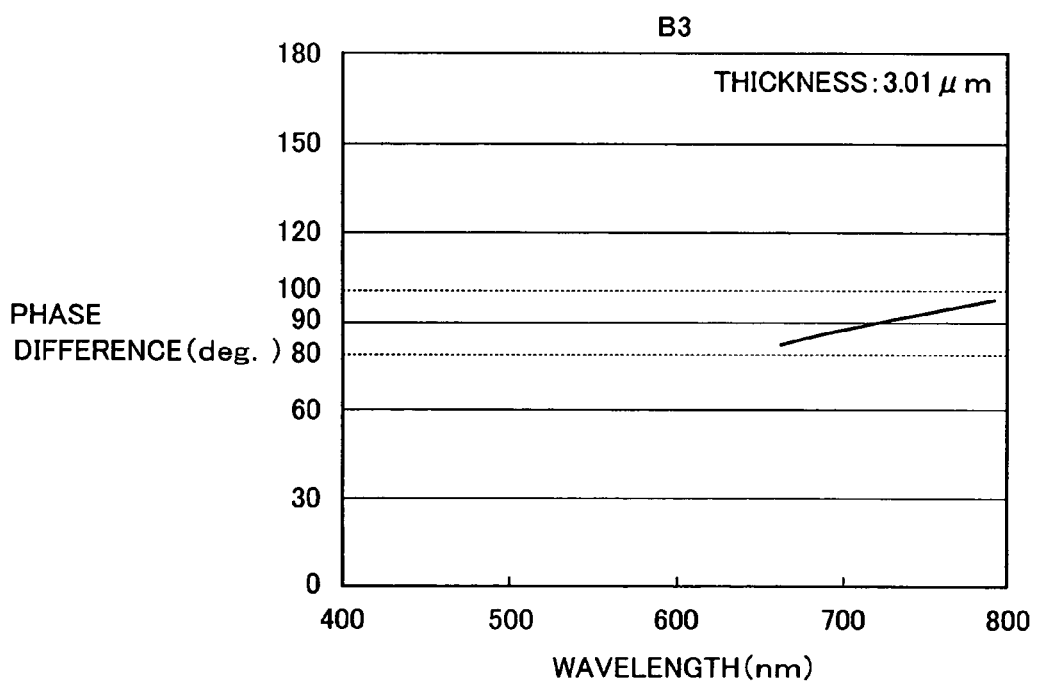
Figure 21:
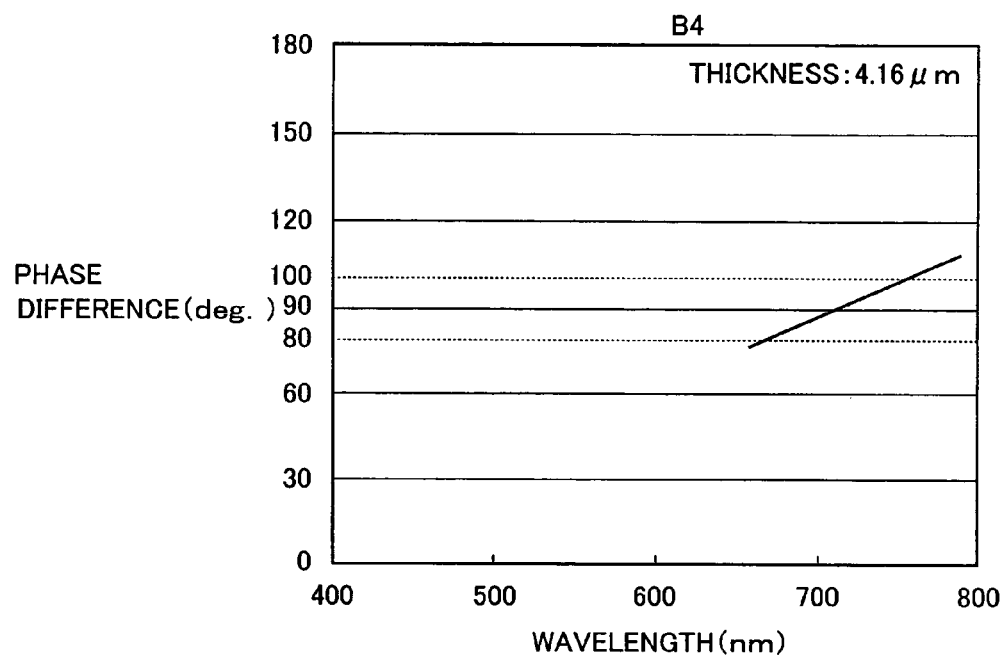
Figure 22:
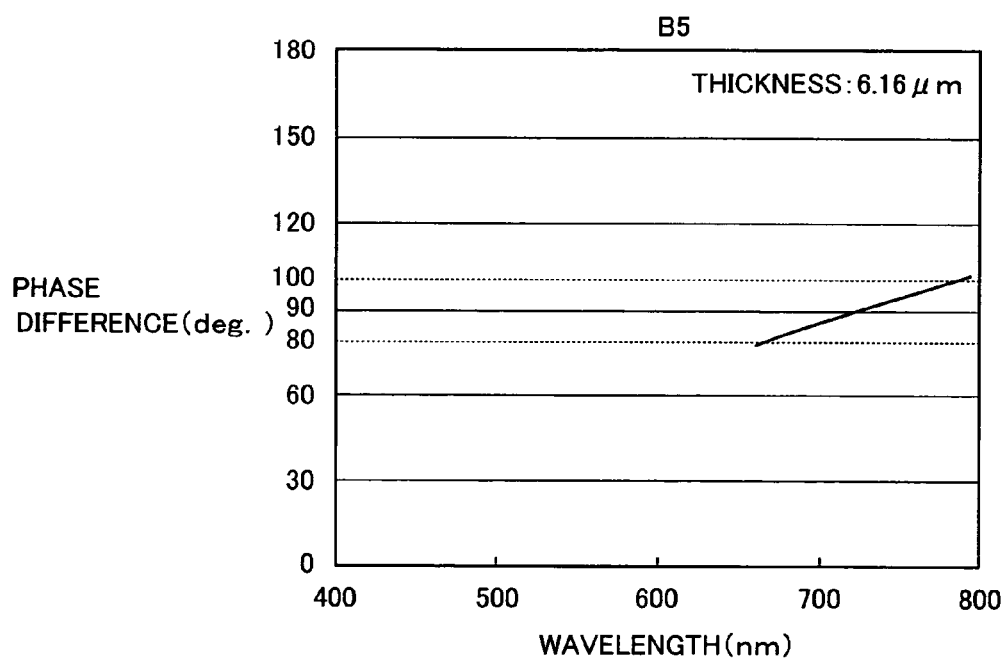
Figure 23:
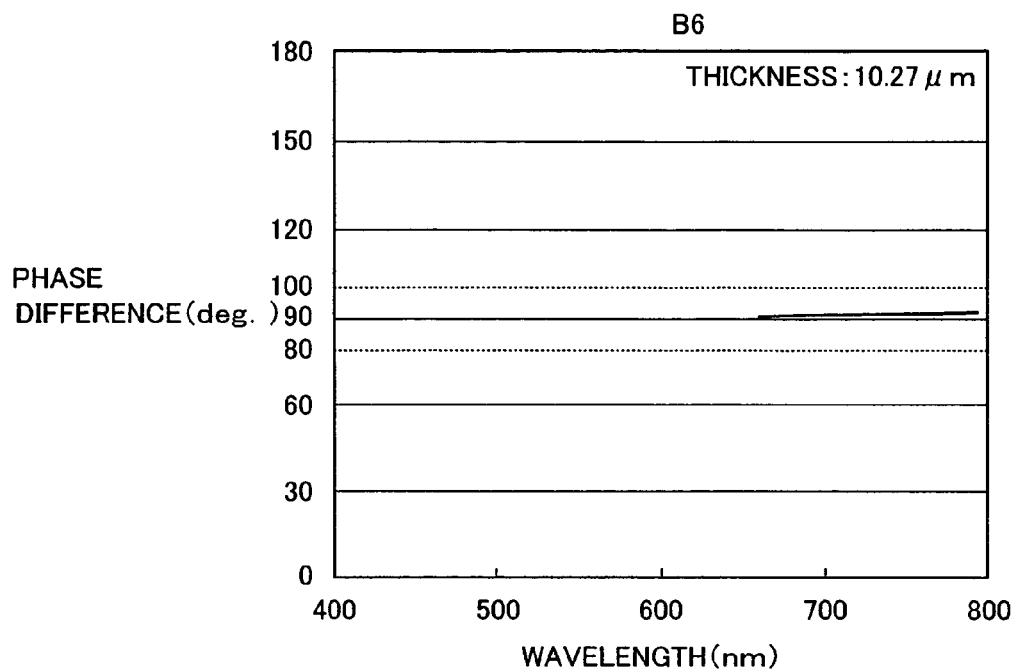
Figure 24:
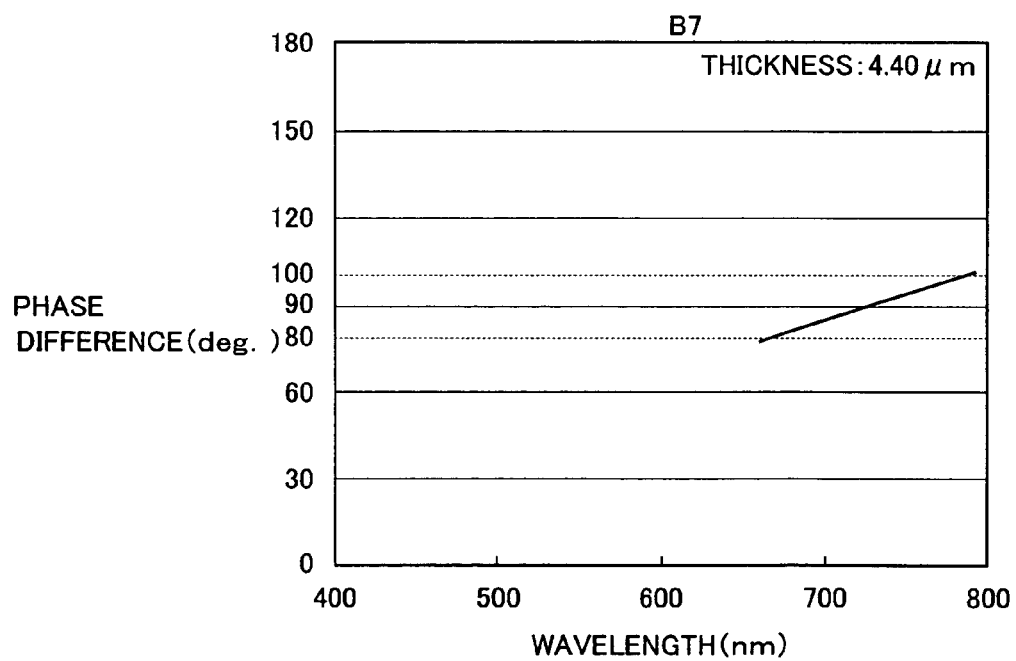
Figure 25:
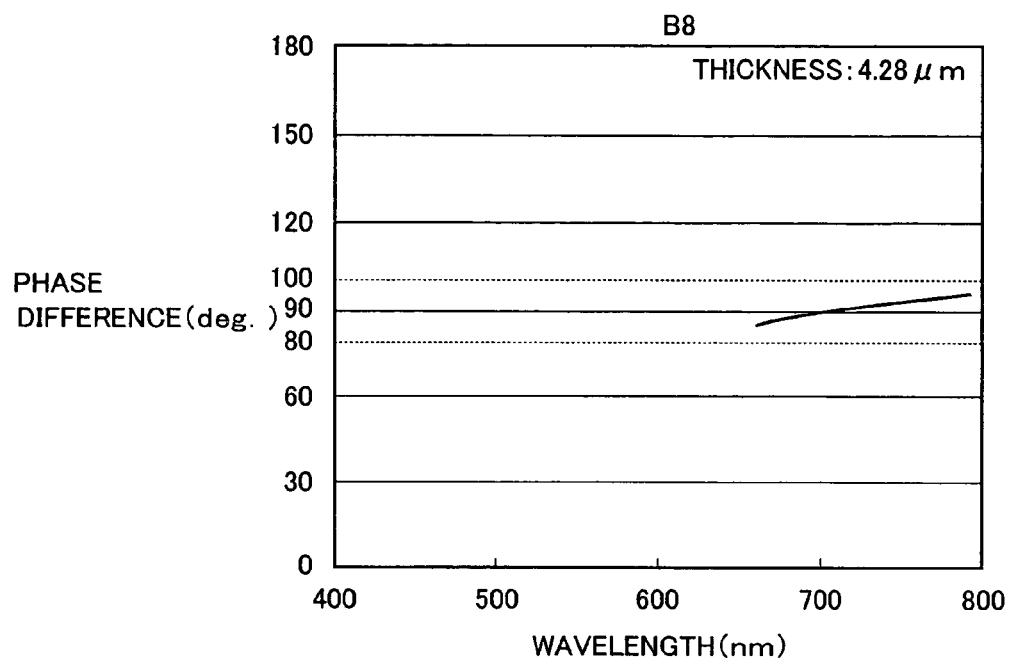
Figure 26:
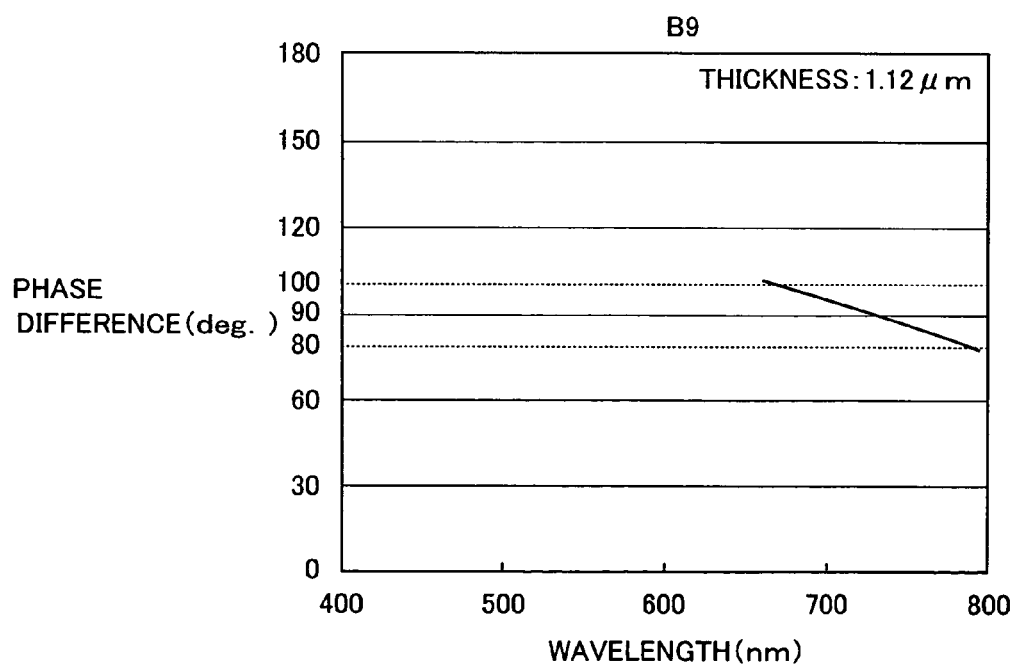
Figure 27:
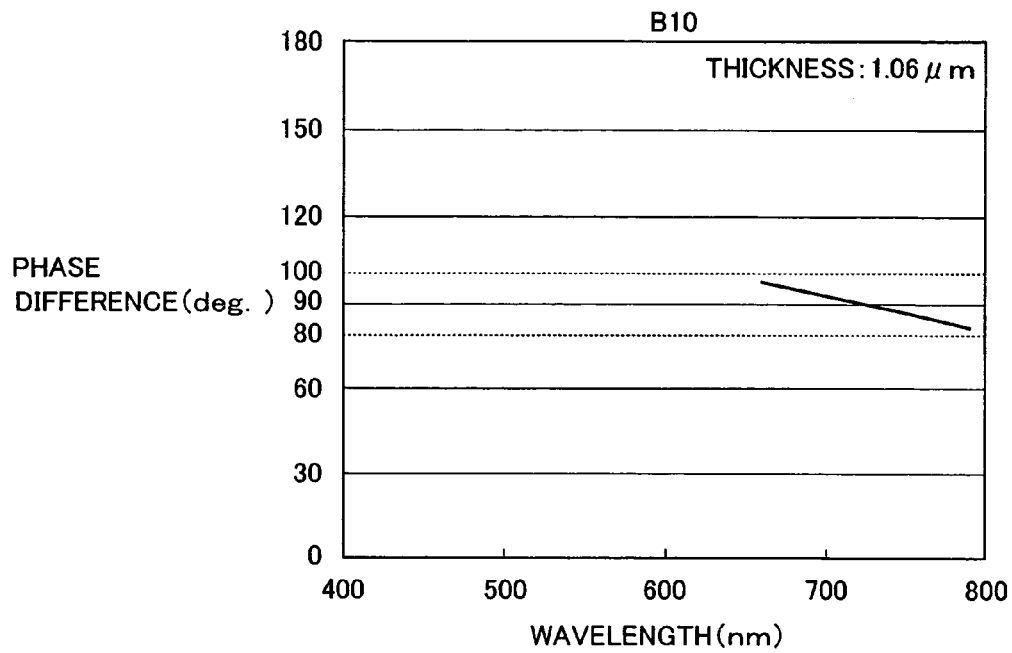
Figure 28:
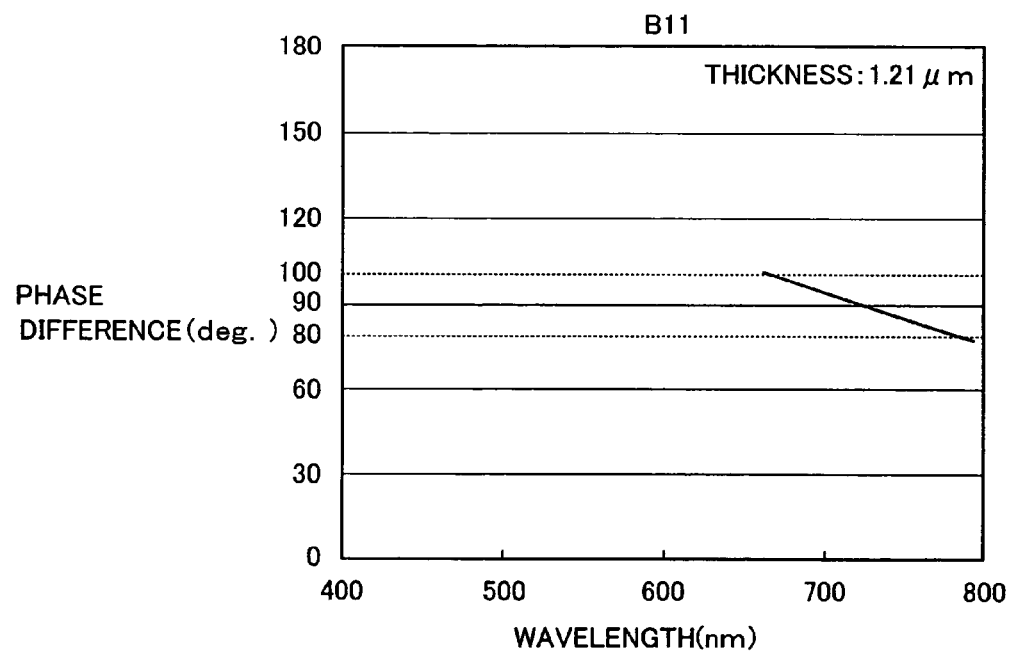
Figure 29:
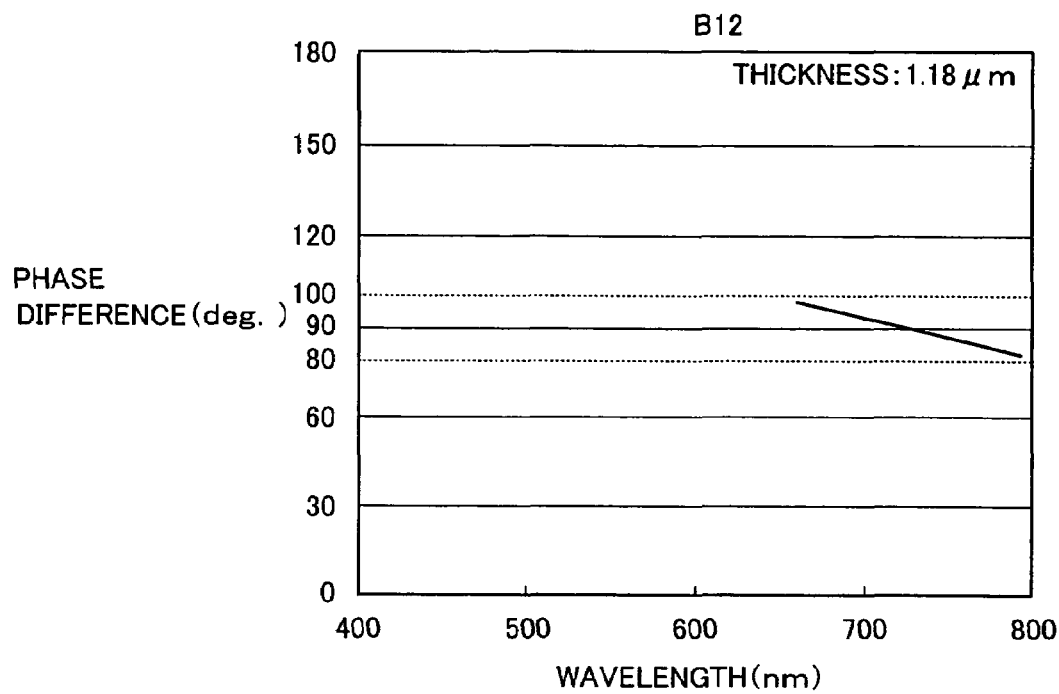
Figure 30:
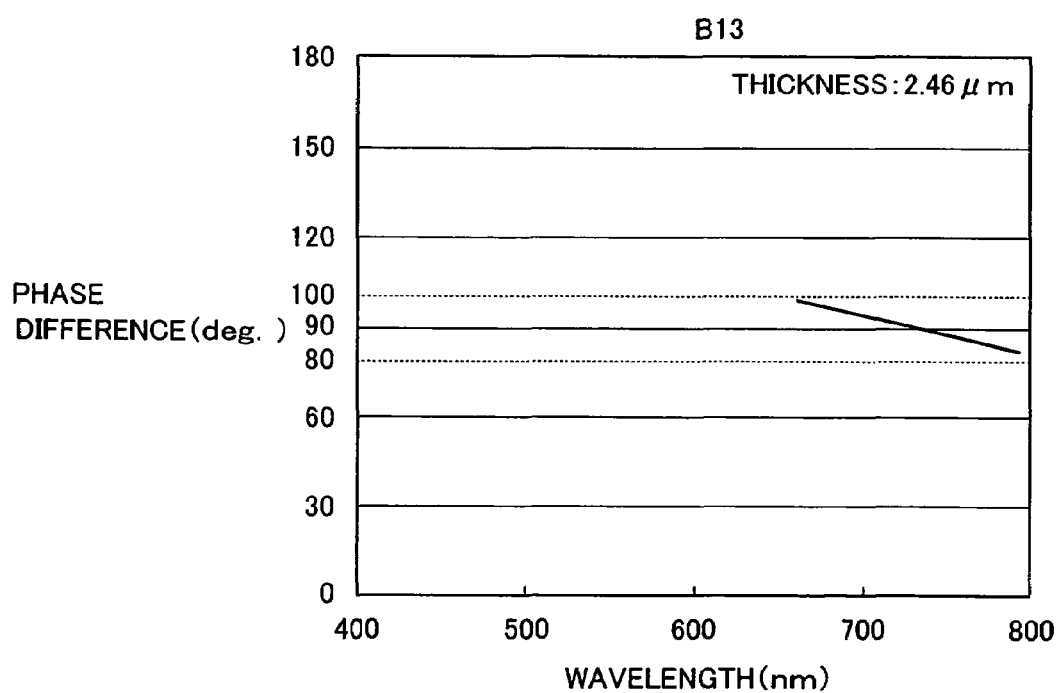
Figure 31:
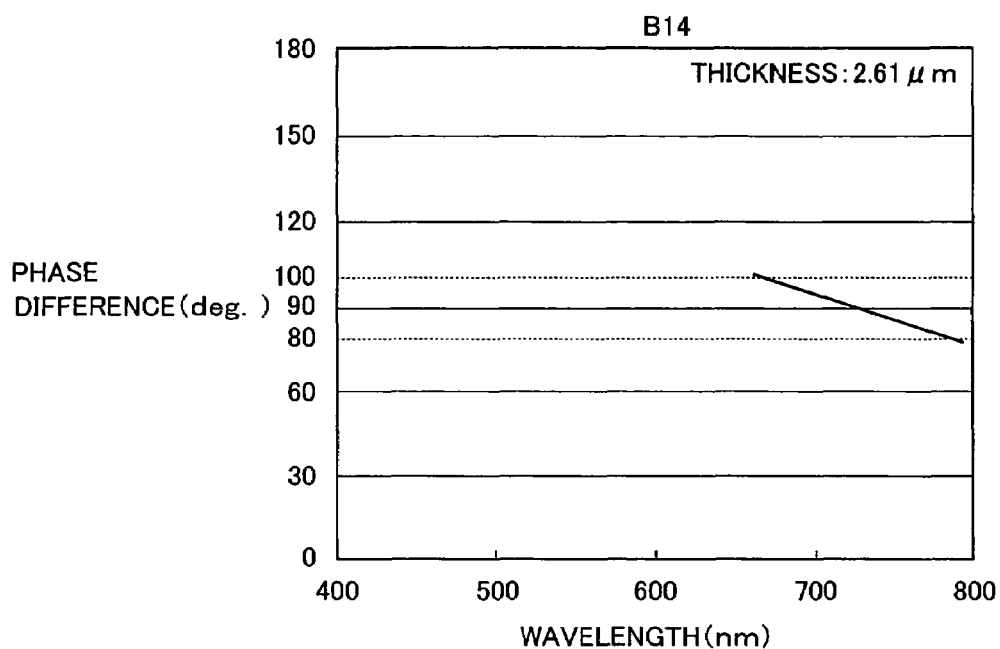

First, definition of the effective duty ratio De is described. As shown in FIG. 3, the effective duty ratio De is defined by De=(L1−We1)/L1, where the effective groove width of groove 3a of the linear grating groove patterns is We1 and the period is L1. The effective groove width We1 is defined by We1=3S1²/(3S1+T1), where the maximum width of the groove 3a is S1 and the pitch of the connected micropores is T1.

To specify the range F1 in FIG. 2, first, simulation of relationship between a wavelength and a phase difference is performed on each of a plurality kinds of linear grating groove patterns composed of aluminum oxide films with different effective duty ratios De and periods L1 when light of the red wavelength region, the infrared wavelength region and the blue wavelength region is incident. According to the simulation result, the range F1 is specified so as to include the effective duty ratios De and the periods L1 that satisfy the value of phase difference within the permissible range in all of the red wavelength region (660 nm), the infrared wavelength region (790 nm) and the blue wavelength region (405 nm), and so as to exclude the effective duty ratios De and the periods L1 that do not satisfy the value of phase difference within the permissible range in the blue wavelength region (405 nm). The values (coordinates) of the effective duty ratio De and the period L1 used for the above simulation are shown in the following table 1. The wavelengths of red light, infrared light and blue light are 660 nm, 790 nm and 405 nm, respectively. The permissible range of phase difference is set in the range of 90°±10°.

TABLE 1

| Coordinate Point | Coordinates | |
|---|---|---|
| | De | L1 |
| A1 | 0.73 | 0.4 |
| A2 | 0.75 | 0.4 |
| A3 | 0.79 | 0.4 |
| A4 | 0.85 | 0.395 |
| A5 | 0.85 | 0.385 |
| A6 | 0.9 | 0.4 |
| A7 | 0.95 | 0.4 |
| A8 | 0.97 | 0.4 |
| A9 | 0.8 | 0.37 |
| A10 | 0.82 | 0.37 |
| A11 | 0.95 | 0.37 |
| A12 | 0.97 | 0.37 |
| A13 | 0.88 | 0.35 |
| A14 | 0.88 | 0.34 |

Referring to the above table 1, the phase differences of the coordinate point A2 (De: 0.75, L1: 0.4), the coordinate point A3 (De: 0.79, L1: 0.4), the coordinate point A5 (De: 0.85, L1: 0.385), the coordinate point A6 (De: 0.9, L1: 0.4), the coordinate point A7 (De: 0.95, L1: 0.4), the coordinate point A10 (De: 0.82, L1: 0.37), the coordinate point A11 (De: 0.95, L1: 0.37), and the coordinate point A13 (De: 0.88, L1: 0.35) are within the permissible range (90°±10°) over all of wavelength regions of red light (660 nm), infrared light (790 nm) and blue light (405 nm), as shown in FIGS. 5, 6, 8, 9, 10, 13, 14 and 16, respectively. Besides, the film thicknesses (μm) of the aluminum oxide films of this case are the coordinate point A2: 1.90 μm, the coordinate point A3: 2.55 μm, the coordinate point A5: 3.13 μm, the coordinate point A6: 3.87 μm, the coordinate point A7: 4.77 μm, the coordinate point A10: 2.28 μm, the coordinate point A11: 3.77 μm, and the coordinate point A13: 2.90 μm, respectively.

On the other hand, the phase differences of the coordinate point A1 (De: 0.73, L1: 0.4), the coordinate point A4 (De: 0.85, L1: 0.395), the coordinate point A8 (De: 0.97, L1: 0.4), the coordinate point A9 (De: 0.8, L1: 0.37), the coordinate point A12 (De: 0.97, L1: 0.37), and the coordinate point A14 (De: 0.88, L1: 0.34) are within the permissible range (90°±10°) in the wavelength regions of red light (660 nm) and infrared light (790 nm), but are out of the permissible range (90°±10°) in the wavelength region of blue light (405 nm), as shown in FIGS. 4, 7, 11, 12, 15 and 17, respectively. Besides, the film thicknesses (μm) of the aluminum oxide films of this case are the coordinate point A1: 1.78 μm, the coordinate point A4: 3.22 μm, the coordinate point A8: 5.91 μm, the coordinate point A9: 2.02 μm, the coordinate point A12: 5.06 μm, and the coordinate point A14: 2.86 μm, respectively.

Consequently, the range F1 shown in FIG. 2 is specified by the following four formulas whereby including the coordinate points A2, A3, A5, A6, A7, A10, A11 and A13, the phase differences of which are within the permissible range (90°±10°) over all of wavelength regions of red light (660 nm), infrared light (790 nm) and blue light (405 nm), and whereby excluding the coordinate points A1, A4, A8, A9, A12 and A14, the phase differences of which are out of the permissible range (90°±10°) only in the wavelength region of blue light (405 nm).

$$De \geq 0.73 \quad (1)$$

$$L \leq 0.4 \quad (2)$$

$$L \geq -30.952De^3 - 74.751De^2 + 59.62De - 15.328 \quad (3)$$

$$L \leq 3.0776De^2 - 5.1863De + 2.5772 \quad (4)$$

The above formulas (1) and (2) specify straight-line portions F11 of the upper part of the range F1 shown in FIG. 2. The above formulas (3) and (4) specify a curve portion F12 of the lower part and a recessed portion F13 of the upper part of the range shown in FIG. 2.

Next, to specify the range F2 in FIG. 2, simulation of relationship between a wavelength and a phase difference is performed on each of a plurality kinds of linear grating groove patterns composed of aluminum oxide films with different effective duty ratios De and the periods L1 when light of the red wavelength region and the infrared wavelength region is incident. According to the simulation result, the range F2 is specified so as to include the effective duty ratios De and the periods L1 that satisfy the value of phase difference within the permissible range in the red wavelength region (660 nm) and the infrared wavelength region (790 nm), and so as to exclude the effective duty ratios De and the periods L1 that do not satisfy the value of phase difference within the permissible range in the red wavelength region (660 nm) and the infrared wavelength region (790 nm). The values (coordinates) of the effective duty ratio De and the period L1 used for the above simulation are shown in the following table 2. The wavelengths of red light and infrared light are 660 nm and 790 nm, respectively. The permissible range of phase difference is set in the range of 90°±10°.

TABLE 2

| Coordinate Point | Coordinates | |
|---|---|---|
| | De | L1 |
| B1 | 0.48 | 0.65 |
| B2 | 0.52 | 0.65 |
| B3 | 0.76 | 0.65 |
| B4 | 0.8 | 0.65 |
| B5 | 0.92 | 0.65 |
| B6 | 0.96 | 0.65 |
| B7 | 0.86 | 0.62 |
| B8 | 0.86 | 0.6 |
| B9 | 0.4 | 0.4 |
| B10 | 0.44 | 0.4 |
| B11 | 0.46 | 0.2 |
| B12 | 0.5 | 0.2 |
| B13 | 0.9 | 0.04 |
| B14 | 0.94 | 0.04 |

Referring to the above table 2, the phase differences of the coordinate point B2 (De: 0.52, L1: 0.65), the coordinate point B3 (De: 0.76, L1: 0.65), the coordinate point B6 (De: 0.96, L1: 0.65), the coordinate point B8 (De: 0.86, L1: 0.6), the coordinate point B10 (De: 0.44, L1: 0.4), the coordinate point B12 (De: 0.5, L1: 0.2), and the coordinate point B13 (De: 0.9, L1: 0.04) are within the permissible range (90°±10°) in the wavelength regions of red light (660 nm) and infrared light (790 nm), as shown in FIGS. 19, 20, 23, 25, 27, 29, and 30, respectively. Besides, the film thicknesses (μm) of the aluminum oxide films of this case are the coordinate point B2: 1.60 μm, the coordinate point B3: 3.01

μm, the coordinate point B6: 10.27 μm, the coordinate point B8: 4.28 μm, the coordinate point B10: 1.06 μm, the coordinate point B12: 1.18 μm, and the coordinate point B13: 2.46 μm, respectively.

The phase differences of the coordinate point B1 (De: 0.48, L1: 0.65), the coordinate point B4 (De: 0.8, L1: 0.65), the coordinate point B5 (De: 0.92, L1: 0.65), the coordinate point B7 (De: 0.86, L1: 0.62), the coordinate point B9 (De: 0.4, L1: 0.4), the coordinate point B11 (De: 0.46, L1: 0.2), and the coordinate point B14 (De: 0.94, L1: 0.04) are out of the permissible range (90°±10°) in the wavelength regions of red light (660 nm) and infrared light (790 nm), as shown in FIGS. 18, 21, 22, 24, 26, 28, and 31, respectively. Besides, the film thicknesses (μm) of the aluminum oxide films of this case are the coordinate point B1: 1.53 μm, the coordinate point B4: 4.16 μm, the coordinate point B5: 6.16 μm, the coordinate point B7: 4.40 μm, the coordinate point B9: 1.12 μm, the coordinate point B11: 1.21 μm, and the coordinate point B14: 2.61 μm, respectively.

Consequently, the range F2 shown in FIG. 2 is specified by the following four formulas whereby including the coordinate points B2, B3, B6, B8, B10, B12 and B13, the phase differences of which are within the permissible range (90°±10°) in the wavelength regions of red light (660 nm) and infrared light (790 nm), and whereby excluding the coordinate points B1, B4, B5, B7, B9, B11 and B14, the phase differences of which are out of the permissible range (90°±10°).

$$L1 \leq 0.65 \tag{5}$$

$$L1 \geq 2 \times 10^{-14} e^{31.263 De} \tag{6}$$

$$L1 \leq 6.0317 De^2 - 10.352 De + 5.0516 \tag{7}$$

$$(De - 0.85)^2 / 0.44^2 + (L1 - 0.41)^2 / 0.39^2 \leq 1 \tag{8}$$

The above formulas (5), (6), (7) and (8) specify straight-line portions F21 of the upper part, a curve portion F 22 of the lower right part, a recessed portion F23 of the upper part and a curve portion F 24 of the lower left part of the range F2 shown in FIG. 2, respectively.

Figure 32:
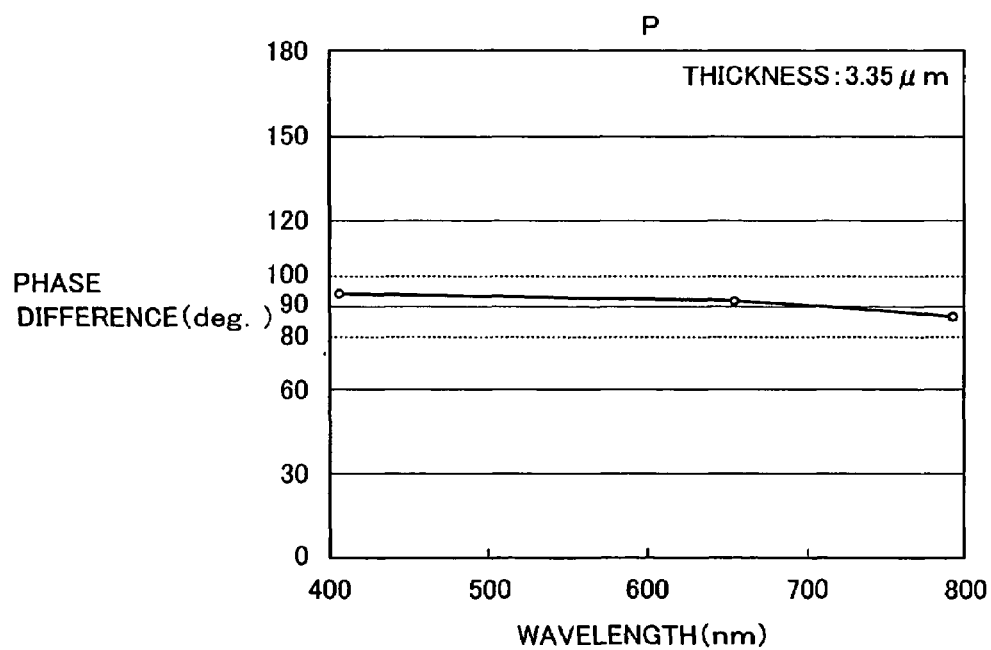
FIG. 32 shows a simulation result of relationship between a wavelength and a phase difference of the coordinate point P.

With the first embodiment, the effective duty ratio De and the period L1 of the linear grating groove patterns of the aluminum oxide film 3 (see FIG. 1) are set at values within the range F1 (for example, De: 0.88, L1: 0.38 (the coordinate point P in FIG. 2)) specified by the four formulas (1) to (4). That is, the phase difference of the first embodiment (the coordinate point P in FIG. 2) is within the permissible range (90°±10°) in all of the red wavelength region (660 nm), the infrared wavelength region (790 nm) and the blue wavelength region (405 nm). FIG. 32 shows an experimental result in the case that the effective duty ratio De and the period L1 are set at 0.88 and 0.38 respectively (the coordinate point P in FIG. 2). In this case, the film thickness (μm) is the coordinate point P: 3.35 μm.

With the first embodiment, the effective duty ratio De and the period L1 of the linear grating groove patterns of the aluminum oxide film 3 that composes the ¼ wave plate as mentioned above are set at values within the range F1 (for example, De: 0.88, L1: 0.38 (the coordinate point P in FIG. 2)) specified by the four formulas (1) to (4). Thus, the phase difference between two polarization components perpendicular to each other can be set near to 90° (within a range of 90°±10°) for light of all the red, infrared and blue wavelength regions. As a result, it is possible to provide a ¼ wave plate with preferable phase conversion characteristic over a wide wavelength range. Furthermore, since the aluminum oxide film 3 is an inorganic material, a ¼ wave plate with excellent environmental resistance characteristics can be obtained. Therefore, even when the ¼ wave plate having the aluminum oxide film 3 with rectilinear grating groove patterns is used under high temperature condition, deterioration of characteristics of the ¼ wave plate can be kept in check.

An example of a process of manufacturing the ¼ wave plate according to the first embodiment of the present invention is now described with reference to FIGS. 33 to 39.

Figure 33:
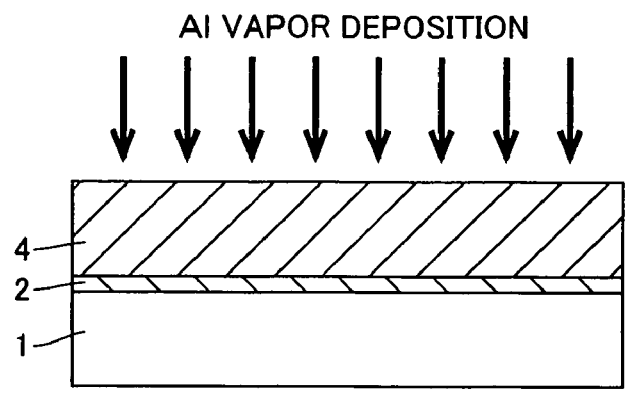
FIGS. 33 to 39 are sectional views and plan views for explanation of one example of a manufacturing process of the ¼ wave plate according to the first embodiment shown in FIG. 1.

First, the transparent conductor film 2 consisting of ITO or ZnO and the aluminum film 4 are successively formed on the glass substrate 1 by vapor deposition, as shown in FIG. 33.

Figure 34:
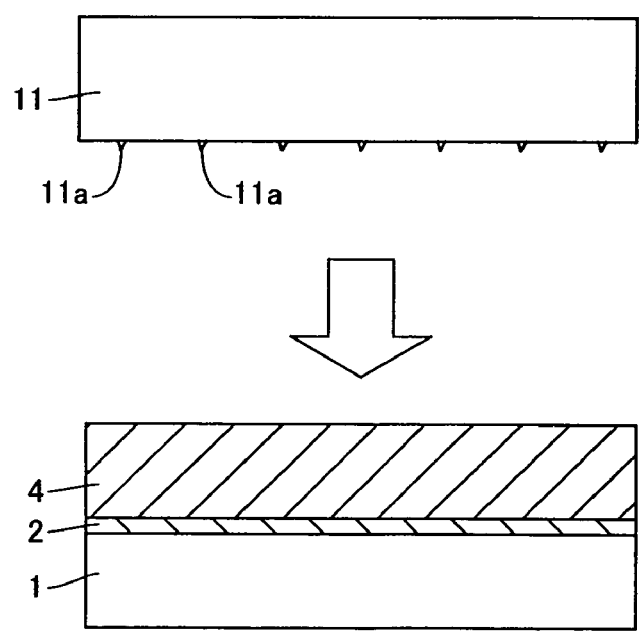
Figure 35:
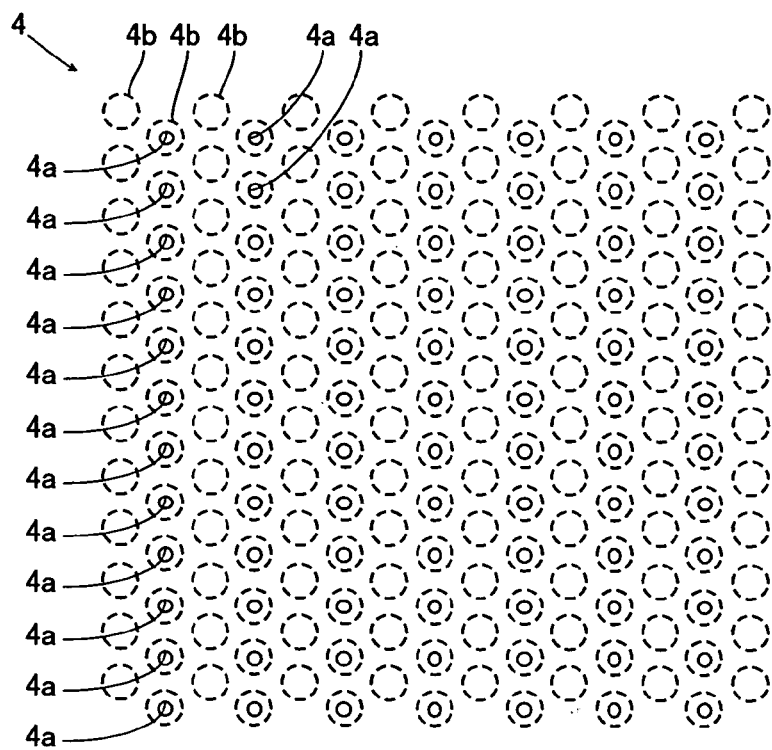

As shown in FIG. 34, regularly arranged projecting portions 11a are formed on the surface of a press member 11 consisting of a hard material such as SiC, in order to perform texturing. At this time, as shown in FIG. 35, the projecting portions 11a (see FIG. 34) of the press member 11 are so formed as to define dot columns of concave portions 4a on the surface of the textured aluminum film 4 every other column of a plurality of triangular lattice patterns 4b shown by broken lines. The dot columns of the concave portions 4a are formed on the surface of the aluminum film 4 in the arrangement shown in FIG. 35 by texturing, in which the press member 11 is pressed against the surface of the aluminum film 4, as shown in FIG. 34.

Figure 36:
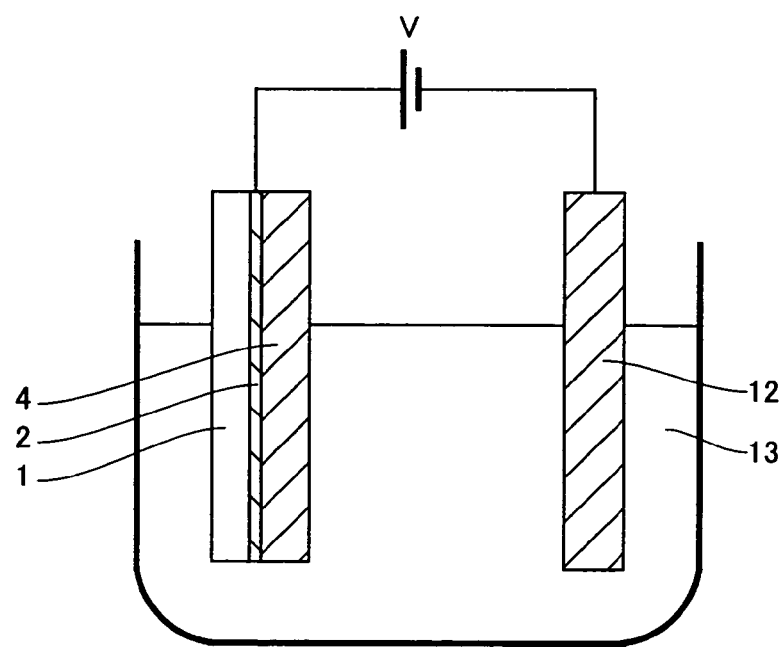

As shown in FIG. 36, the aluminum film 4 formed with the dot columns of the concave portions 4a (see FIG. 35) is anodically oxidized thereby forming pores (not shown) corresponding to the dot columns. More specifically, the surface of the aluminum film 4 or the glass substrate 1 serving as an anode is opposed to the surface of a cathode 12 consisting of platinum. A voltage of about 160 V is applied in aqueous phosphoric acid 13 of about 0.05 M in concentration thereby performing oxidation for about 3 hours. The voltage is applied to the aluminum film 4 through the transparent conductor film 2 formed between the glass substrate 1 and the aluminum film 4. Thus, the voltage can be constantly applied to the aluminum film 4 during the oxidation, thereby preventing the aluminum film 4 from disadvantageously leaving unoxidized portions even when the glass substrate 1 has an irregular surface. Thus, an aluminum oxide film (not shown) having micropores is formed in a self-organized manner. In relation to such micropores formed by anodic oxidation, it is known that a relational expression U=0.0025 Va (μm) holds assuming that U represents the maximum distance between adjacent pores and Va represents the anodic oxidation voltage. This relational expression (U=0.0025 Va) is disclosed in H. Masuda et al., "Jpn. J. Appl. Phys.", Vol. 37, 1998, pp. L1340–L1342, for example.

Figure 37:
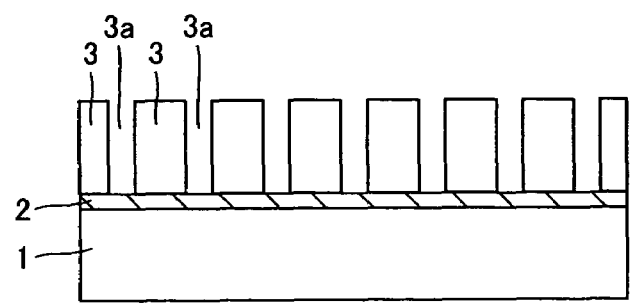
Figure 38:
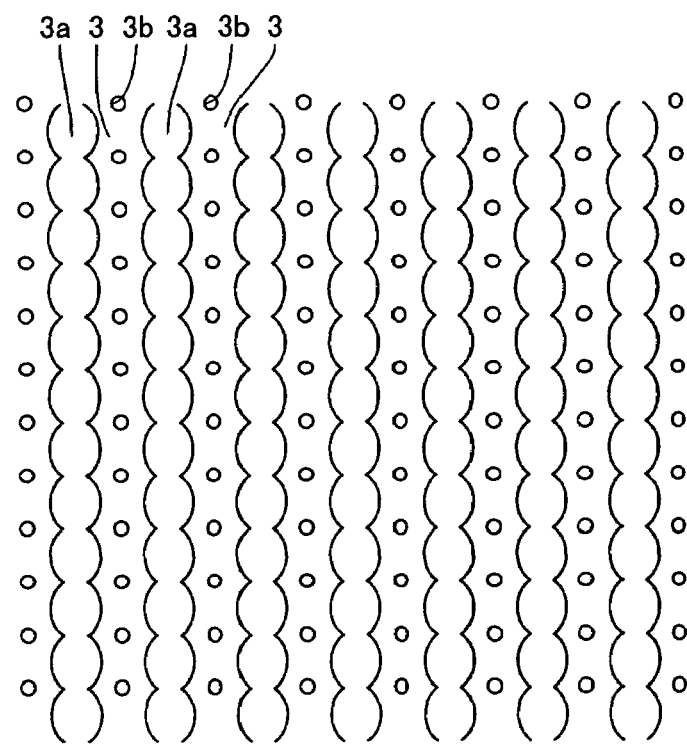
Figure 39:
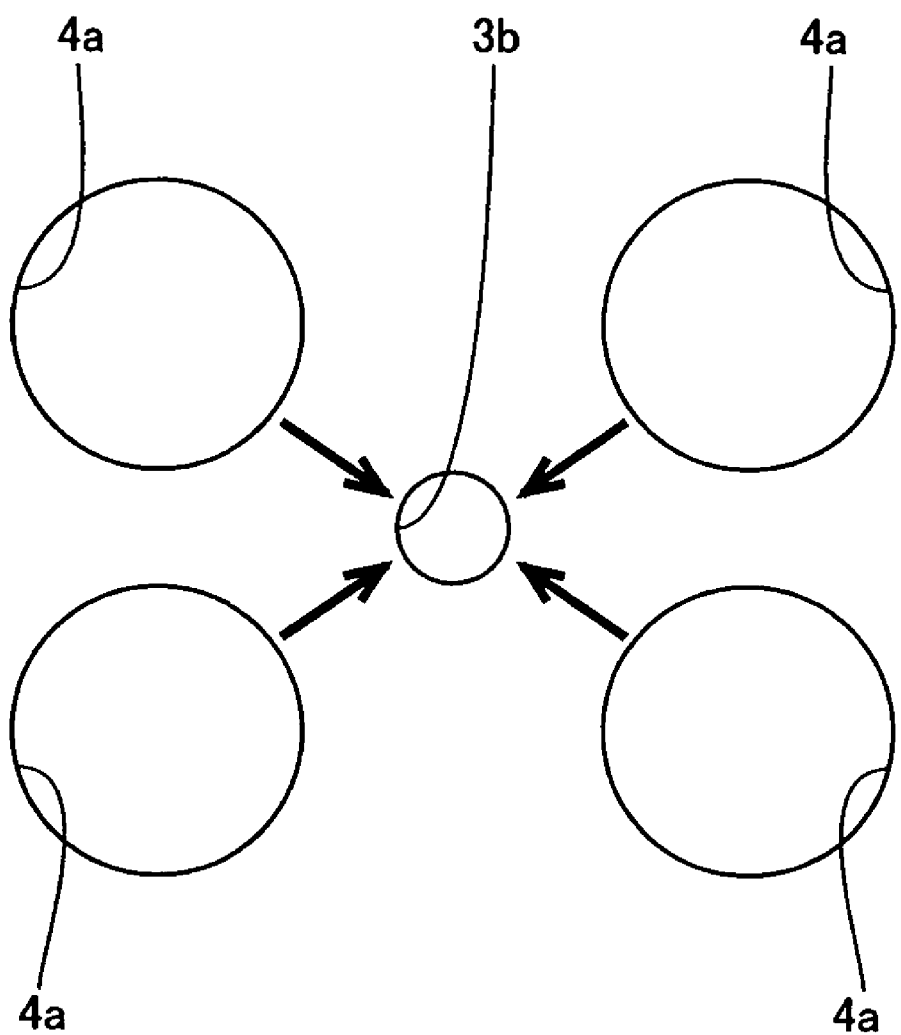

Pores (not shown) corresponding to the dot columns formed by anodic oxidation are thereafter enlarged at about 30° C. by wet etching in an aqueous solution containing about 5 wt. % of phosphoric acid. At this time, the pores corresponding to the dot column enlarge, thus, the pores adjacent to each other are connected to each other as shown in FIGS. 37 and 38, whereby portions of the aluminum oxide film 3 located on regions for forming grooves 3a can be easily substantially completely removed. Accordingly, the aluminum oxide film 3 is formed with rectilinear grating groove patterns. The groove 3a of the linear grating groove patterns of the aluminum oxide film 3 is formed so as to have a depth that reaches the transparent conductor film 2, and so that the width of the groove 3a is uniform along the depth direction. A plurality of pores 3b are formed on surface portions of the aluminum oxide film 3 located between the grooves 3a. Although the pores 3b are not preferable, as shown in FIG. 39, each pore 3 is conceivably formed on a position corresponding to each triangular lattice pattern 4b (see FIG. 35) formed with no concave portion 4a due to influence by distortion of the concave portions 4a formed by texturing and distortion resulting from anodic oxidation.

With the process of manufacturing according to the first embodiment, forming this metal oxide film 3 with rectilinear grating groove patterns by anodic oxidation can form grating groove patterns having a large depth with a uniform groove width along the depth direction in a self-organized manner, as mentioned above. Accordingly, it is possible to obtain a ¼ wave plate with preferable grating groove patterns.

Construction of an optical system of a CD-R/DVD compatible optical pickup device having the ¼ wave plate according to the first embodiment shown in FIG. 1 is now described with reference to FIG. 40.

Figure 40:
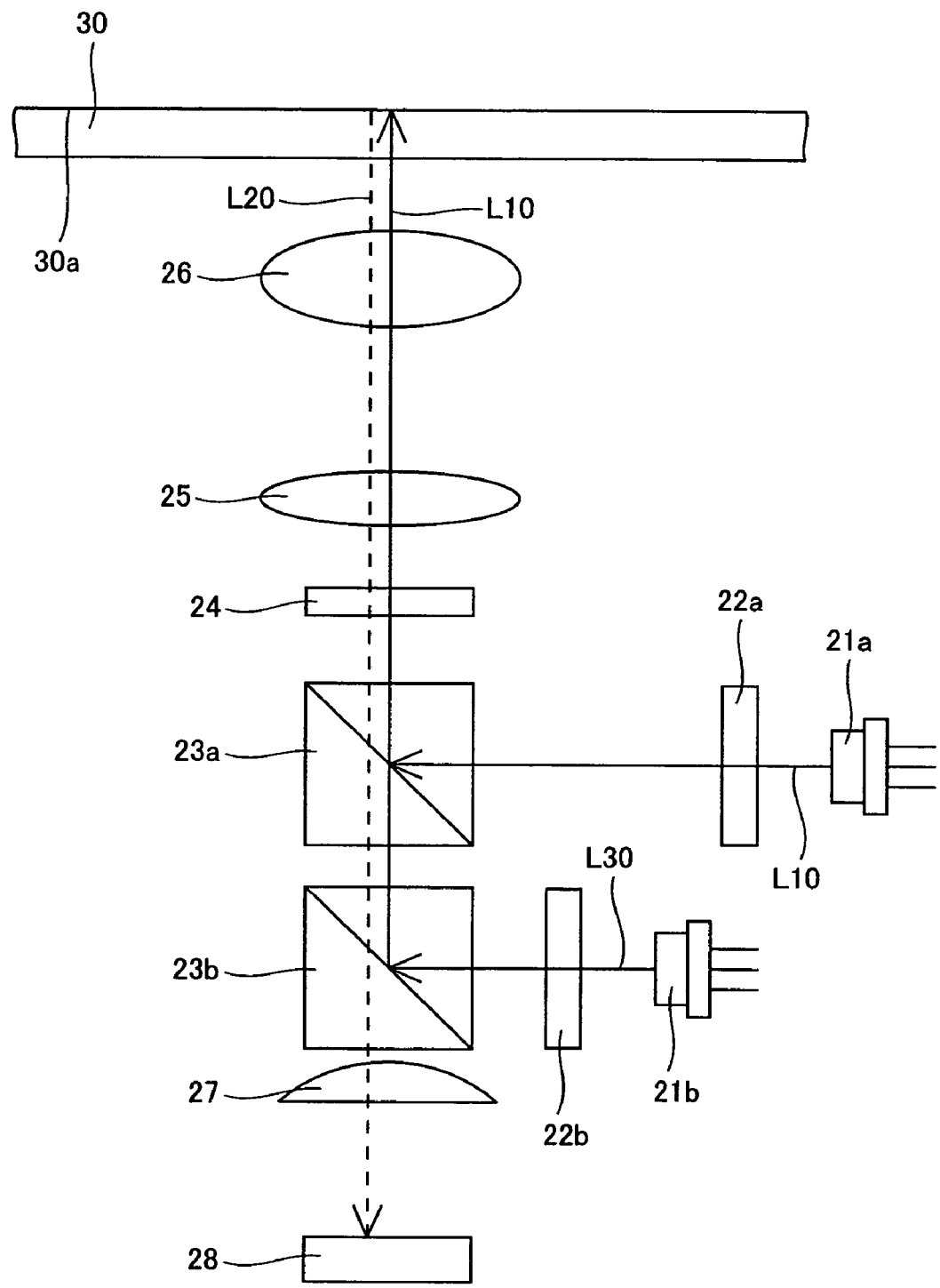
FIG. 40 is a schematic view showing an optical system of a CD-R/DVD compatible optical pickup device as an optical device including the ¼ wave plate according to the first embodiment shown in FIG. 1.

The optical system of the CD-R/DVD compatible optical pickup device includes a semiconductor laser element for CD-R 21a and a semiconductor laser element for DVD 21b, diffraction gratings 22a and 22b, polarization beam splitters 23a and 23b, a ¼ wave plate 24, a collimator lens 25, an objective lens 26, a cylindrical lens 27, and a photoreceptor element 28, as shown in FIG. 40. The ¼ wave plate 24 according to the first embodiment shown in FIG. 1 is used as the ¼ wave plate 24. The semiconductor laser element for CD-R 21a and the semiconductor laser element for DVD 21b are examples of a "light source" in the present invention, respectively, and the ¼ wave plate 24 is an example of the "wave plate" in the present invention.

The semiconductor laser element for CD-R 21a and the semiconductor laser element for DVD 21b are arranged so that laser beams are emitted in the direction parallel to a record/reproduction surface 30a of an optical disc 30, respectively. The semiconductor laser element for CD-R 21a emits laser light of a wavelength near 790 nm (infrared light) used for CD-R. The semiconductor laser element for DVD 21b emits laser light of a wavelength near 650 nm (red light) used for DVD. The laser beams emitted from the semiconductor laser element for CD-R 21a and the semiconductor laser element for DVD 21b have linear polarization perpendicular to the record/reproduction surface 30a of the optical disc 30, respectively. The diffraction gratings 22a and 22b serve to convert the laser beams emitted from the semiconductor laser element for CD-R 21a and the semiconductor laser element for DVD 21b into three laser beams including a tracking error detection beam, respectively.

The polarization beam splitters 23a and 23b serve to reflect the laser light with polarization direction perpendicular to the record/reproduction surface 30a of the optical disc 30 and parallel to the paper plane, respectively, and while to allow the laser light with polarization direction parallel to the record/reproduction surface 30a of the optical disc 30 and perpendicular to the paper plane to pass through them. In this case, since the polarization beam splitters 23a and 23b are used, the laser light with a predetermined polarization direction can be branched nearly 100% dissimilarly to the case that a half mirror is used. Accordingly, it is possible to improve efficiency of light utilization. Besides, the polarization beam splitter 23a serves only for the laser light of a wavelength near to 790 nm (infrared light) used for CD-R, and while allows the laser light of wavelengths other than a wavelength of near to 790 nm to pass it irrespective of polarization direction. In addition, the polarization beam splitter 23b serves only for the laser light of a wavelength near to 650 nm (red light) used for DVD, and while allows the laser light of wavelengths other than a wavelength of near to 650 nm to pass it irrespective of polarization direction.

The collimator lens 25 and the objective lens 26 serve to focus the laser light passing through the ¼ wave plate 24 on the record/reproduction surface 30a of the optical disc 30. The cylindrical lens 27 serves to convert the laser light reflected by the record/reproduction surface 30a of the optical disc 30 into laser light containing a focus error detection (astigmatic method) beam. The photoreceptor element 28 serves to detect the laser light reflected by the record/reproduction surface 30a of the optical disc 30 as a tracking error signal, a focus error signal, and an HF (high frequency) signal.

Operation of an optical system of a CD-R/DVD compatible optical pickup device having the ¼ wave plate according to the first embodiment shown in FIG. 1 is now described with reference to FIG. 40.

In the case that a CD-R disc is used as the optical disc 30, the semiconductor laser element for CD-R 21a emits laser light L10 of a wavelength near to 790nm (infrared light) with linear polarization parallel to the paper plane. After converted into three the laser beams including a tracking error detection beam by the diffraction grating 22a, the laser light L10 enters the polarization beam splitter 23a. At this time, the polarization beam splitter 23a changes the direction of the laser light L10 toward the optical disc 30. The laser light L10 directed toward the optical disc 30 is converted from linear polarized light into circularly polarized light by the ¼ wave plate 24, and then is focused by the collimator lens 25 and the objective lens 26. Consequently, the focused laser light L10 records a signal on the record/reproduction surface 30a of the optical disc 30.

The record/reproduction surface 30a of the optical disc 30 reflects laser light L20 that is not used to record a signal on the record/reproduction surface 30a of the optical disc 30. Thus, its phase is changed 180°. Then, the laser light L20 reflected by the record/reproduction surface 30a of the optical disc 30 is converted from circularly polarized light into linear polarized light by the ¼ wave plate 24. At this time, since the phase of the laser light L20 is changed 180°, the laser light L20 is converted into laser light L20 with linear polarization parallel to the record/reproduction surface 30a of the optical disc 30 and perpendicular to the paper plane. The laser light L20 with linear polarization perpendicular to the paper plane successively enters the polarization beam splitters 23a and 23b. In this case, the polarization beam splitter 23a reflects only laser light with polarization direction parallel to the paper plane. Accordingly, the laser light L20 is not reflected toward semiconductor laser element for CD-R 21a. In addition, the polarization beam splitter 23b serves only for laser light of a wavelength near to 650 nm (red light). Accordingly, the laser light L20 is not reflected toward semiconductor laser element for DVD 21b. The laser light L20 passing through the polarization beam splitters 23a and 23b is converted into laser light L20 including the focus error detection (astigmatic method) beam by the cylindrical lens 27, and then is incident on the photoreceptor element 28. Thus, the laser light L20 is detected as the tracking error signal, the focus error signal, and the HF (high frequency) signal.

When a DVD disc is used as the optical disc 30, operation similar to the CD-R disc is performed on the DVD disc. In the case that the DVD disc is used as the optical disc 30, the semiconductor laser element for DVD 21b emits laser light L30 of a wavelength near to 650 nm (red light) with linear polarization parallel to the paper plane. In this case, the laser light L30 is converted into three the laser beams including a tracking error detection beam by the diffraction grating 22b. The polarization beam splitter 23b changes the direction of the laser light L30 toward the optical disc 30.

With the optical system of the CD-R/DVD compatible optical pickup device, the ¼ wave plate according to the first embodiment shown in FIG. 1 is used as the ¼ wave plate 24, thus, the phase conversion characteristic of the ¼ wave plate 24 can be kept near to 90° (within a range of 90°±10°) for the laser light L10 and L30 of the wavelengths near to 790nm (infrared light) used for CD-R and 650 nm (red light) used for DVD. Accordingly, the laser light L10 and L30 can be preferably converted in the ¼ wave plate 24. Therefore, laser light with a polarization direction other than the designed polarization direction is not produced. This can keep reflection of the laser light L20, which is reflected by the record/reproduction surface 30a of the optical disc 30, by the polarization beam splitters 23a and 23b in check. Accordingly, it is possible to keep return of the laser light L20 to the semiconductor laser element for CD-R 21a and the semiconductor laser element for DVD 21b in check. As a result, optical intensity noise (fluctuation of optical intensity) of the semiconductor laser element is kept in check, thus, the characteristics of the CD-R/DVD compatible optical pickup device can be improved. Moreover, since the ¼ wave plate including the aluminum oxide film 3 according to the first embodiment shown in FIG. 1 has environmental resistance characteristics, deterioration of characteristics of the ¼ wave plate can be kept in check even when the ¼ wave plate is used for CD-R/DVD compatible optical pickup device for vehicles.

Second Embodiment

In a second embodiment, an example of the present invention applied to a ½ wave plate is described with reference to FIG. 41, dissimilarly to the aforementioned first embodiment.

Figure 41:
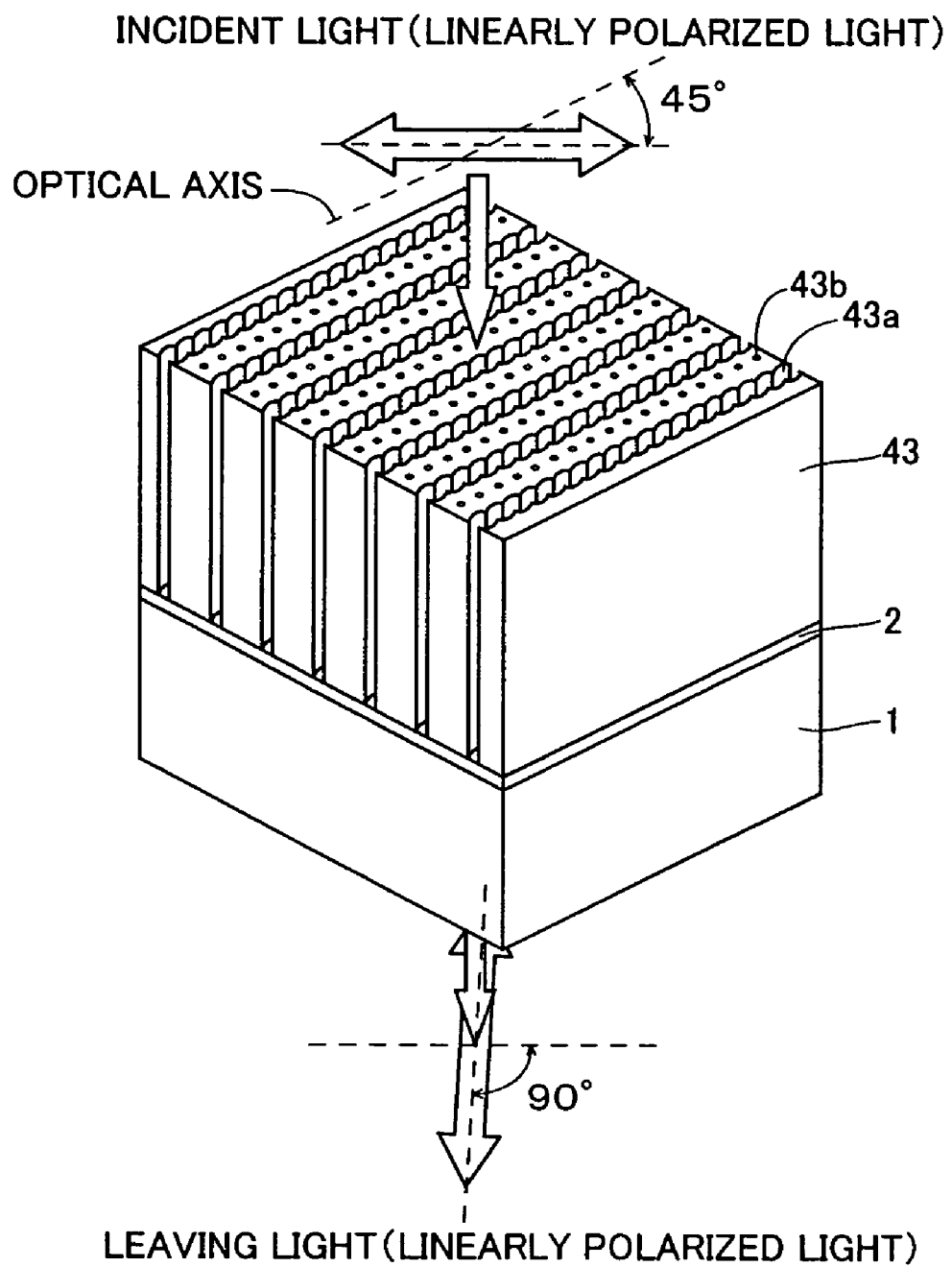
FIG. 41 is a perspective view showing construction of a ½ wave plate according to a second embodiment of the present invention.

That is, as shown in FIG. 41, the ½ wave plate according to the second embodiment designed to have a phase difference of about 180° between the polarization components parallel to, and perpendicular to the optical axis, and thus serves to rotate polarization incident linearly polarized light inclined about 45° relative to the optical axis about 90°. The ½ wave plate is an example of the "wave plate" in the present invention.

As for concrete construction of the ½ wave plate according to this second embodiment, the transparent conductor film 2 consisting of ITO or ZnO is formed on the glass substrate 1 similarly to the aforementioned first embodiment.

In the second embodiment, an aluminum oxide film 43 with linear grating groove patterns is formed on the transparent conductor film 2. The thickness of this aluminum oxide film 43 is designed to have twice the thickness of the aluminum oxide film 3 that composes the ¼ wave plate of the first embodiment shown in FIG. 1. Thus, the phase difference between the polarization components parallel to, and perpendicular to the optical axis of the incident light can be twice (about 180°) the phase difference of the first embodiment (about 90°). The linear grating groove patterns of the aluminum oxide film 43 are formed by linearly connecting micropores similarly to the aforementioned first embodiment. A groove 43a of the linear grating groove patterns of the aluminum oxide film 43 has a depth that reaches the transparent conductor film 2, and is formed in a uniform groove width along the depth direction. In some cases, a plurality of pores 43b are formed on surface portions of the aluminum oxide film 43 located between the grooves 43a. The aluminum oxide film 43 is an example of the "metal oxide film" in the present invention.

When the permissible range of phase difference is set in the range of 180°±20°, the range similar to the first embodiment shown in FIG. 2 shows the range of the effective duty ratio and the period of the linear grating groove patterns (½ wave plate) composed of the aluminum oxide film capable of having preferable phase conversion characteristic for light containing a plurality of different wavelength regions. In this case, the range F1 in FIG. 2 corresponds to a range where the phase difference between two polarization components perpendicular to each other can be set near to 180° (within a range of 180°±20°) for light of all the red, infrared and blue wavelength regions. The range F2 in FIG. 2 corresponds to a range where the phase difference between two polarization components perpendicular to each other can be set near to 180° (within a range of 180°±20°) for light of at least the red and infrared wavelength regions.

In the second embodiment, the effective duty ratio De and the period L1 of the linear grating groove patterns of the aluminum oxide film 43 are set at values within the range F1 (for example, De: 0.88, L1: 0.38 (the coordinate point P in FIG. 2)) specified by the four formulas (1) to (4), similarly to the first embodiment as shown in FIG. 2. That is, the phase difference of the second embodiment (the coordinate point P in FIG. 2) is within the permissible range (180°±20°) in all of the red wavelength region (660 nm), the infrared wavelength region (790 nm) and the blue wavelength region (405 nm).

In the second embodiment, the effective duty ratio De and the period L1 of the linear grating groove patterns of the aluminum oxide film 43 that composes the ½ wave plate as mentioned above are set at values within the range F1 shown in FIG. 2 (for example, De: 0.88, L1: 0.38 (the coordinate point P in FIG. 2). Thus, the phase difference between two polarization components perpendicular to each other can be set near to 180° (within a range of 180°±20°) for light of all the red, infrared and blue wavelength regions. As a result, it is possible to provide a ½ wave plate with preferable phase conversion characteristic over a wide wavelength range. Furthermore, since the aluminum oxide film 43 is an inorganic material, a ½ wave plate with excellent environmental resistance characteristics can be obtained. Therefore, even when the wave plate having the aluminum oxide film 43 with rectilinear grating groove patterns is used under high temperature condition, deterioration of characteristics of the ½ wave plate can be kept in check.

Construction of an optical system of a liquid crystal projector device having the ½ wave plate according to the second embodiment shown in FIG. 41 is now described with reference to FIGS. 42 and 43.

Figure 42:
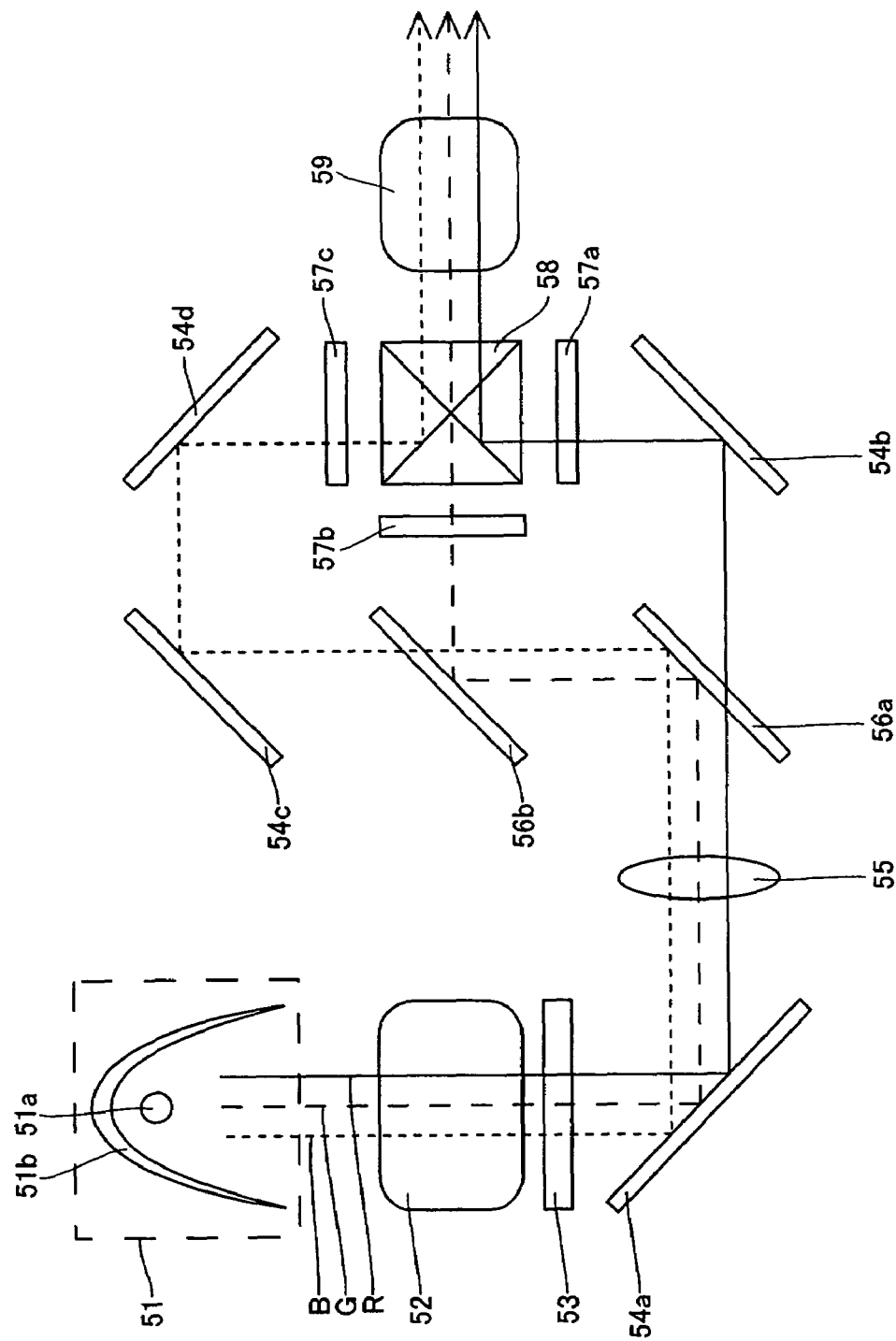
FIG. 42 is a schematic view showing an optical system of a liquid crystal projector device as an optical device including the ½ wave plate according to the second embodiment shown in FIG. 41.

The optical system of the liquid crystal projector device includes a light source portion 51, an integrator lens 52, a polarization conversion element 53, total reflection mirrors 54a–54d, a condensing lens 55, dichroic mirrors 56a and 56b, liquid crystal panels 57a–57c, a dichroic prism 58, and a projection lens 59, as shown in FIG. 42.

The light source portion 51 includes a light source 51a composed of a metal halide lamp, the halogen lamp, a xenon lamp, or the like, and a reflector 51b. The reflector 51b serves to direct white light with a wide wavelength range emitted from the light source 51a in the predetermined direction. The integrator lens 52 and the condensing lens 55 serve to convert the single peak intensity distribution of the white light emitted from the light source 51a into flat intensity distribution. The integrator lens 52 has a structure of combined two-dimensional micro lens arrays (not shown).

The polarization conversion element 53 serves to convert polarization directions of light into a single polarization direction. The polarization conversion element 53 includes a ½ wave plate 61, a polarization beam splitter array 62 with a plurality of polarization separating surfaces 62a, and a light shielding plate 63, as shown in FIG. 43. The ½ wave plate according to the second embodiment shown in FIG. 41 is used as the ½ wave plate 61. The ½ wave plate 61 is an example of the "wave plate" in the present invention.

As shown in FIG. 42, the total reflection mirrors 54a–54d serve to reflect all light. The dichroic mirror 56a serves to pass only red light and to reflect green light and blue light. The dichroic mirror 56b serves to pass only blue light and to reflect red light and green light. The liquid crystal panels 57a–57c serve to spatially modulate red light, green light and blue light, respectively. The dichroic prism 58 serves to composite the spatially modulated red light, green light, and blue light. The projection lens 59 serves to project the composite red light, green light and blue light onto a screen.

Operation of the optical system of the liquid crystal projector device having the ½ wave plate according to the second embodiment shown in FIG. 41 is now described with reference to FIGS. 42 and 43.

First, the white light containing components of the red light R, the green light G, and the blue light B emitted from the light source 51a is directed toward the integrator lens 52 side by the reflector 51b. The white light containing components of the red light R, the green light G, and the blue light B passes the integrator lens 52, and then enters the polarization conversion element 53. Thus, the polarization directions of the white light containing components of the red light R, the green light G, and the blue light B are converted into a single polarization direction.

Figure 43:
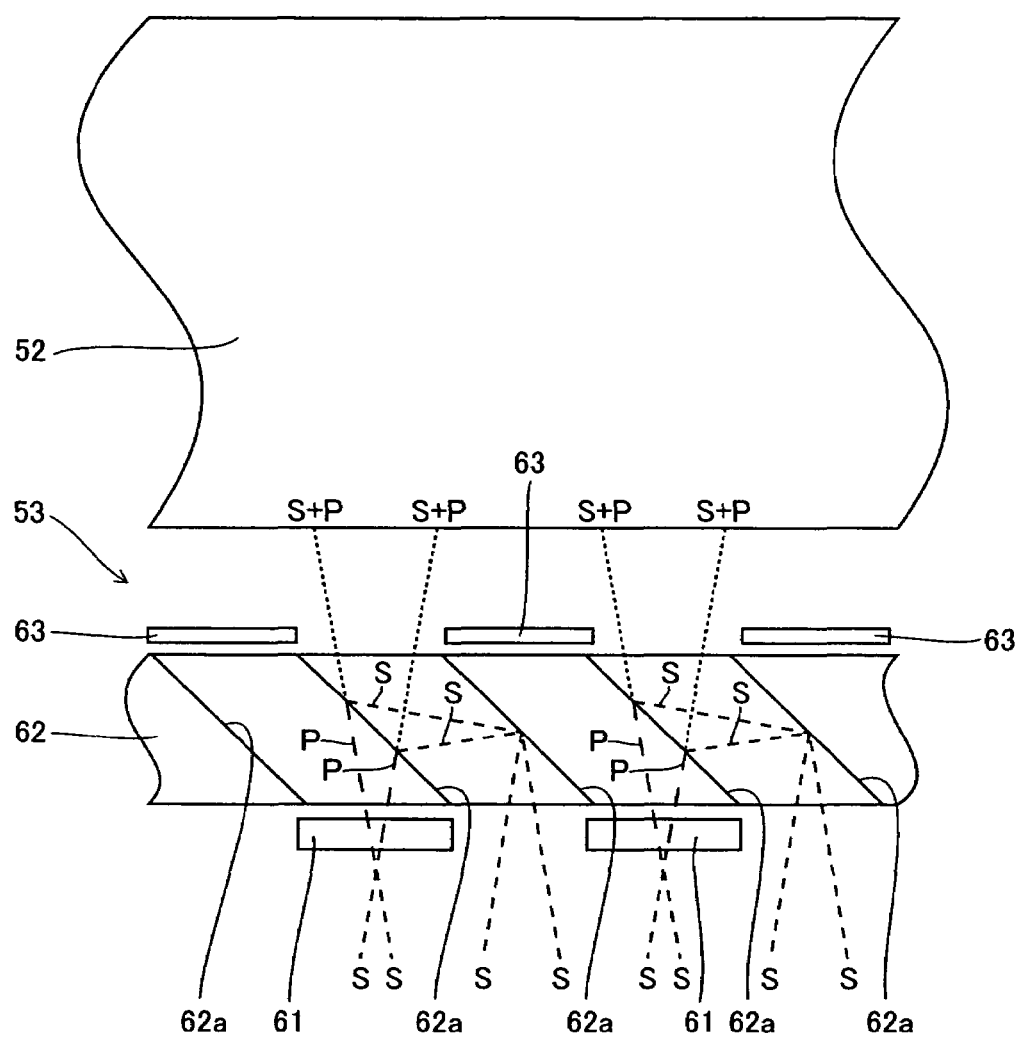
FIG. 43 is a schematic view showing construction of a polarization conversion element of the optical system of the liquid crystal projector device shown in FIG. 42.

Specifically, as shown in FIG. 43, a plurality of light components having different polarization directions (for example, S-polarized light and P-polarized light) coexist in the white light emitted from the light source 51a (see FIG. 42). When the S-polarized light and P-polarized light enter the polarization beam splitter array 62, the S-polarized light is reflected by one of the polarization separating surface 62a, and then leaves from the polarization beam splitter array 62 by being reflected by the polarization separating surface 62a adjacent to it. On the other hand, the P-polarized light passes through the polarization separating surface 62a, and then leaves from the polarization beam splitter array 62. After that, the P-polarized light is converted into S-polarized light by the ½ wave plate 61. Thereby, all the light that enters the polarization conversion element 53 is converted into S-polarized light.

Subsequently, the white light containing components of the red light R the green light G, and the blue light B that is converted into linearly polarized light with a single polarization direction is changed its direction by the total reflection mirror 54a, and then passes the condensing lens 55, as shown in FIG. 42. The integrator lens 52 and the condensing lens 55 convert the single peak intensity distribution of the white light containing components of the red light R, the green light G, and the blue light B into flat intensity distribution.

The red light R passes through the dichroic mirror 56a, and then is reflected by the total reflection mirror 54b, and thus is changed its direction toward the liquid crystal panel 57a. The green light G is reflected by the dichroic mirror 56a, and is further reflected by the dichroic mirror 56b, and thus is changed its direction toward the liquid crystal panel 57b. The blue light B is reflected by the dichroic mirror 56a and then passes through the dichroic mirror 56b. After that, the blue light B is successively reflected by the total reflection mirrors 54c and 54d, and is changed its direction toward the liquid crystal panel 57c. Accordingly, the white light is separated into the red light R. the green light G, and the blue light B, and they enters the liquid crystal panels 57a–57c, respectively. The dichroic prism 58 composites the red light R, the green light G and the blue light B that are spatially modulated by the liquid crystal panels 57a–57c. Consequently, the composite red light R, the green light G and the blue light B are projected onto the screen by the projection lens 59.

With the optical system of the liquid crystal projector device, the ½ wave plate according to the second embodiment shown in FIG. 41 is used as the ½ wave plate 61 as mentioned above. This can keep the phase conversion characteristic of the ½ wave plate 61 in near to 180° (within a range of 180°±20°) for red light R, green light G and blue light B. Thus, conversion of red light R, green light G and blue light B in the ½ wave plate 61 can be preferably performed. Therefore, light with a polarization direction other than the designed polarization direction is not produced. Accordingly, since increase of light with a polarization direction that cannot enter the liquid crystal panels 57a–57c can be kept in check, reduction of the efficiency of light utilization can be kept in check. As a result, deviation of color and reduction of luminosity caused by reduction of the efficiency of light utilization can be kept in check, thus, it is possible to improve the characteristics of the liquid crystal projector device. Moreover, since the ½ wave plate including the aluminum oxide film 43 according to the second embodiment shown in FIG. 41 has environmental resistance characteristics, deterioration of characteristics of the ½ wave plate can be kept in check even when the ½ wave plate is used for a liquid crystal projector device, the inside of which becomes high temperature caused by a light source 51a.

Third Embodiment

Figure 44:
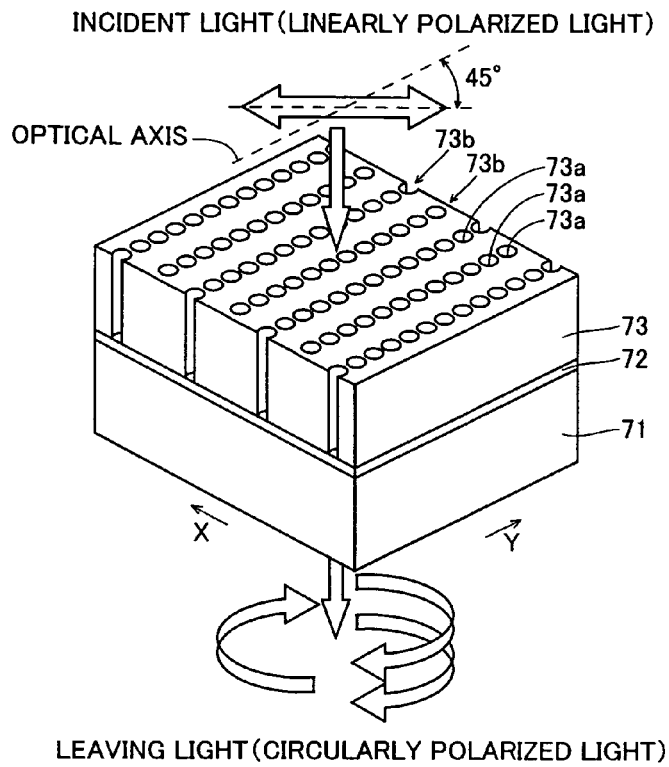
FIG. 44 is a perspective view showing construction of a ¼ wave plate according to a third embodiment of the present invention.

In a third embodiment, the following description describes the case where an aluminum oxide film having grating pore patterns with a plurality of micropores that are arranged in the form of a triangular lattice is used as an aluminum oxide film composing a wave plate with reference to FIG. 44, dissimilarly to the aforementioned first and second embodiments. A wave plate according to the third embodiment designed to have a phase difference of about 90° between the polarization components parallel to, and perpendicular to the optical axis (the direction of an arrow Y), and thus serves to convert incident linearly polarized light inclined about 45° relative to the optical axis (the direction of the arrow Y) into circularly polarized light as leaving light, similarly to the aforementioned first embodiment.

As for concrete construction of the ¼ wave plate according to the third embodiment, a transparent conductor film 72 consisting of ITO or ZnO is formed on a glass substrate 71 as shown in FIG. 44. The glass substrate 71 is an example of the "substrate" in the present invention.

In the third embodiment, an aluminum oxide film 73 having the grating pore patterns with the plurality of micropores 73a that are arranged in the form of a triangular lattice is formed on the transparent conductor film 72. The plurality of micropores 73a composing the grating pore patterns of this aluminum oxide film 73 are spaced at a predetermined center-to-center distance of pore (micropore interval) from each other containing the case that the micropores 73a adjacent to each other are not connected to each other in the direction of the arrow Y (the direction that the optical axis extends), and are arranged in columns along the direction of the arrow Y, and compose micropore columns 73b. A plurality of the micropore columns 73b are arranged with an interval (period) that is larger than the micropore interval (center-to-center distance) of the micropores 73a adjacent to each other in the direction of an arrow X that is perpendicular to the direction of the arrow Y. The micropore 73a has a depth that reaches the transparent conductor film 72, and is formed in a uniform diameter along the depth direction. The aluminum oxide film 73 is an example of the "metal oxide film" in the present invention. The micropore 73a is an example of a "pore" in the present invention, and the micropore column 73b is an example of a "pore column" in the present invention.

Figure 45:
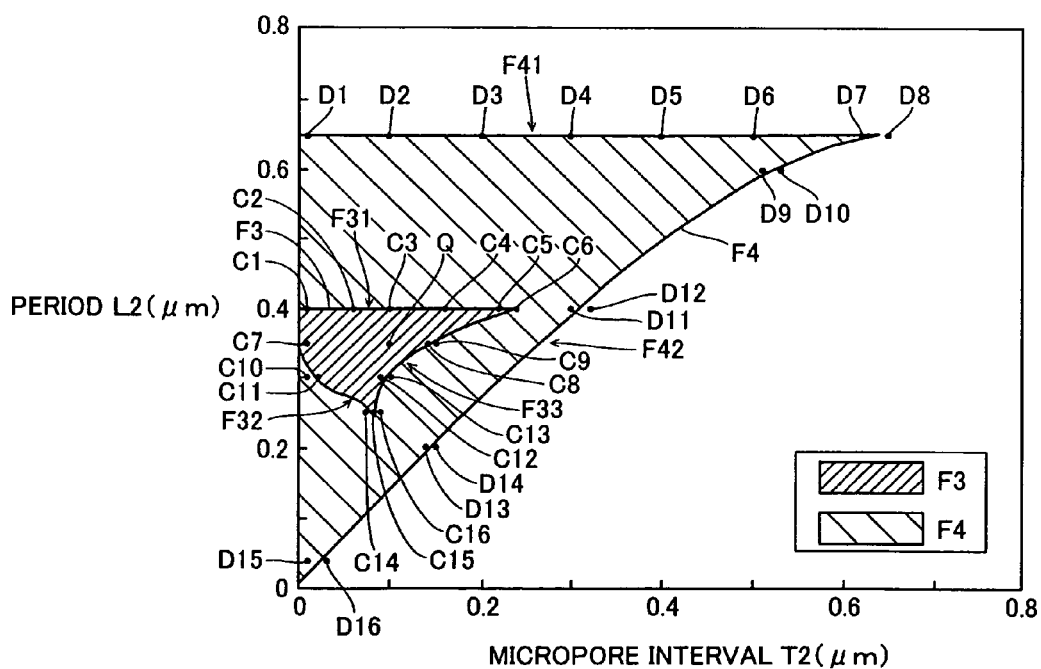
FIG. 45 is a graph showing the range of the microspore interval and the period of the ¼ wave plate having preferable phase conversion characteristic for light corresponding to a plurality of different wavelength regions.

The following description describes a-method of specifying the range of the micropore interval and the period of the grating pore patterns (¼ wave plate) composed of the aluminum oxide film with preferable phase conversion characteristic for light containing a plurality of different wavelength regions with reference to FIGS. 44 to 79. The range F3 in FIG. 45 is a range where the phase difference between two polarization components perpendicular to each other can be set near to 90° (within a range of 90°±10°) for light of all the red, infrared and blue wavelength regions. The range F4 in FIG. 45 is a range where the phase difference between two polarization components perpendicular to each other can be set near to 90° (within a range of 90°±10°) for light of at least the red and infrared wavelength regions. The range F3 is an example of a "second range" in the present invention, and the range F4 is an example of a "first range" in the present invention.

Figure 46:
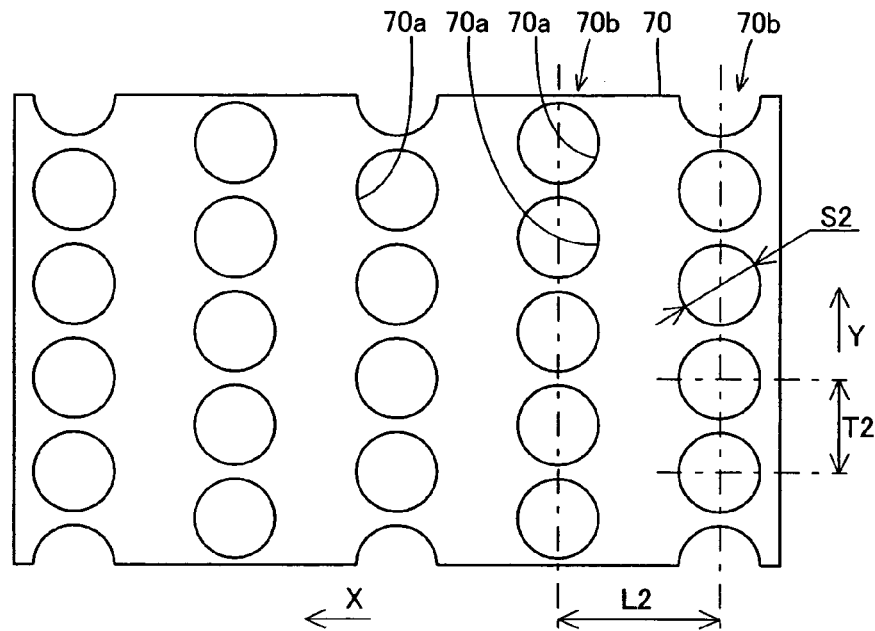
FIG. 46 is an enlarged plan view of grating pore pattern for explanation to define the microspore interval and the period.
Figure 47:
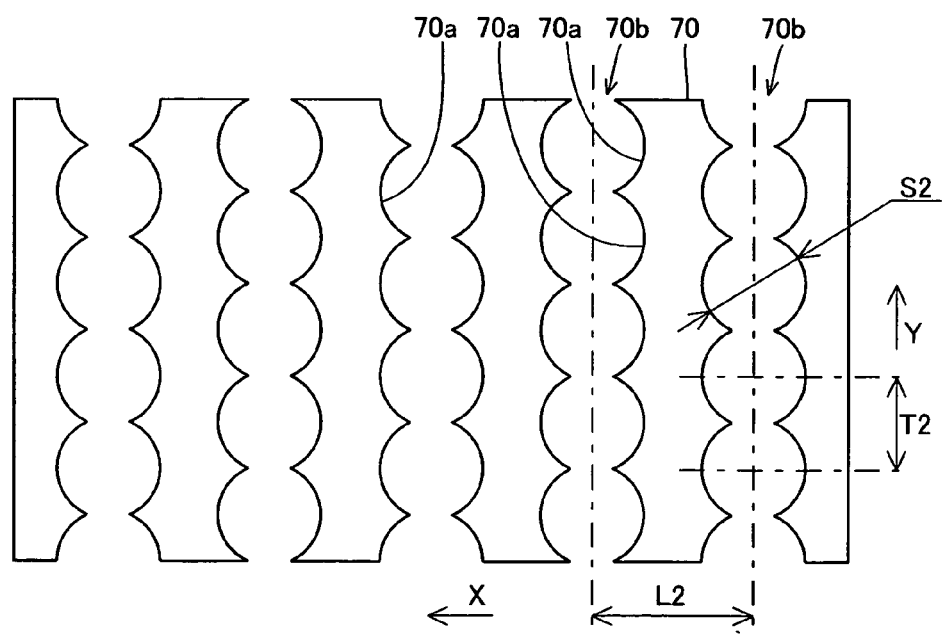
FIG. 47 is an enlarged plan view of grating groove pattern for explanation to define the microspore interval and the period.
Figure 48:
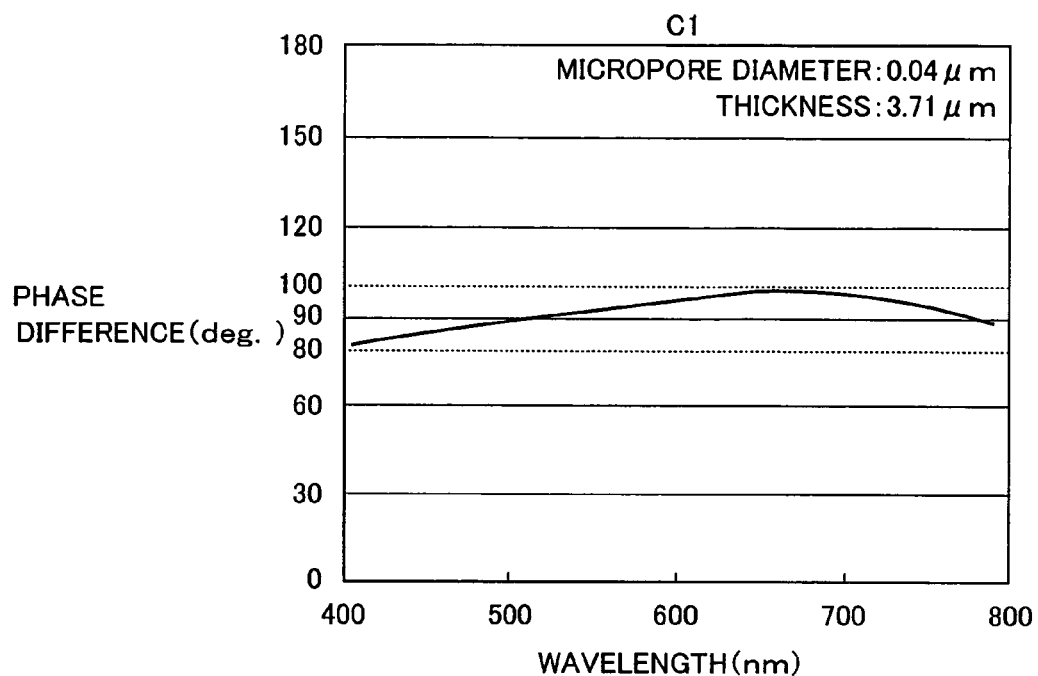
FIGS. 48 to 63 show simulation results of relationship between a wavelength and a phase difference of the coordinate points C1 to C16 to define the range shown in FIG. 45.
Figure 49:
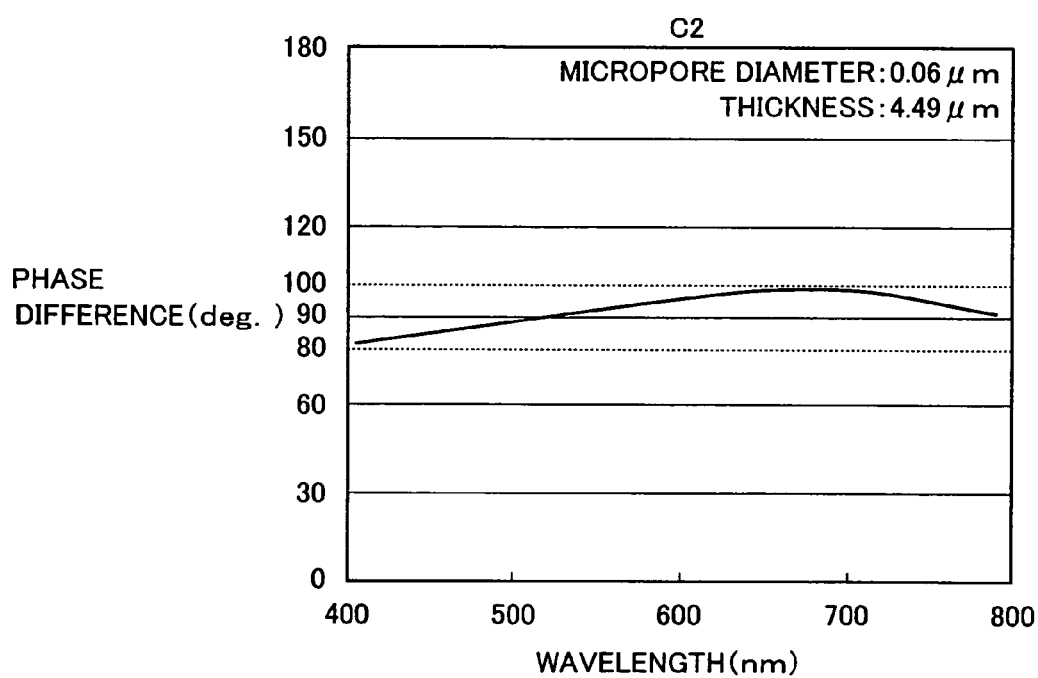
Figure 50:
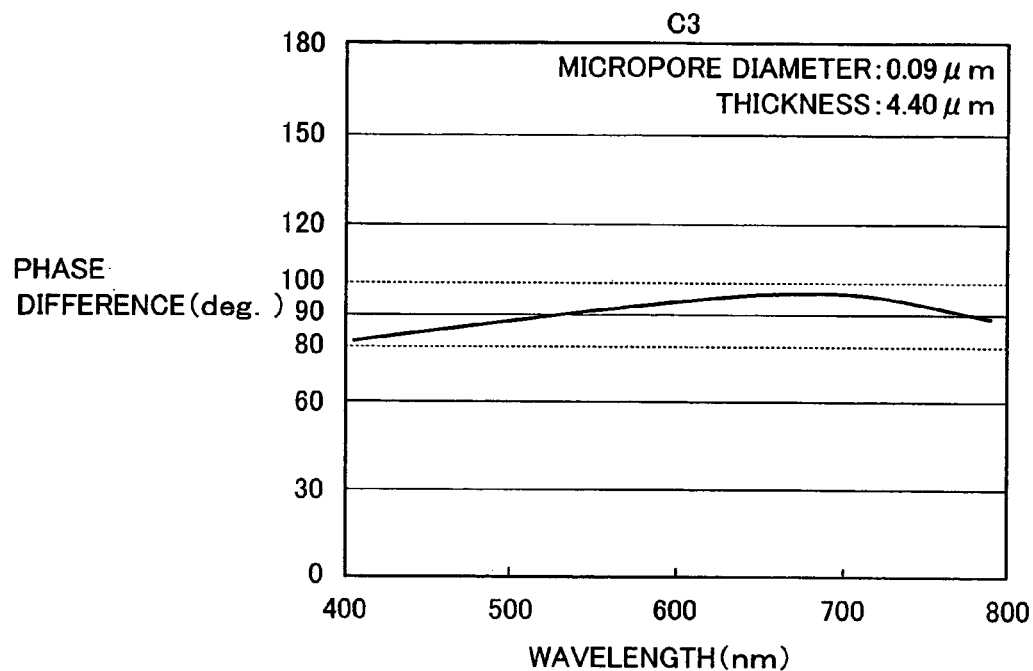
Figure 51:
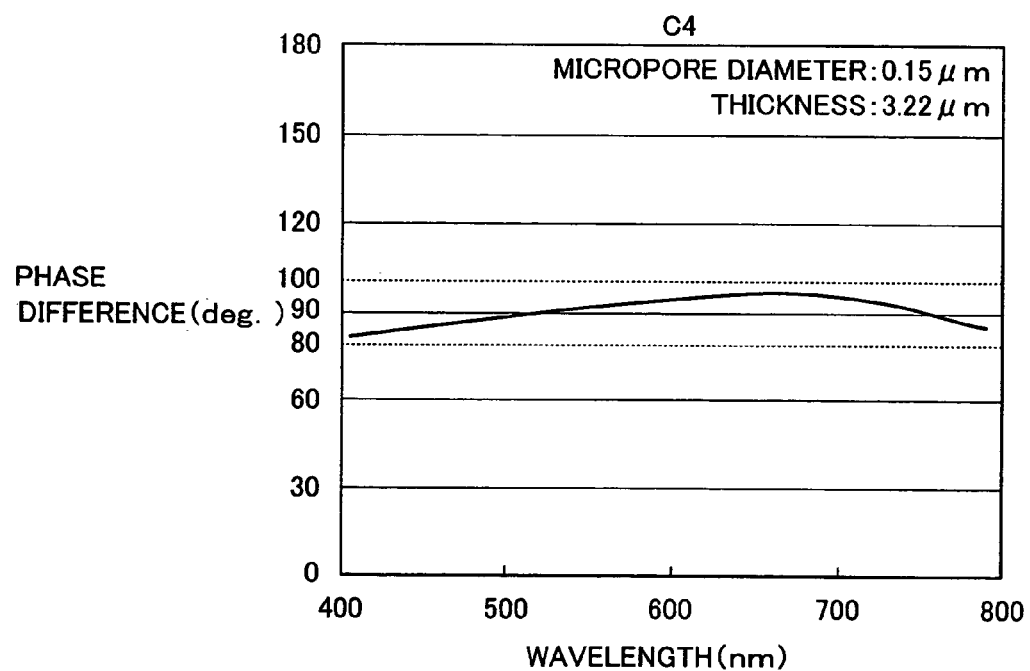
Figure 52:
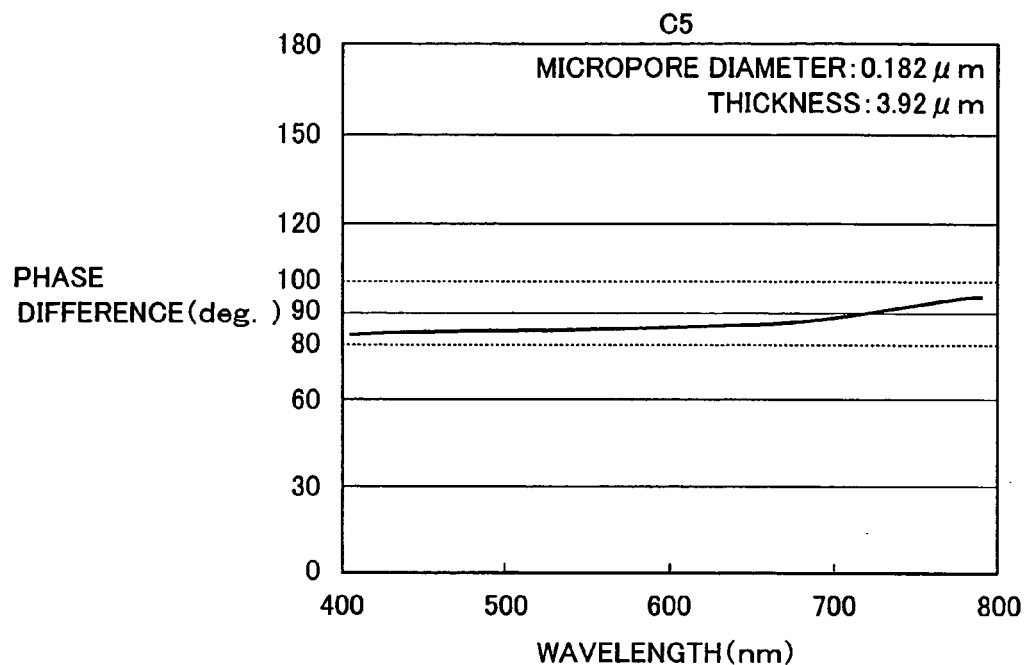
Figure 53:
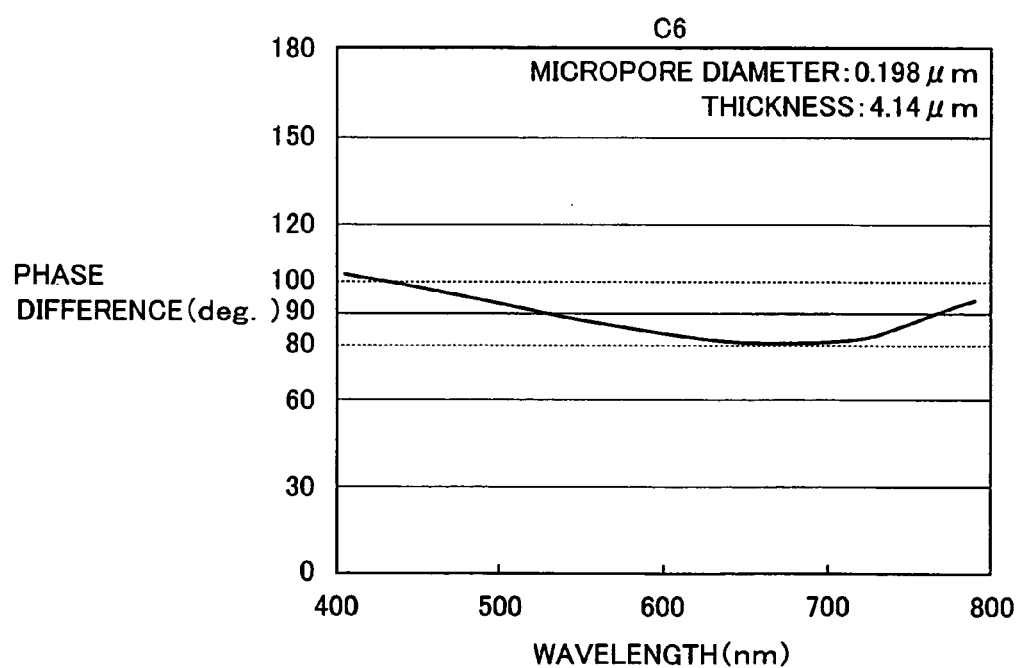
Figure 54:
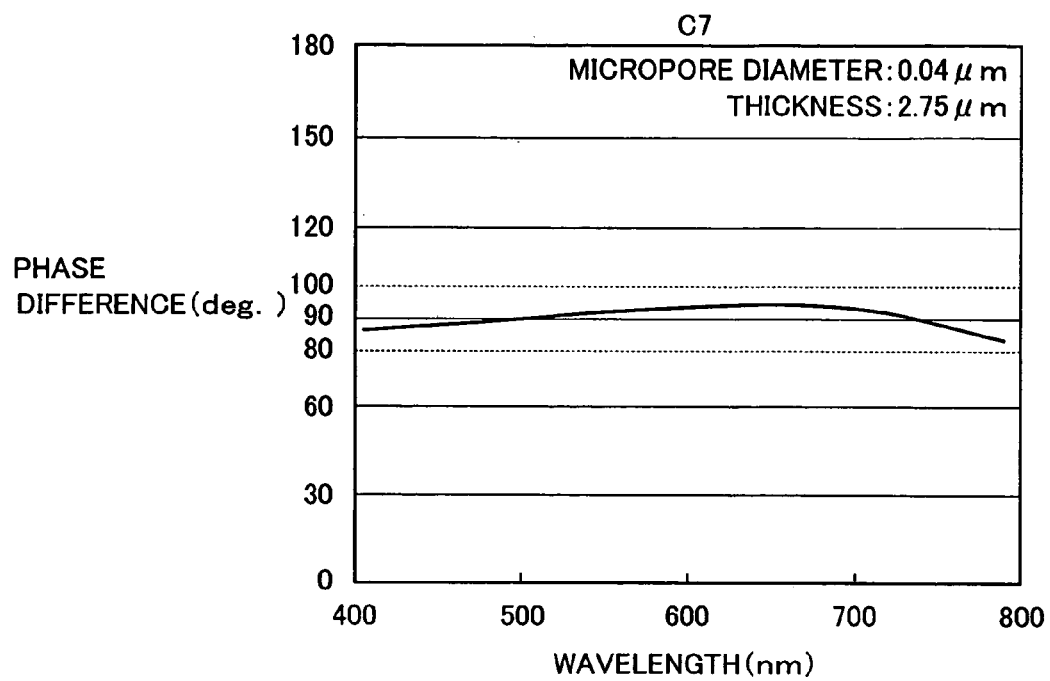
Figure 55:
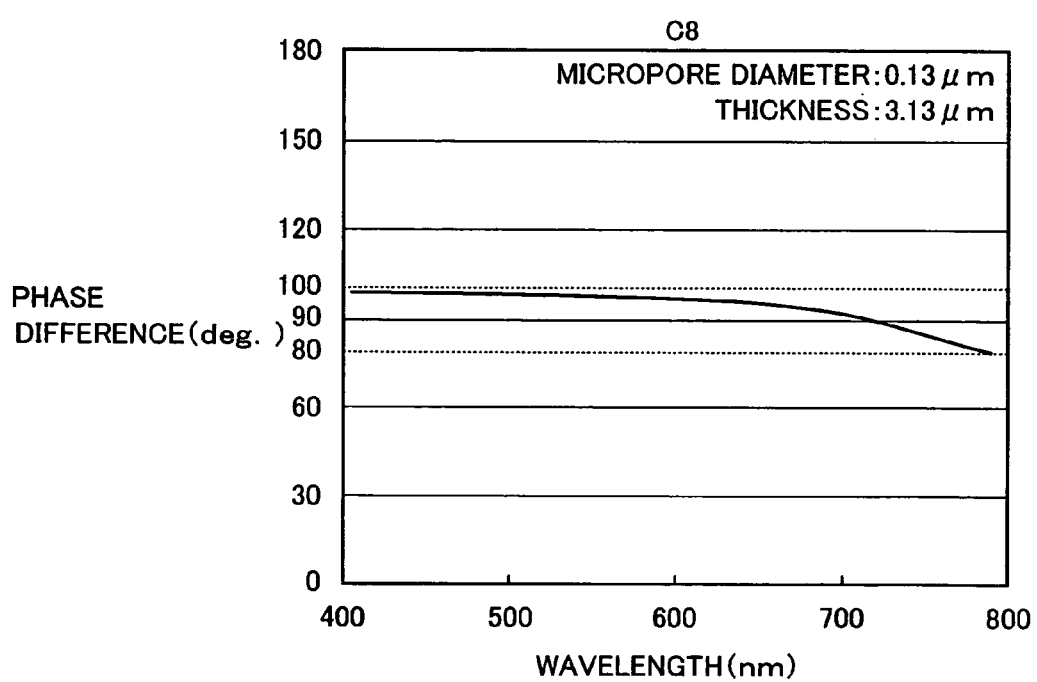
Figure 56:
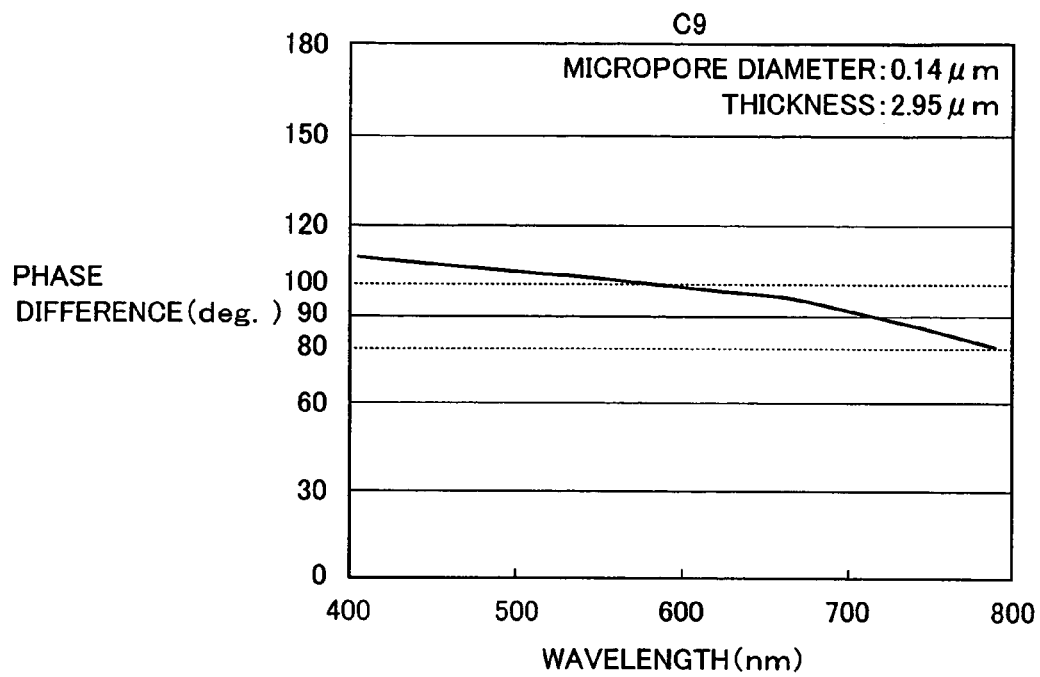
Figure 57:
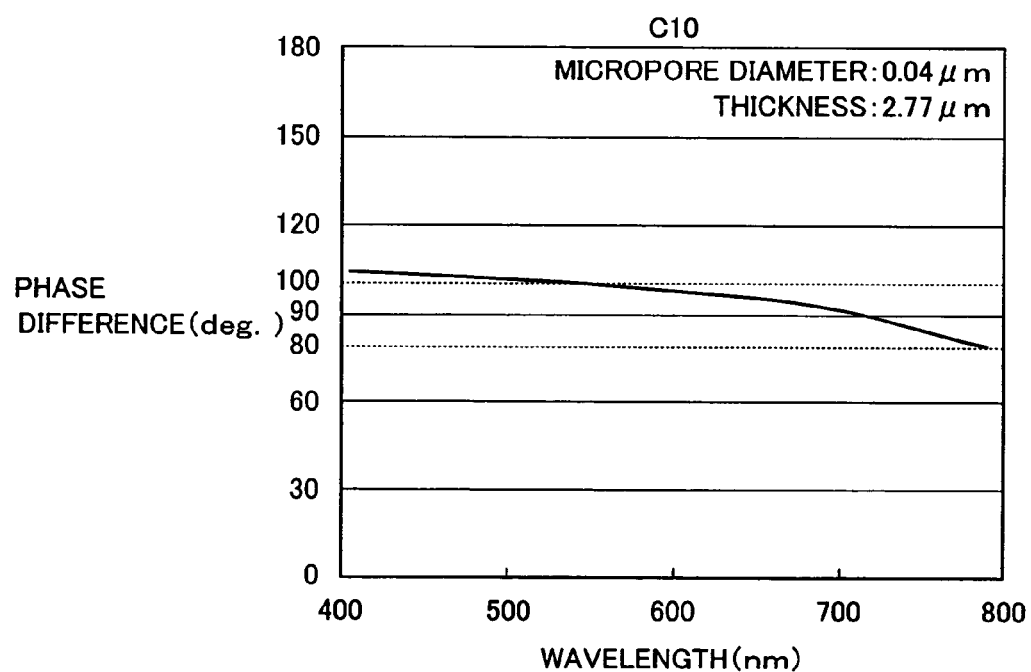
Figure 58:
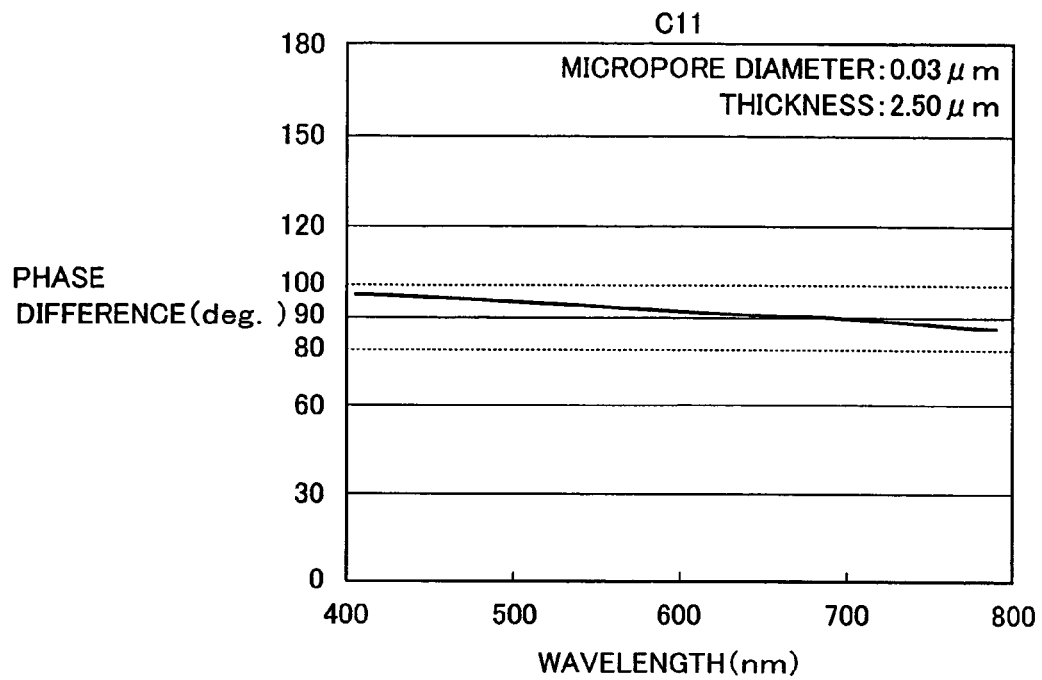
Figure 59:
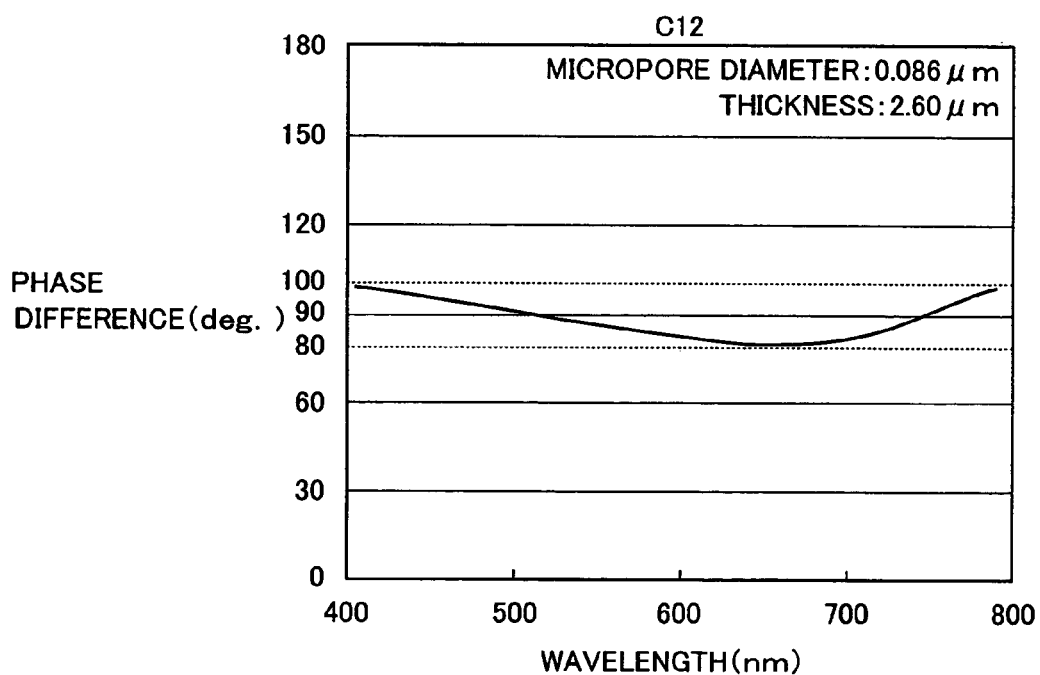
Figure 60:
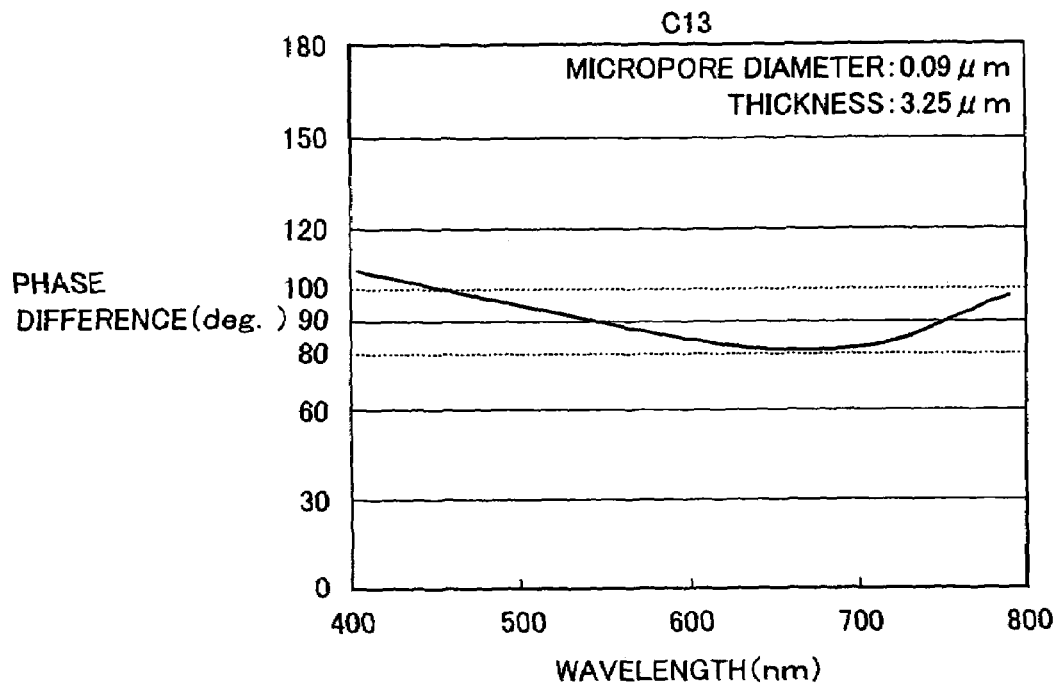
Figure 61:
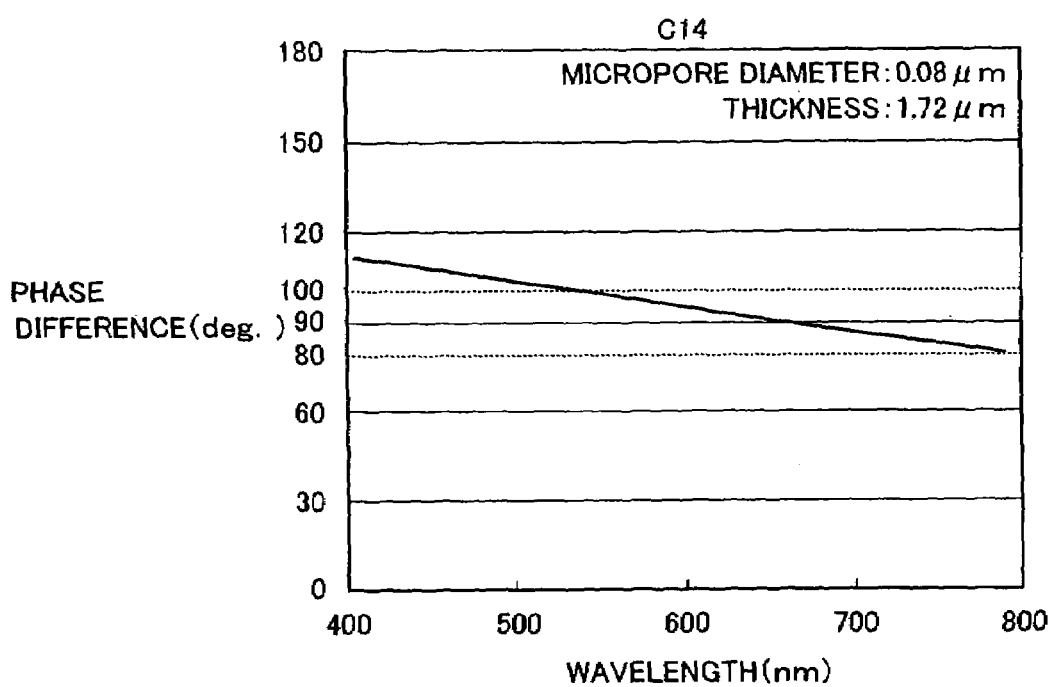
Figure 62:
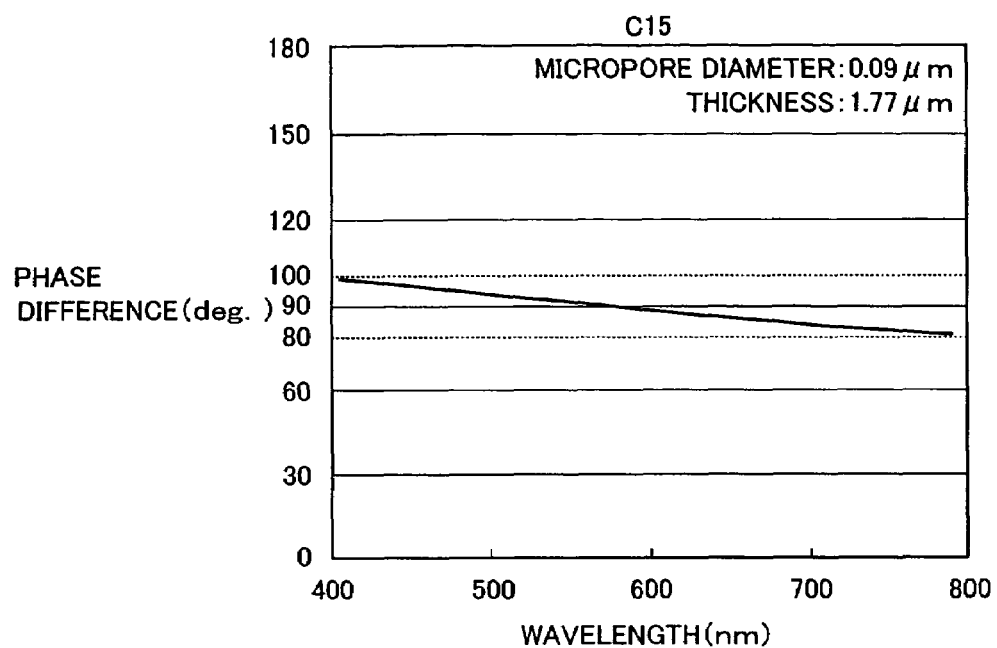
Figure 63:
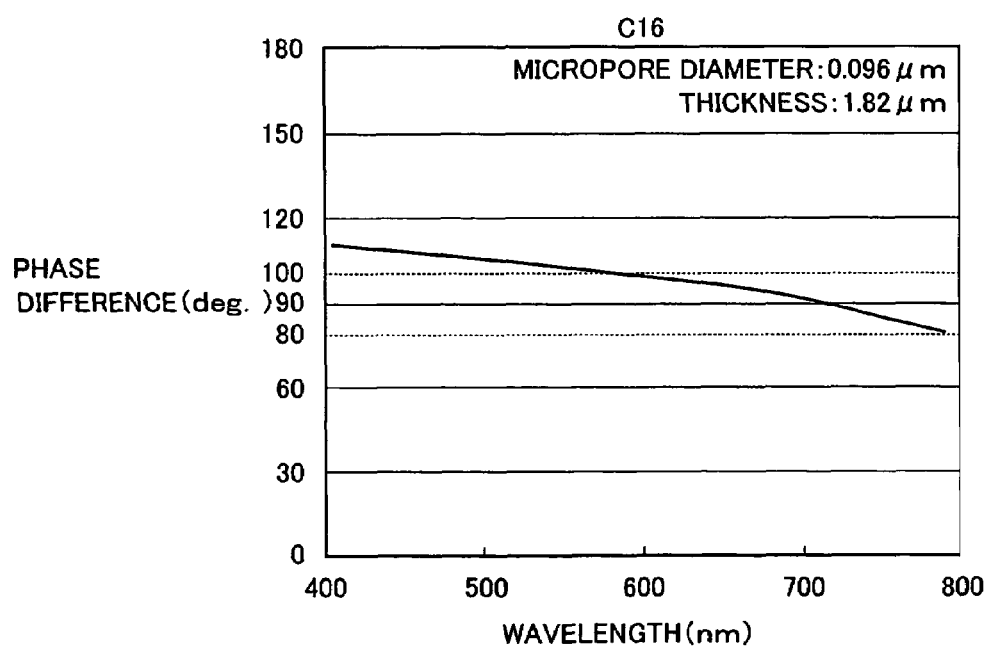
Figure 64:
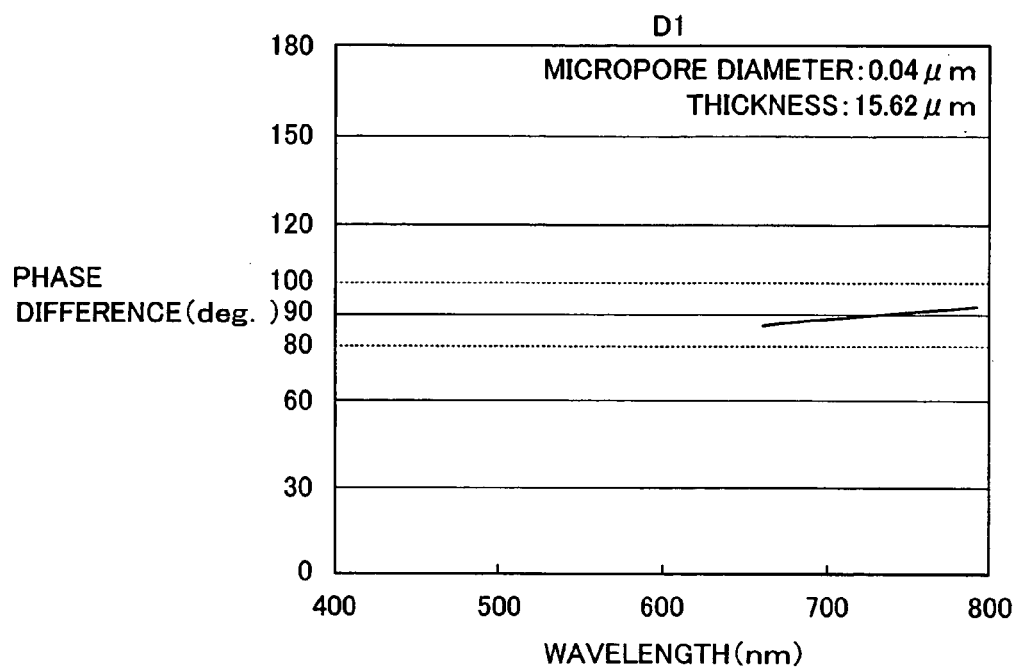
FIGS. 64 to 79 show simulation results of relationship between a wavelength and a phase difference of the coordinate points D1 to D16 to define the range shown in FIG. 45.
Figure 65:
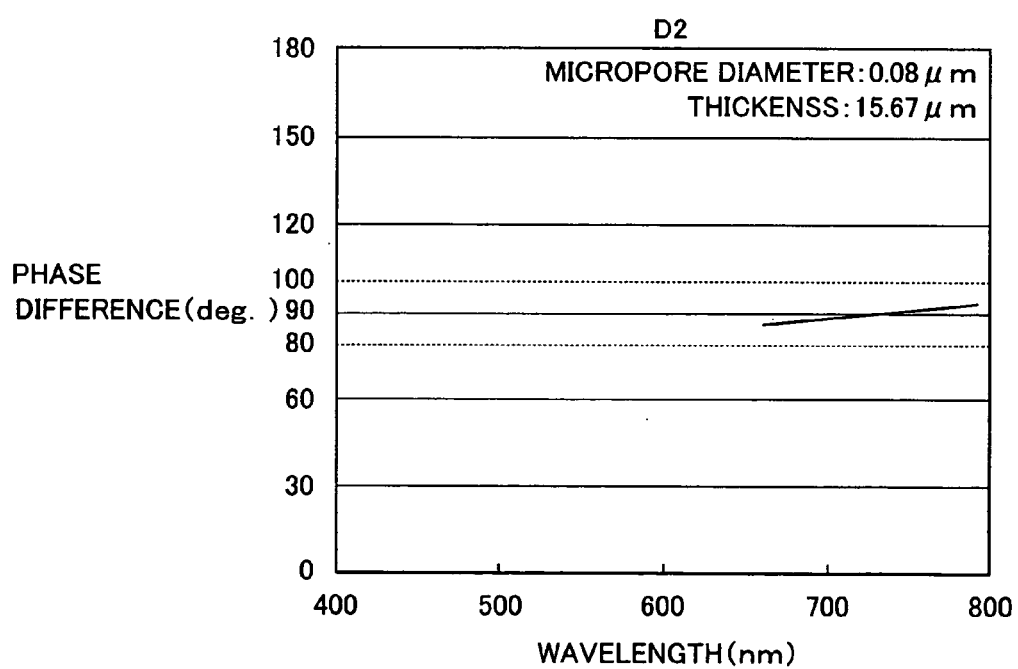
Figure 66:
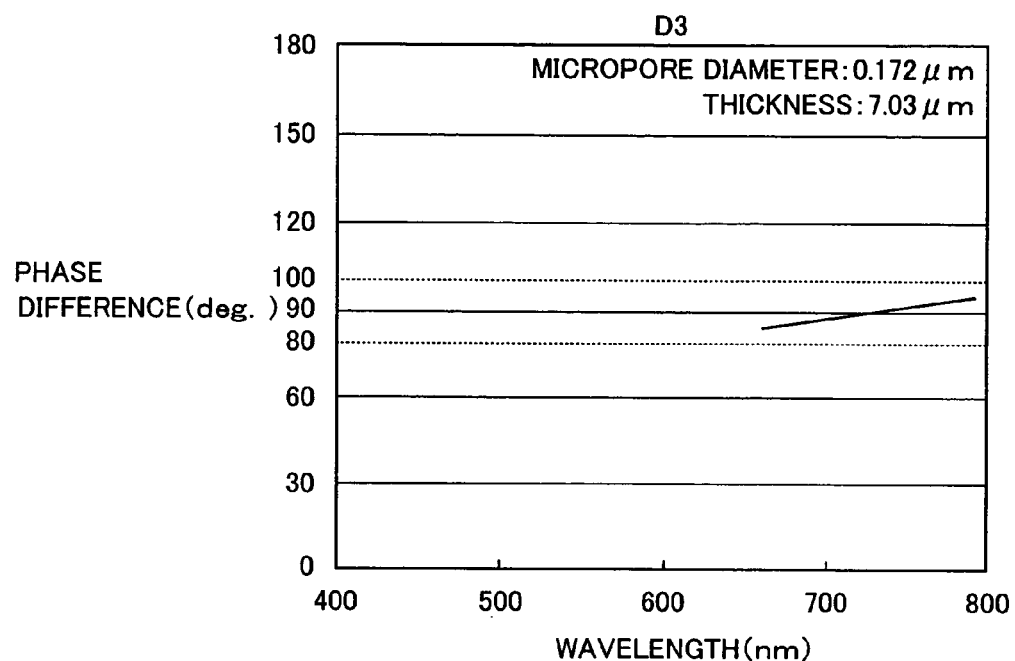
Figure 67:
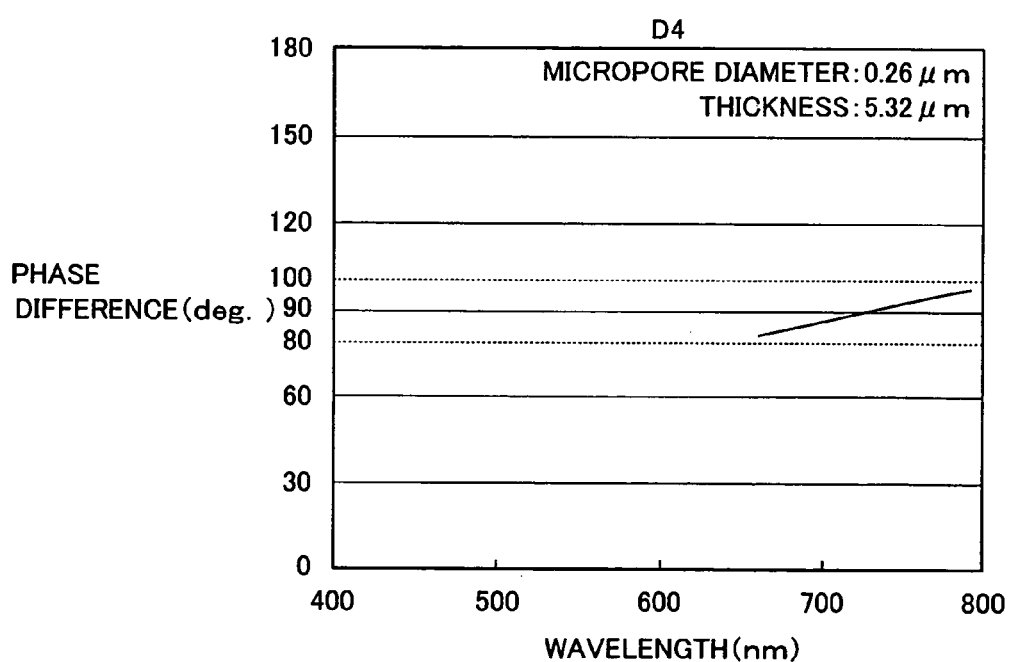
Figure 68:
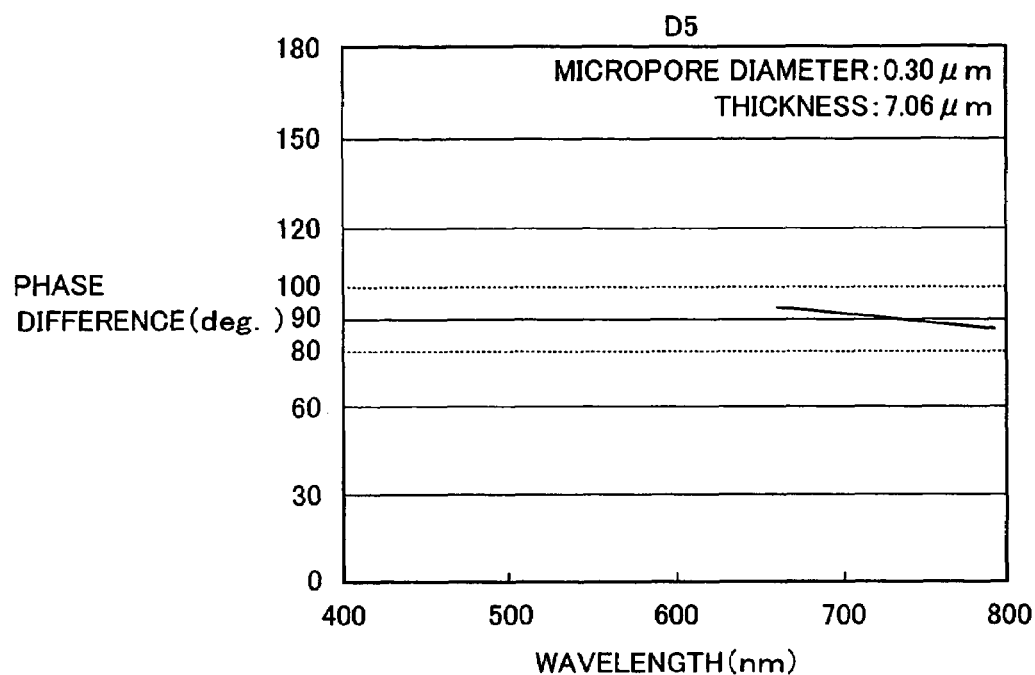
Figure 69:
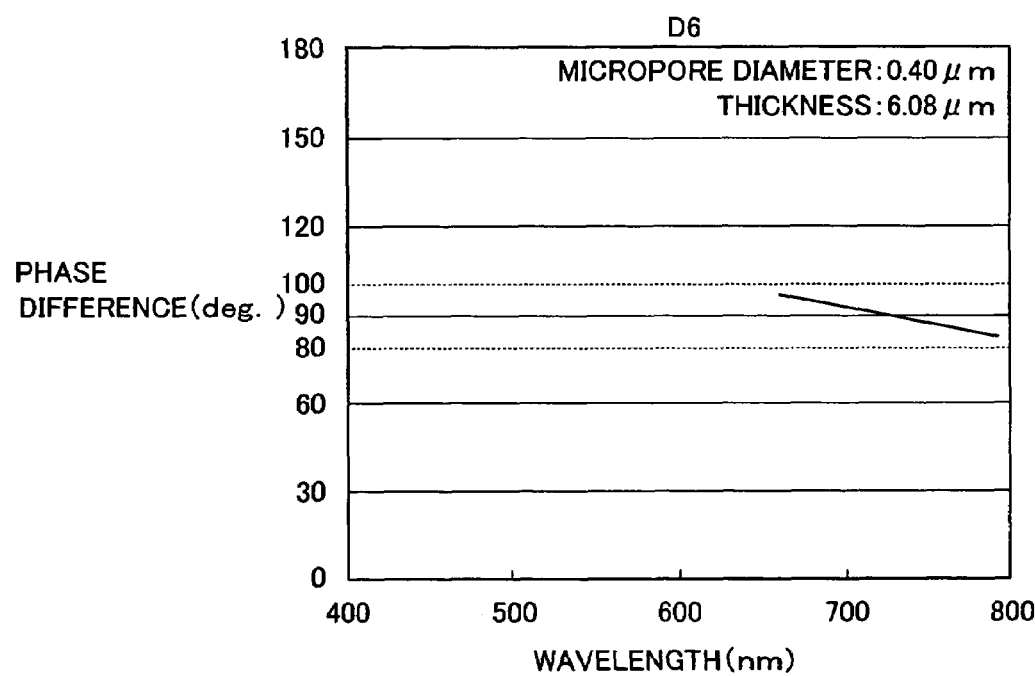
Figure 70:
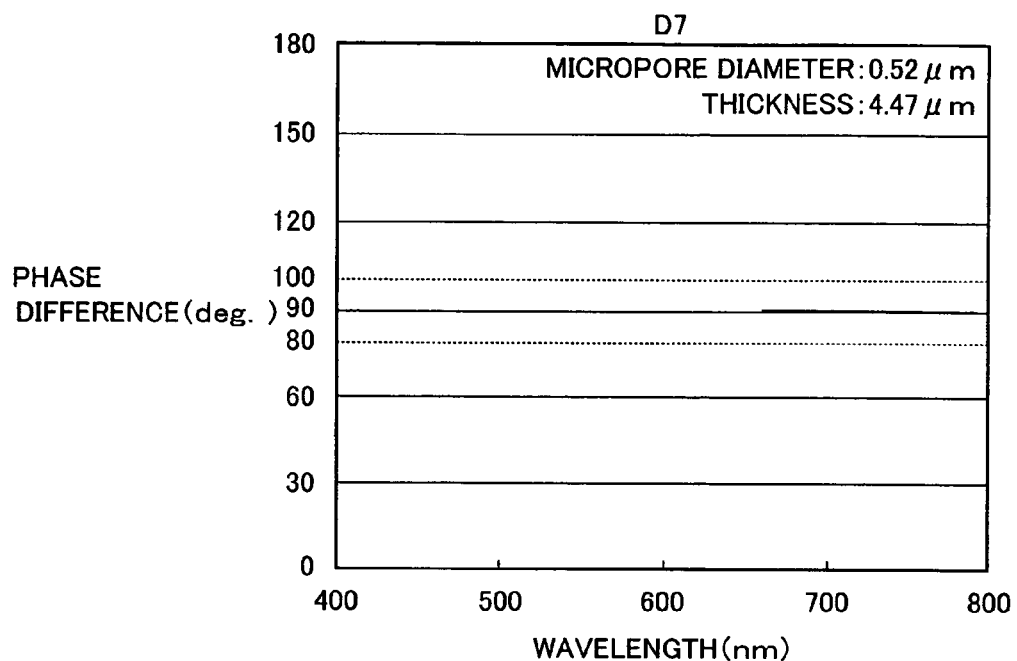
Figure 71:
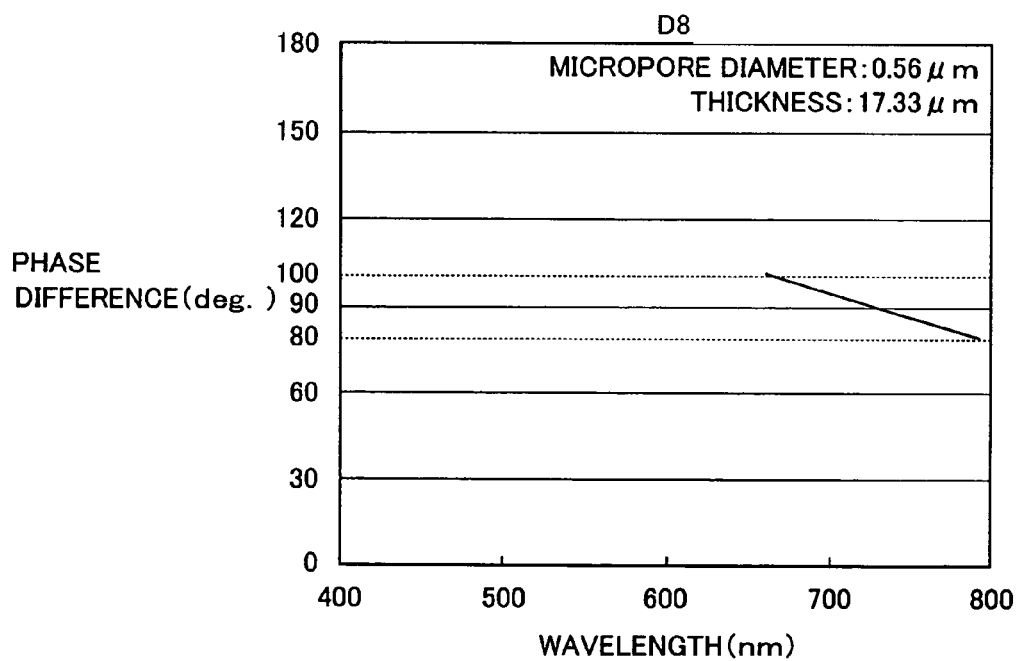
Figure 72:
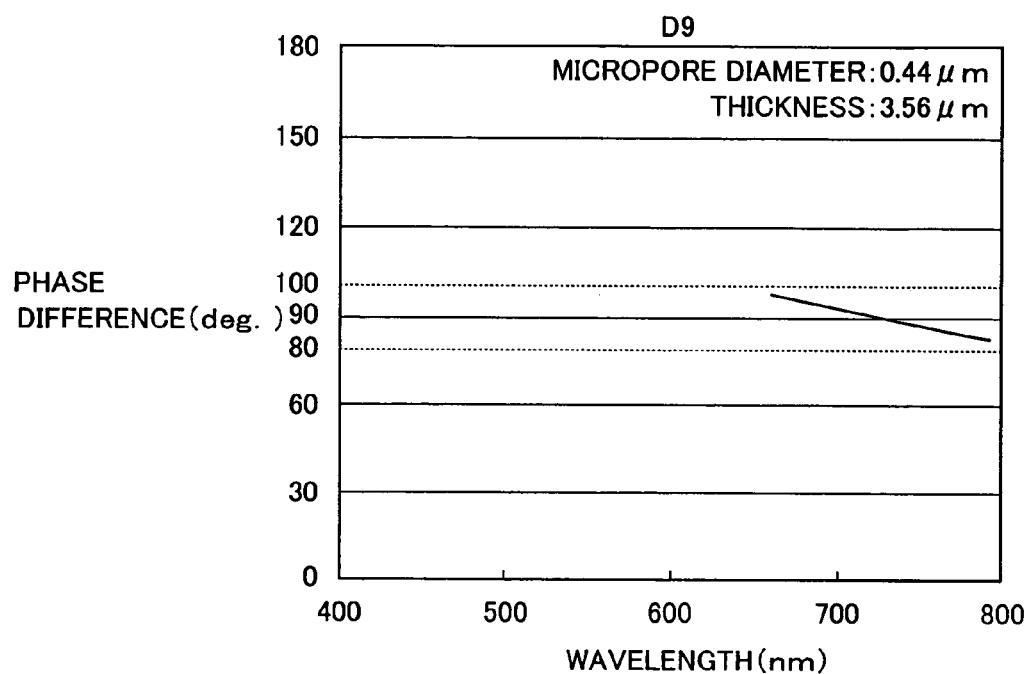
Figure 73:
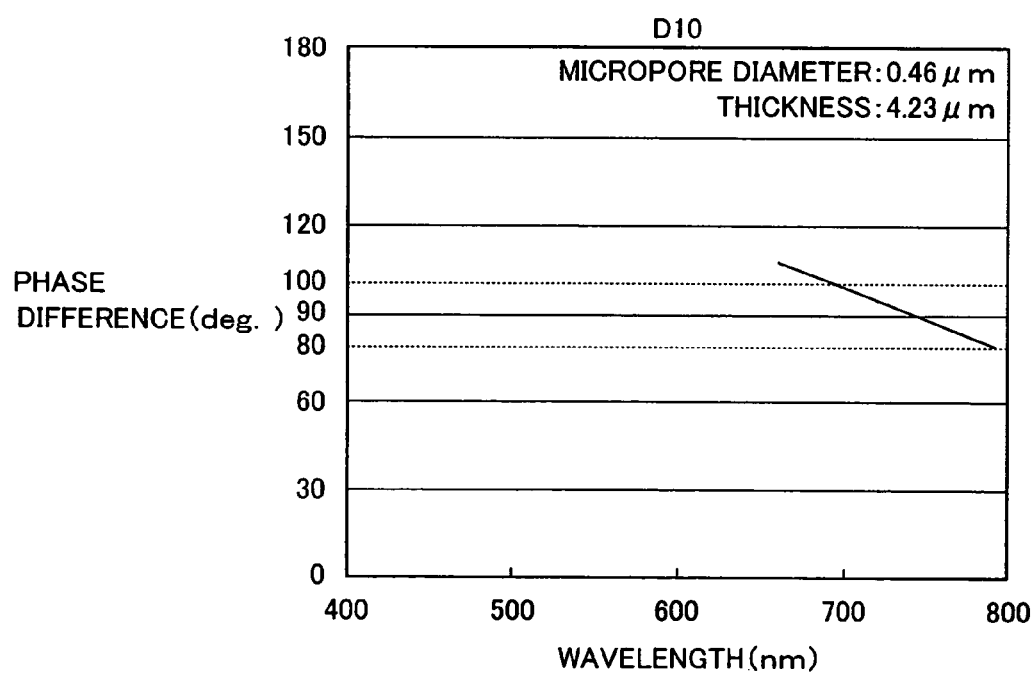
Figure 74:
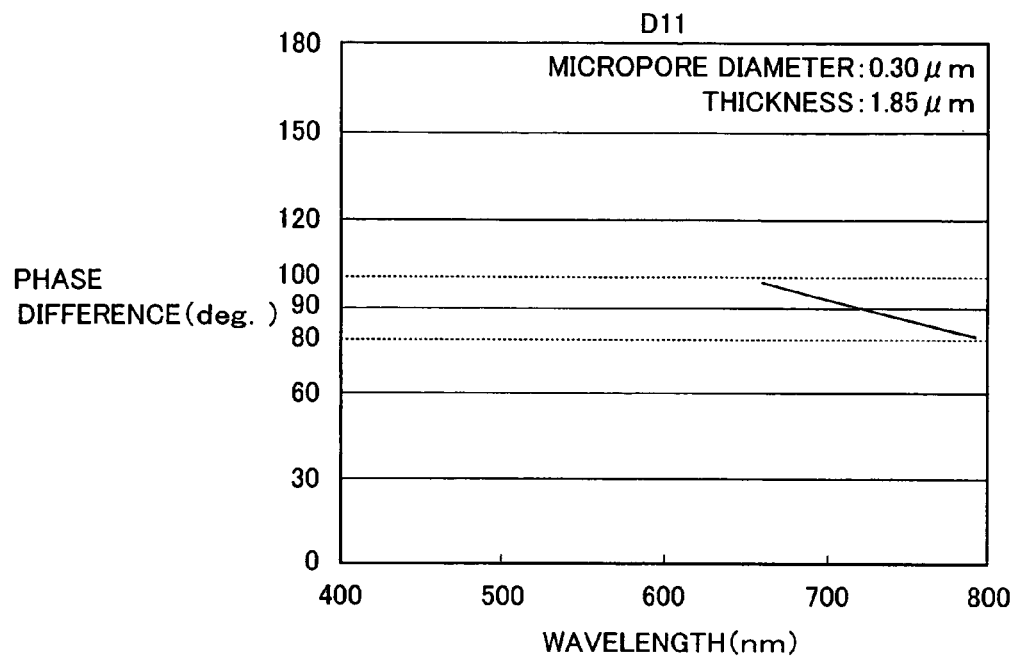
Figure 75:
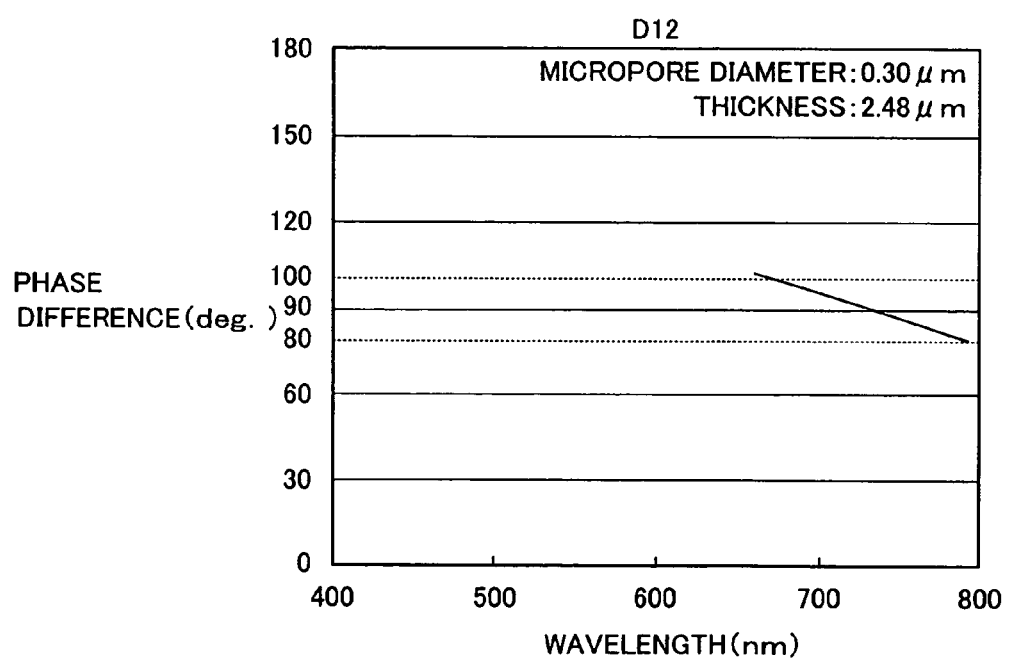
Figure 76:
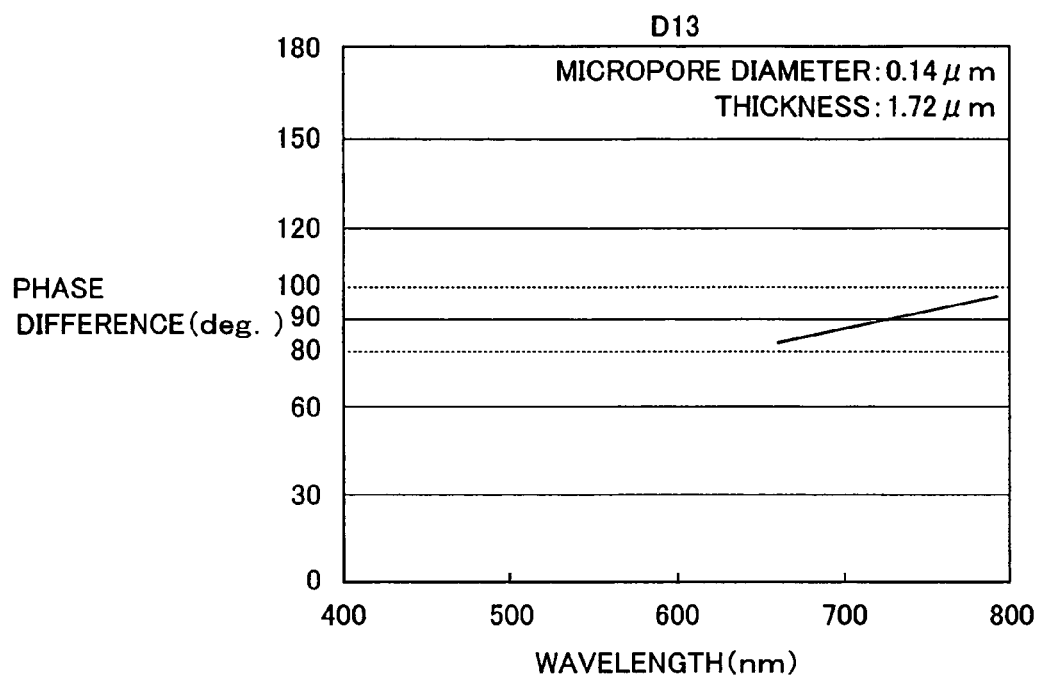
Figure 77:
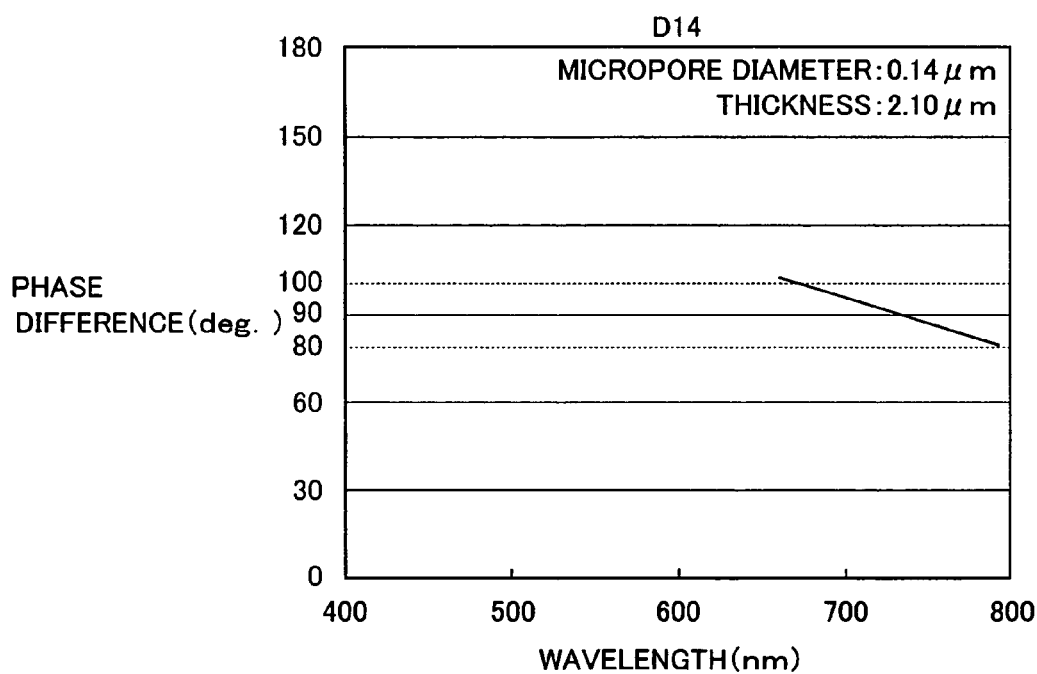
Figure 78:
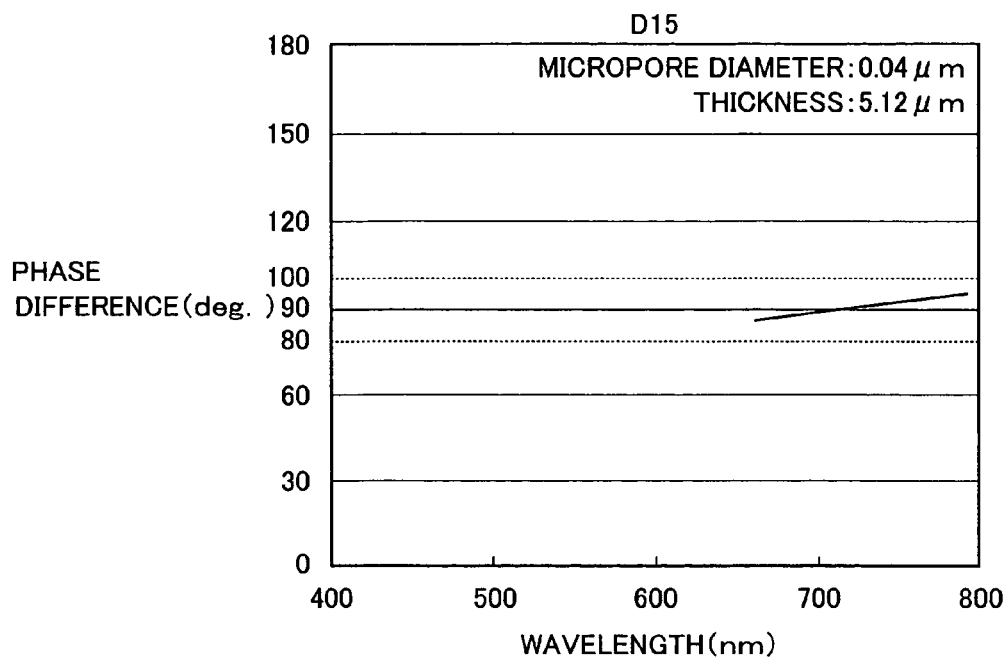
Figure 79:
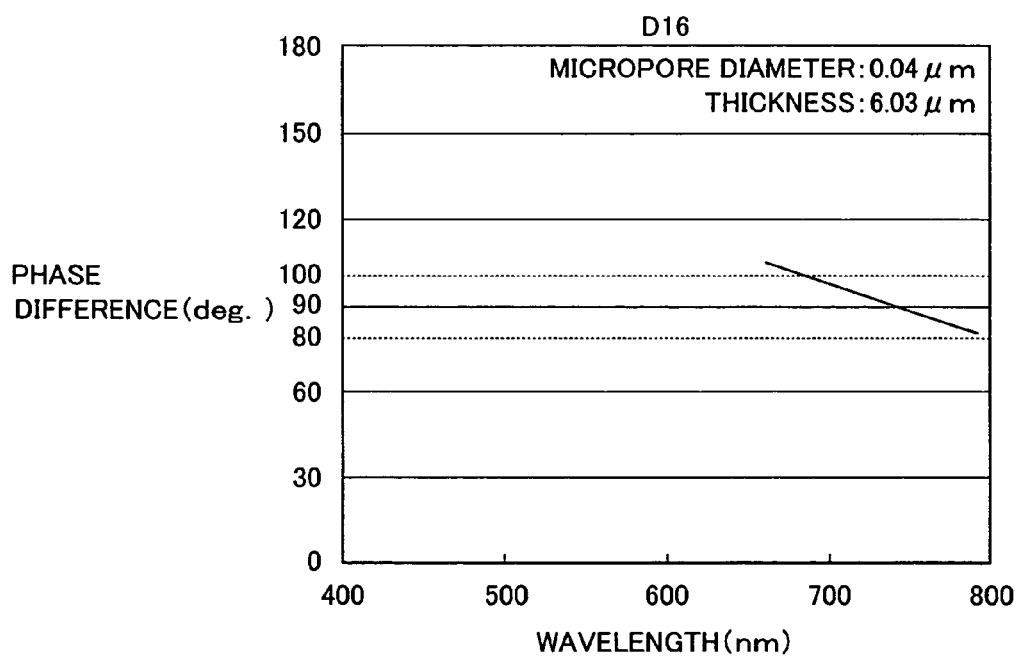

First, the following description describes definition of the micropore interval and the period according to the present invention with reference to FIGS. 46 and 47. FIG. 46 shows the grating pore patterns where the micropores 70a adjacent to each other are spaced from each other in the direction of the arrow Y (the direction that the optical axis extends). FIG. 47 shows the grating pore patterns where the micropores 70a adjacent to each other are connected to each other in the direction of the arrow Y (the direction that the optical axis extends) by allowing them to be in contact with each other or by allowing them to overlap. As shown in FIGS. 46 and 47, the micropore interval T2 is the center-to-center distance of micropores 70a adjacent to each other in the direction of the arrow Y. The period L2 is the center-line to center-line distance of micropore columns 70b adjacent to each other in the direction of arrow X that is perpendicular to the direction of arrow Y. In this case, the center-line to center-line distance (period L2) of micropore columns 70b adjacent to each other in the direction of arrow X is designed to be larger than the center-to-center distance (micropore interval T2) of micropore 70a adjacent to each other in the direction of arrow Y. Furthermore, it is preferable that the diameter S2 of micropore 70a is 0.7 times or more the micropore interval T2. Designing the diameter S2 of micropore 70a to be 0.7 times or more the micropore interval T2 provides large birefringence, thus a thin aluminum oxide film can have the phase difference near to about 90°. In this case, manufacturing is easy. If the micropore interval T2 is equal to the period L2, the refractive index that incident light feels is isotropic, thus, birefringence is not provided. Accordingly, it is necessary to set the micropore interval T2 and the period L2 at different values.

To specify the range F3 in FIG. 45, first, simulation of relationship between a wavelength and a phase difference is performed on each of a plurality kinds of grating pore patterns and grating groove patterns composed of aluminum oxide films with different micropore intervals T2 and periods L2 when light of the red wavelength region, the infrared wavelength region and the blue wavelength region is incident. According to the simulation result, the range F3 is specified so as to include the micropore intervals T2 and the periods L2 that satisfy the value of phase difference within the permissible range in all of the red wavelength region (660 nm), the infrared wavelength region (790 nm) and the blue wavelength region (405 nm), and so as to exclude the micropore intervals T2 and the periods L2 that do not satisfy the value of phase difference out of the permissible range in the blue wavelength region (405 nm). The values (coordinates) of micropore interval T2 and period L2 used for the above simulation are shown in the following table 3. The wavelengths of red light, infrared light and blue light are 660 nm, 790 nm and 405 nm, respectively, and the permissible range of phase difference is set in the range of 90°±10°, similarly to the aforementioned first embodiment.

TABLE 3

| Coordinate Point | Coordinates | |
|---|---|---|
| | T2 | L2 |
| C1 | 0.01 | 0.4 |
| C2 | 0.06 | 0.4 |
| C3 | 0.1 | 0.4 |
| C4 | 0.16 | 0.4 |
| C5 | 0.22 | 0.4 |
| C6 | 0.24 | 0.4 |
| C7 | 0.01 | 0.35 |
| C8 | 0.14 | 0.35 |
| C9 | 0.15 | 0.35 |
| C10 | 0.01 | 0.3 |
| C11 | 0.02 | 0.3 |
| C12 | 0.09 | 0.3 |
| C13 | 0.1 | 0.3 |
| C14 | 0.07 | 0.25 |
| C15 | 0.08 | 0.25 |
| C16 | 0.09 | 0.25 |

Referring to the above table 3, the phase differences of the coordinate point C1 (T2: 0.01, L2: 0.4), the coordinate point C2 (T2: 0.06, L2: 0.4), the coordinate point C3 (T2: 0.1, L2: 0.4), the coordinate point C4 (T2: 0.16, L2: 0.4), the coordinate point C5 (T2: 0.22, L2: 0.4), the coordinate point C7 (T2: 0.01, L2: 0.35), the coordinate point C8 (T2: 0.14, L2: 0.35), the coordinate point C11 (T2: 0.02, L2: 0.3), the coordinate point C12 (T2: 0.09, L2: 0.3), and the coordinate point C15 (T2: 0.08, L2: 0.25) are within the permissible range (90°±10°) over all of wavelength regions of red light (660 nm), infrared light (790 nm) and blue light (405 nm), as shown in FIGS. 48, 49, 50, 51, 52, 54, 55, 58, 59, and 62, respectively.

Among the above coordinate points C1–C5, C7, C8, C11, C12, and C15, the grating patterns corresponding to the coordinate points C3, C4, C5, C8, and C12 are the grating pore patterns where the micropores 70a adjacent to each other are spaced from each other in the direction of the arrow Y (the direction that the optical axis extends), as shown in FIG. 46. The grating patterns corresponding to the coordinate point C2 are the grating groove patterns where the micropores 70a adjacent to each other are connected to each other in the direction of the arrow Y (the direction that the optical axis extends) by allowing them to be in contact with each other, as shown in FIG. 47. The grating patterns corresponding to the coordinate points C1, C7, C11, and C15 are the grating groove patterns where the micropores 70a adjacent to each other are connected to each other in the direction of the arrow Y by allowing them to overlap, as shown in FIG. 47.

Besides, the film thicknesses (μm) of the aluminum oxide films of this case are the coordinate point C1: 3.71 μm, the coordinate point C2: 4.49 μm, the coordinate point C3: 4.40 μm, the coordinate point C4: 3.22 μm, the coordinate point C5: 3.92 μm, the coordinate point C7: 2.75 μm, the coordinate point C8: 3.13 μm, the coordinate point C11: 2.50 μm, the coordinate point C12: 2.60 μm, and the coordinate point C15: 1.77 μm, respectively.

The diameters of the micropores are the coordinate point C1: 0.04 μm, the coordinate point C2: 0.06 μm, the coordinate point C3: 0.09 μm, the coordinate point C4: 0.15 μm, the coordinate point C5: 0.182 μm, the coordinate point C7: 0.04 μm, the coordinate point C8: 0.13 μm, the coordinate point C11: 0.03 μm, the coordinate point C12: 0.086 μm, and the coordinate point C15: 0.09 μm, respectively. In this case, the diameters (S2) (see FIGS. 46 and 47) of micropores 70a are designed to be 0.7 times or more the micropore intervals T2.

On the other hand, the phase differences of the coordinate point C6 (T2: 0.24, L2: 0.4), the coordinate point C9 (T2: 0.15, L2: 0.35), the coordinate point C10 (T2: 0.01, L2: 0.3), the coordinate point C13 (T2: 0.1, L2: 0.3), the coordinate point C14 (T2: 0.07, L2: 0.25), and the coordinate point C16 (T2: 0.09, L2: 0.25) are within the permissible range (90°±10°) in the wavelength regions of red light (660 nm) and infrared light (790 nm), but are out of the permissible range (90°±10°) in the wavelength region of blue light (405 nm), as shown in FIGS. 53, 56, 57, 60, 61, and 63, respectively.

Among the above coordinate points C6, C9, C10, C13, C14, and C16, the grating patterns corresponding to the coordinate points C6, C9, and C13 are the grating pore patterns where the micropores 70a adjacent to each other are spaced from each other in the direction of the arrow Y (the direction that the optical axis extends), as shown in FIG. 46. The grating patterns corresponding to the coordinate points C10, C14, and C16 are the grating groove patterns where the micropores 70a adjacent to each other are connected to each other in the direction of the arrow Y (the direction that the optical axis extends) by allowing them to overlap, as shown in FIG. 47.

Besides, the film thicknesses (μm) of the aluminum oxide films of this case are the coordinate point C6: 4.14 μm, the coordinate point C9: 2.95 μm, the coordinate point C10: 2.77 μm, the coordinate point C13: 3.25 μm, the coordinate point C14: 1.72 μm, and the coordinate point C16: 1.82 μm, respectively.

The diameters of the micropores are the coordinate point C6: 0.198 μm, the coordinate point C9: 0.14 μm, the coordinate point C10: 0.04 μm, the coordinate point C13: 0.09 μm, the coordinate point C14: 0.08 μm, and the coordinate point C16: 0.096 μm, respectively. In this case, the diameters (S2) (see FIGS. 46 and 47) of micropores 70a are designed to be 0.7 times or more the micropore intervals T2.

Consequently, the range F3 shown in FIG. 45 is specified by the following three formulas whereby including the coordinate points C1, C2, C3, C4, C5, C7, C8, C11, C12, and C15, the phase differences of which are within the permissible range (90°±10°) over all of wavelength regions of red light (660 nm), infrared light (790 nm) and blue light (405 nm), and whereby excluding the coordinate points C6, C9, C10, C13, C14, and C16, the phase differences of which are out of the permissible range (90°±10°) only in the wavelength region of blue light (405 nm).

$$L2 \leq 0.4 \tag{9}$$

$$L2 \geq -440.16T2^3 + 63.334T2^2 - 3.4273T2 + 0.3439 \tag{10}$$

$$L2 \geq 0.35(T2 - 0.0825)^{0.434} + 0.245 \tag{11}$$

The above formula (9) specifies a straight-line portion F31 of the upper part of the range F3 shown in FIG. 45. The above formula (10) specifies a curve portion F32 of the lower left part of the range F3 shown in FIG. 45. The above formula (11) specifies a curve portion F33 of the right part of the range F3 shown in FIG. 45.

Next, to specify the range F4 in FIG. 45, first, simulation of relationship between a wavelength and a phase difference is performed on each of a plurality kinds of grating pore patterns and grating groove patterns composed of aluminum oxide films with different micropore intervals T2 and periods L2 when light of the red wavelength region and the infrared wavelength region is incident. According to the simulation result, the range F4 is specified so as to include the micropore intervals T2 and the periods L2 that satisfy the value of phase difference within the permissible range in the red wavelength region (660 nm) and the infrared wavelength region (790 nm), and so as to exclude the micropore intervals T2 and the periods L2 that do not satisfy the value of phase difference out of the permissible range in the red wavelength region (660 nm). The values (coordinates) of micropore interval T2 and period L2 used for the above simulation are shown in the following table 4. The wavelengths of red light and infrared light are 660 nm and 790 nm, respectively. The permissible range of phase difference is set in the range of 90°±10°.

TABLE 4

| Coordinate Point | Coordinates | |
| --- | --- | --- |
| | T2 | L2 |
| D1 | 0.01 | 0.65 |
| D2 | 0.1 | 0.65 |
| D3 | 0.2 | 0.65 |
| D4 | 0.3 | 0.65 |
| D5 | 0.4 | 0.65 |
| D6 | 0.5 | 0.65 |
| D7 | 0.62 | 0.65 |
| D8 | 0.65 | 0.65 |
| D9 | 0.51 | 0.6 |
| D10 | 0.53 | 0.6 |
| D11 | 0.3 | 0.4 |
| D12 | 0.32 | 0.4 |
| D13 | 0.14 | 0.2 |
| D14 | 0.15 | 0.2 |
| D15 | 0.01 | 0.04 |
| D16 | 0.03 | 0.04 |

Referring to the above table 4, the phase differences of the coordinate point D1 (T2: 0.01, L2: 0.65), the coordinate point D2 (T2: 0.1, L2: 0.65), the coordinate point D3 (T2: 0.2, L2: 0.65), the coordinate point D4 (T2: 0.3, L2: 0.65), the coordinate point D5 (T2: 0.4, L2: 0.65), the coordinate point D6 (T2: 0.5, L2: 0.65), the coordinate point D7 (T2: 0.62, L2: 0.65), the coordinate point D9 (T2: 0.51, L2: 0.6), the coordinate point D11 (T2: 0.3, L2: 0.4), the coordinate point D13 (T2: 0.14, L2: 0.2), and the coordinate point D15 (T2: 0.01, L2: 0.04) are within the permissible range (90°±10°) in the wavelength regions of red light (660 nm) and infrared light (790 nm), as shown in FIGS. 64, 65, 66, 67, 68, 69, 70, 72, 74, 76 and 78, respectively.

Among the above coordinate points D1–D7, D9, D11, D13 and D15, the grating patterns corresponding to the coordinate points D2, D3, D4, D5, D6, D7, and D9 are the grating pore patterns where the micropores 70a adjacent to each other are spaced from each other in the direction of the arrow Y (the direction that the optical axis extends), as shown in FIG. 46. The grating patterns corresponding to the coordinate points D11 and D13 are the grating groove patterns where the micropores 70a adjacent to each other are connected to each other in the direction of the arrow Y (the direction that the optical axis extends) by allowing them to be in contact with each other, as shown in FIG. 47. The grating patterns corresponding to the coordinate points D1 and D15 are the grating groove patterns where the micropores 70a adjacent to each other are connected to each other in the direction of the arrow Y by allowing them to overlap, as shown in FIG. 47.

Besides, the film thicknesses (μm) of the aluminum oxide films of this case are the coordinate point D1: 15.62 μm, the coordinate point D2: 15.67 μm, the coordinate point D3: 7.03 μm, the coordinate point D4: 5.32 μm, the coordinate point D5: 7.06, the coordinate point D6: 6.08 μm, the coordinate point D7: 4.47 μm, the coordinate point D9: 3.56 μm, the coordinate point D11: 1.85 μm, the coordinate point D13: 1.72 μm, and the coordinate point D15: 5.12 μm, respectively.

The diameters of the micropores are the coordinate point D1: 0.04 μm, the coordinate point D2: 0.08 μm, the coordinate point D3: 0.172 μm, the coordinate point D4: 0.26 μm, the coordinate point D5: 0.30 μm, the coordinate point D6: 0.40 μm, the coordinate point D7: 0.52 μm, the coordinate point D9: 0.44 μm, the coordinate point D11: 0.30 μm, the coordinate point D13: 0.14 μm, and the coordinate point D15: 0.04 μm, respectively. In this case, the diameters (S2) (see FIGS. 46 and 47) of micropores 70a are designed to be 0.7 times or more the micropore intervals T2.

On the other hand, the phase differences of the coordinate point D8 (T2: 0.65, L2: 0.65), the coordinate point D10 (T2: 0.53, L2: 0.6), the coordinate point D12 (T2: 0.32, L2: 0.4), the coordinate point D14 (T2: 0.15, L2: 0.2), and the coordinate point D16 (T2: 0.03, L2: 0.04) are out of the permissible range (90°±10°) in the wavelength region of red light (660 nm), as shown in FIGS. 71, 73, 75, 77, and 79, respectively.

Among the above coordinate points D8, D10, D12, D14, and D16, the grating patterns corresponding to the coordinate points D8, D10, D12, and D14 are the grating pore patterns where the micropores 70a adjacent to each other are spaced from each other in the direction of the arrow Y (the direction that the optical axis extends), as shown in FIG. 46. The grating patterns corresponding to the coordinate point D16 are the grating groove patterns where the micropores 70a adjacent to each other are connected to each other in the direction of the arrow Y (the direction that the optical axis extends) by allowing them to overlap, as shown in FIG. 47.

Besides, the film thicknesses (μm) of the aluminum oxide films of this case are the coordinate point D8: 17.33 μm, the coordinate point D10: 4.23 μm, the coordinate point D12: 2.48 μm, the coordinate point D14: 2.10 μm, and the coordinate point D16: 6.03 μm, respectively.

The diameters of the micropores are the coordinate point D8: 0.56 μm, the coordinate point D10: 0.46 μm, the coordinate point D12: 0.30 μm, the coordinate point D14: 0.14 μm, and the coordinate point D16: 0.04 μm, respectively. In this case, the diameters (S2) (see FIGS. 46 and 47) of micropores 70a are designed to be 0.7 times or more the micropore intervals T2.

Consequently, the range F4 shown in FIG. 45 is specified by the following two formulas whereby including the coordinate points D1, D2, D3, D4, D5, D6, D7, D9, D11, D13, and D15, the phase differences of which are within the permissible range (90°±10°) in the wavelength regions of red light (660 nm) and infrared light (790 nm), and whereby excluding the coordinate points D8, D10, D12, D14, and D16, the phase differences of which are out of the permissible range (90°±10°) in the wavelength region of red light (660 nm).

$$L2 \leq 0.65 \tag{12}$$

$$L2 \geq -1.2018 T2^3 + 0.3022 T2^2 + 1.2988 T2 + 0.01 \tag{13}$$

The above formula (12) specifies a straight-line portion F41 of the upper part of the range F4 shown in FIG. 45. The above formula (13) specifies a curve portion F42 of the right part of the range F4 shown in FIG. 45.

Figure 80:
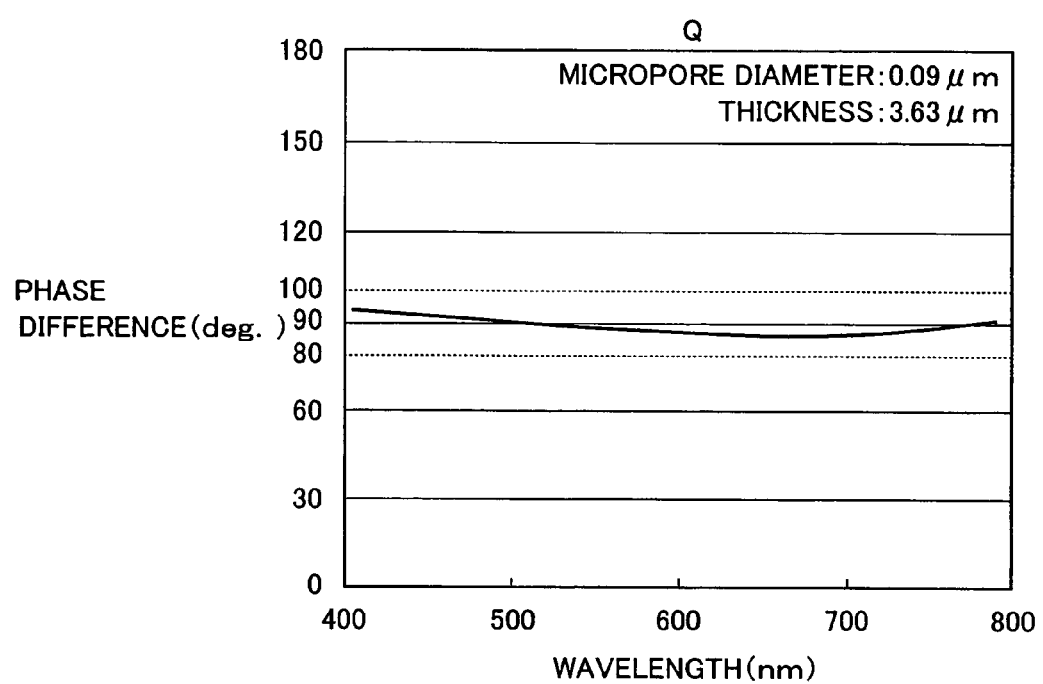
FIG. 80 shows a simulation result of relationship between a wavelength and a phase difference of the coordinate point Q.

In the third embodiment, the micropore interval T2 and the period L2 of the grating pore patterns of the aluminum oxide film 73 (see FIG. 44) are set at values within the range F3 (for example, T2: 0.10, L2: 0.35 (the coordinate point Q in FIG. 45)) specified by the above three formulas (9) to (11). That is, the phase difference of the third embodiment (the coordinate point Q in FIG. 45) is within the permissible range (90°±10°) in all of the red wavelength region (660 nm), the infrared wavelength region (790 nm) and the blue wavelength region (405 nm). FIG. 80 shows an experimental result in the case that the micropore interval T2 and the period L2 are set at 0.10 and 0.35 respectively (the coordinate point Q in FIG. 45). In this case, the film thickness (μm) and the diameter of micropore are 3.63 μm and 0.09 μm, respectively.

In the third embodiment, the micropore interval T2 and the period L2 of the grating pore patterns of the aluminum oxide f film 73 that composes the ¼ wave plate as mentioned above are set at values within the range F3 (for example, T2: 0.10, L2: 0.35 (the coordinate point Q in FIG. 45)) specified by the three formulas (9) to (11). Thus, the phase difference between two polarization components perpendicular to each other can be set near to 90° (within a range of 90°±10°) for light of all the red, infrared and blue wavelength regions. As a result, it is possible to provide a ¼ wave plate with preferable phase conversion characteristic over a wide wavelength range, similarly to the aforementioned first embodiment.

In the third embodiment, the aluminum oxide film 73 having the grating pore patterns with the plurality of micropores 73a that are arranged in the form of a triangular lattice is used as an aluminum oxide film composing a wave plate, as mentioned above. Accordingly, forming the aluminum oxide film 73 by conventional anodic oxidation can form the plurality of micropores 73a that are arranged in the form of a triangular lattice in a self-organized manner. Therefore, it is possible to easily form the aluminum oxide film 73 having the grating pore patterns with the plurality of micropores 73a that are arranged in the form of a triangular lattice.

Other effects of the third embodiment are similar to those of the aforementioned first embodiment.

With a manufacturing process according to the third embodiment, first, the transparent conductor film 72 consisting of ITO or ZnO and an aluminum film (not shown) are successively formed on the glass substrate 71 by vapor deposition, with reference to FIG. 44. Subsequently, concave portions (not shown) arranged in the form of a triangular lattice on the surface of the aluminum film, and the aluminum film is anodically oxidized by a process similar to the conventional process shown in FIGS. 95 to 99, so that the micropore interval T2 and the period L2 are set in the range F3 specified by the formulas (9) to (11), or in the range F4 specified by the formulas (12) and (13). Consequently, the aluminum oxide film 73 having the micropore interval T2 and the period L2 within the range F3 or F4, and the grating pore patterns with the plurality of micropores 73a that are arranged in the form of a triangular lattice is formed.

Forth Embodiment

Figure 81:
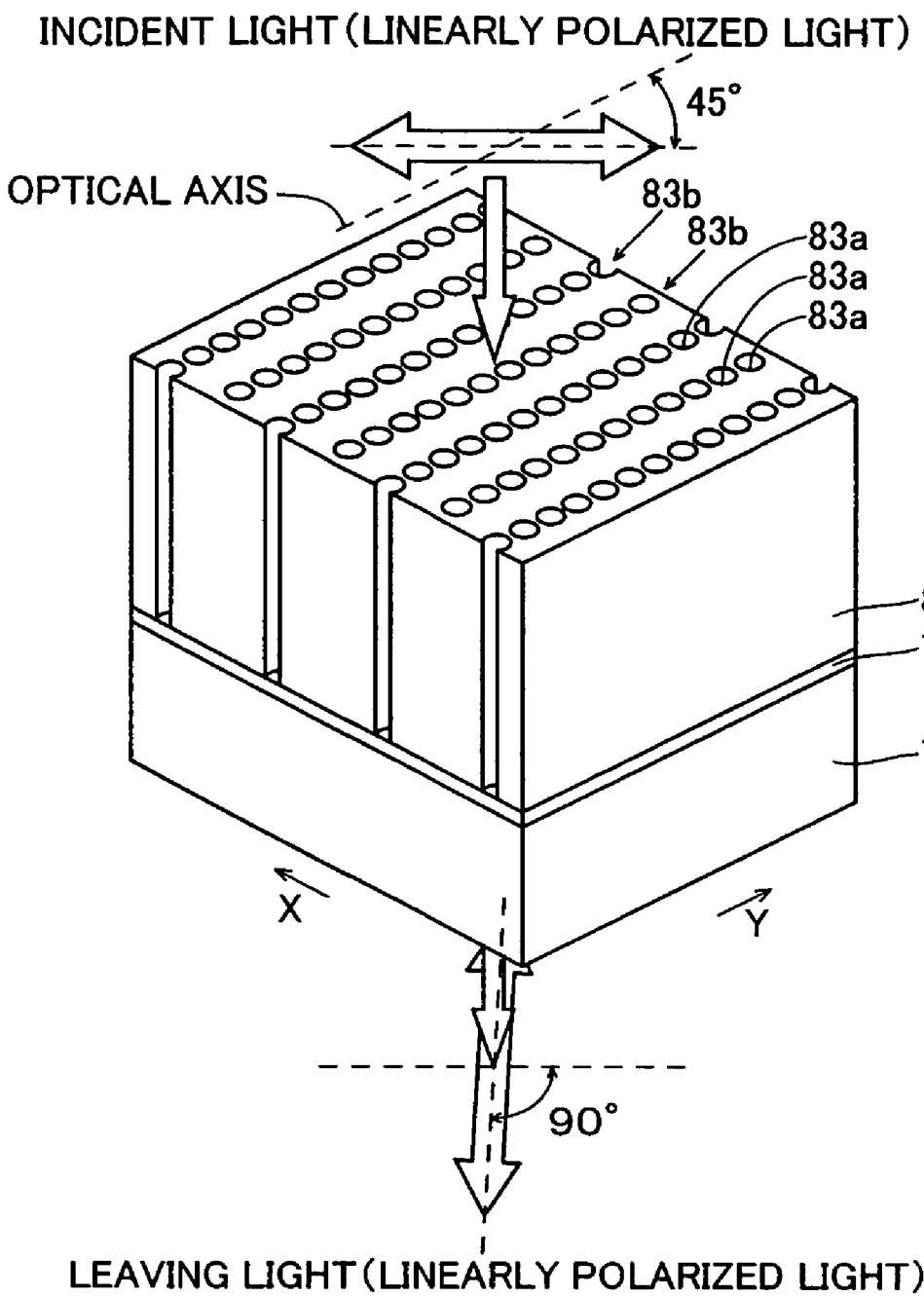
FIG. 81 is a perspective view showing construction of a ½ wave plate according to a fourth embodiment of the present invention.

In a fourth embodiment, the following description describes the case where an aluminum oxide film having grating pore patterns with a plurality of micropores that are arranged in the form of a triangular lattice is used for a ½ wave plate with reference to FIG. 81, dissimilarly to the aforementioned third embodiment. The wave plate according to the fourth embodiment designed to have a phase difference of about 180° between the polarization components parallel to, and perpendicular to the optical axis (the direction of the arrow Y), and thus serves to rotate polarization incident linearly polarized light inclined about 45° relative to the optical axis (the direction of the arrow Y) about 90°, similarly to the aforementioned second embodiment.

As for concrete construction of the ½ wave plate according to this fourth embodiment, the transparent conductor film 72 consisting of ITO or ZnO is formed on the glass substrate 71 similarly to the aforementioned third embodiment.

In the fourth embodiment, an aluminum oxide film 83 having the grating pore patterns with the plurality of micropores 83a that are arranged in the form of a triangular lattice is formed on the transparent conductor film 72. The plurality of micropores 83a composing the grating pore patterns of this aluminum oxide film 83 are spaced at a predetermined center-to-center distance of pore (micropore interval) from each other containing the case that the micropores 83a adjacent to each other are not connected to each other in the direction of the arrow Y (the direction that the optical axis extends), and are arranged in columns along the direction of the arrow Y, and compose micropore columns 83b, similarly to the grating pore patterns of the aluminum oxide film 73 of the aforementioned third embodiment. A plurality of the micropore columns 83b are arranged with an interval (period) that is larger than the micropore interval (center-to-center distance) of the micropores 83a adjacent to each other in the direction of the arrow X that is perpendicular to the direction of the arrow Y. The micropore 83a has a depth that reaches the transparent conductor film 72, and is formed in a uniform diameter width along the depth direction. The aluminum oxide film 83 is an example of the "metal oxide film" in the present invention. The micropore 83a is an example of the "pore" in the present invention, and the micropore column 83b is an example of the "pore column" in the present invention.

The thickness of the aluminum oxide film 83 is set at twice the thickness of the aluminum oxide film 73 of the aforementioned third embodiment. Thus, the phase difference between the polarization components parallel to, and perpendicular to the optical axis of the aluminum oxide film 83 (the direction of the arrow Y) incident light can be twice (about 180°) the phase difference of the third embodiment (about 90°).

When the permissible range of phase difference is set in the range of 180°±20°, the range similar to the third embodiment shown in FIG. 45 shows the range of the micropore interval and the period of the grating pore patterns (½ wave plate) composed of the aluminum oxide film capable of having preferable phase conversion characteristic for light containing a plurality of different wavelength regions. In this case, the range F3 in FIG. 45 corresponds to a range where the phase difference between two polarization components perpendicular to each other can be set near to 180° (within a range of 180°±20°) for light of all the red, infrared and blue wavelength regions. The range F4 in FIG. 45 corresponds to a range where the phase difference between two polarization components perpendicular to each other can be set near to 180° (within a range of 180°±20°) for light of at least the red and infrared wavelength regions. Furthermore, in the fourth embodiment, it is also preferable that the diameter (S2) of micropore 83a is 0.7 times or more the micropore interval T2, similarly to the aforementioned third embodiment.

In the fourth embodiment, the micropore interval T2 and the period L2 of the grating pore patterns of the aluminum oxide film 83 are set at values within the range F3 (for example, T2: 0.10, L2: 0.35 (the coordinate point Q in FIG. 45)) specified by the aforementioned three formulas (9) to (11), similarly to the third embodiment shown in FIG. 45. That is, the phase difference of the fourth embodiment (the coordinate point Q in FIG. 45) is within the permissible range (180°±20°) in all of the red wavelength region (660 nm), the infrared wavelength region (790 nm) and the blue wavelength region (405 nm).

In the fourth embodiment, the micropore interval T2 and the period L2 of the grating pore patterns of the aluminum oxide film 83 that composes the ½ wave plate as mentioned above are set at values within the range F3 (for example, T2: 0.10, L2: 0.35 (the coordinate point Q in FIG. 45)) shown in FIG. 45. Thus, the phase difference between two polarization components perpendicular to each other can be set near to 180° (within a range of 180°±20°) for light of all the red, infrared and blue wavelength regions. As a result, it is possible to provide a ½ wave plate with preferable phase conversion characteristic over a wide wavelength range, similarly to the aforementioned second embodiment.

Other effects of the fourth embodiment are similar to those of the aforementioned third embodiment.

Fifth Embodiment

Figure 82:
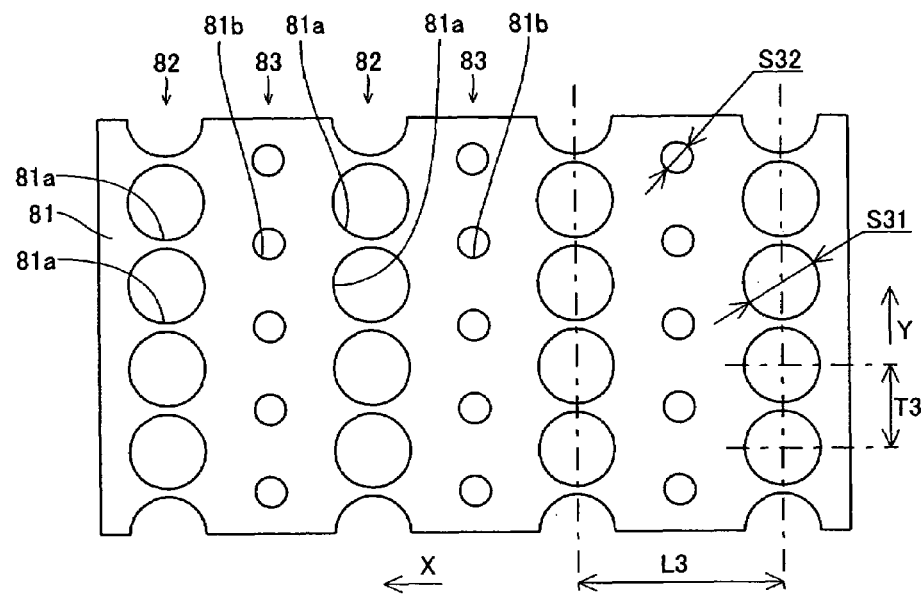
FIG. 82 is a plan view showing grating patterns of a wave plate according to a fifth embodiment of the present invention.

In a fifth embodiment, the following description describes a wave plate including an aluminum oxide film having grating pore patterns with a plurality of large micropores and a plurality of small micropores with reference to FIG. 82, dissimilarly to the aforementioned third and fourth embodiments. In the grating pore patterns, one micropore column composed of the large micropores and one micropore column composed of the small micropores are spaced at a predetermined interval from each other.

In the fifth embodiment, as shown in FIG. 82, a plurality of the large micropore 81a with a diameter S31 and a plurality of small micropores 81b with a diameter S32 smaller than the diameter S31 of micropore 81a are formed in the aluminum oxide film 81 composing the wave plate. A plurality of micropores including the large micropores 81a and the small micropores 81b are arranged in the form of a triangular lattice. The aluminum oxide film 81 is an example of the "metal oxide film" in the present invention. The micropores 81a and 81b are examples of a "first pore" and a "second pore" in the present invention, respectively.

In the fifth embodiment, the grating pore patterns for phase conversion of incident light are composed of the plurality of large micropores 81a formed in the aluminum oxide film 81. The plurality of large micropores 81a composing the grating pore patterns are spaced at a predetermined interval from each other so that micropores 81a adjacent to each other are not connected to each other in the direction of the arrow Y (the direction that the optical axis extends), and are arranged in columns along the direction of the arrow Y, and compose micropore columns 82. A plurality of the micropore columns 82 are spaced at a predetermined interval from each other in the direction of the arrow X that is perpendicular to the direction of the arrow Y so that the micropore columns 82 adjacent to each other are not connected to each other in the direction of the arrow X. One micropore column 83 composed of the plurality of small micropores 81b is arranged between the micropore columns 82 adjacent to each other in the direction of the arrow X. In other words, one micropore column 82 and one micropore column 83 are alternately arranged so that they are spaced at the predetermined interval in the direction of the arrow X. The micropore column 82 is an example of the "pore column" in the present invention.

The following description describes definition of the micropore interval T3 and the period L3 of the grating pore patterns of the aluminum oxide film 81 composing the wave plate according to the fifth embodiment. The micropore interval T3 is the center-to-center distance of large micropores 81a adjacent to each other in the direction of the arrow Y. The period L3 is the center-line to center-line distance of micropore columns 82 adjacent to each other in the direction of arrow X. That is, definition of the micropore interval T3 and the period L3 is made based only on the large micropores 81a without consideration of the small micropores 81b.

The following description describes definition of the large micropore 81a and the small micropore 81b. The large micropore 81a is a micropore with a diameter larger than a reference value. The reference value is the value obtained by multiplying the largest diameter in the plurality of micropores formed in the aluminum oxide film 81 by 0.5. The small micropore 81b is a micropore with a diameter that is not larger than the above reference value.

Figure 83:
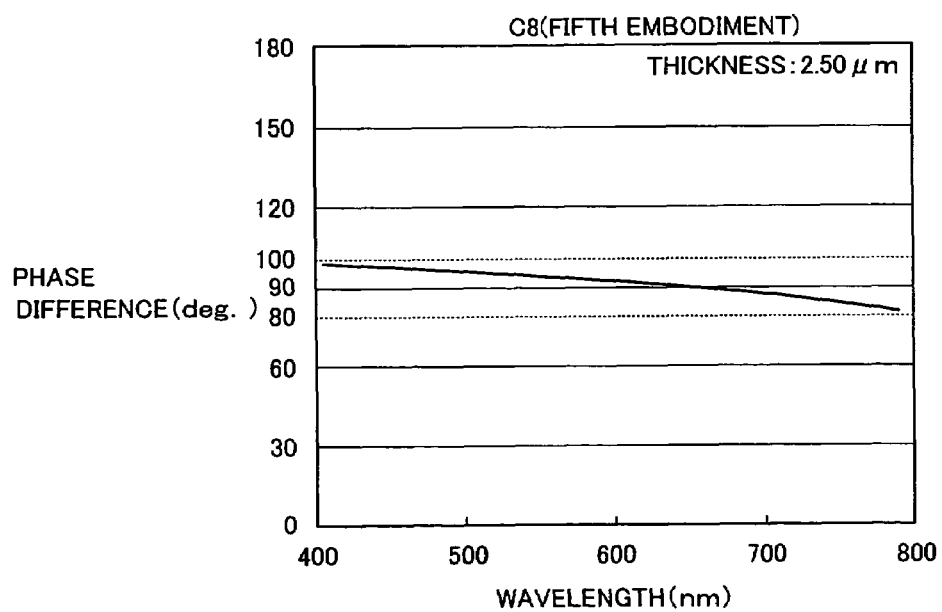
FIGS. 83 and 84 show simulation results of relationship between a wavelength and a phase difference in the case that the grating pore pattern of the fifth embodiment are specified by the coordinate points C8 and C9 of FIG. 45.
Figure 84:
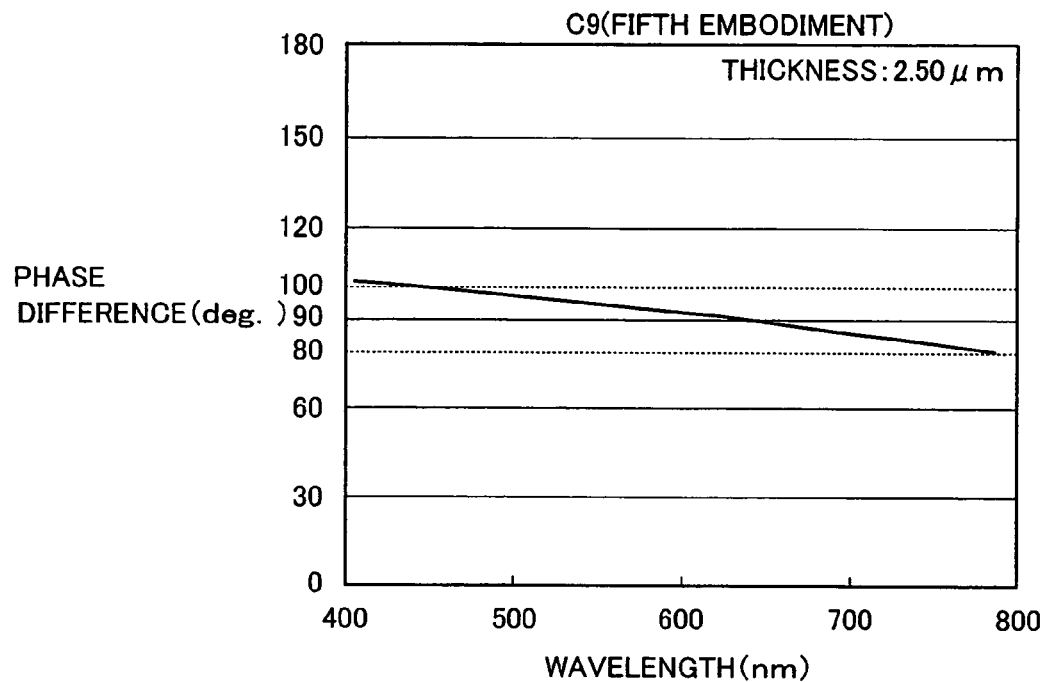

With the grating pore patterns shown in FIG. 82, in the case that the micropore interval T3 and the period L3 are set at the coordinate point C8 (micropore interval: 0.14, period: 0.35) of the third embodiment shown in FIG. 45, it is found that the phase difference is within the permissible range (90°±10°) in all of the red wavelength region (660 nm), the infrared wavelength region (790 nm) and the blue wavelength region (405 nm) as shown in FIG. 83. In the case that the micropore interval T3 and the period L3 are set at the coordinate point C9 (micropore interval: 0.15, period: 0.35) of the third embodiment shown in FIG. 45, it is found that the phase difference is within the permissible range (90°±10°) in the red wavelength region (660 nm) and the infrared wavelength region (790 nm), on the other hand, the phase difference is out of the permissible range (90°±10°) in the blue wavelength region (405 nm), as shown in FIG. 84. That is, the simulation result in the above case is similar to the coordinate points C8 and C9 in the grating pore patterns of the aforementioned third embodiment.

According to this result, in the case that the aluminum oxide film 81 having the grating pore patterns shown in FIG. 82 is used for a wave plate, it is considered that defining the grating interval T3 and the period L3 as mentioned above can show the range of the grating interval T3 and the period L3 of the grating pore patterns composed of the aluminum oxide film 81 capable of obtaining preferable phase conversion characteristic for light containing a plurality of different wavelength regions as the range similar to the third embodiment shown in FIG. 45. In other words, in the case that the diameter S32 of the small micropore 81b is not larger than the above reference value, it is considered that the small micropore 81b has small influence on the phase conversion characteristic. Accordingly, in the case that the grating pore patterns having the grating interval T3 and the period L3 shown in FIG. 82 are applied to a ¼ wave plate, the following formulas (14) to (16) similar to the formulas (9) to (11) of the aforementioned third embodiment can specify the range where the phase difference between two polarization components perpendicular to each other can be set near to 90° (within a range of 90°±10°) for light of all the red, infrared and blue wavelength regions.

$$L3 \leq 0.4 \tag{14}$$

$$L3 \geq -440.16T3^{3+63.334}T3^2 - 3.4273T3 + 0.3439 \tag{15}$$

$$L3 \geq 0.35(T3 - 0.0825)^{0.0434} + 0.245 \tag{16}$$

The following formulas (17) and (18) similar to the formulas (12) and (13) of the aforementioned third embodiment can specify the range where the phase difference between two polarization components perpendicular to each other can be set near to 90° (within a range of 90°±10°) for light of at least the red and infrared wavelength regions.

$$L3 \leq 0.65 \tag{17}$$

$$L3 \geq -1.2018T3^3 + 0.3022T3^2 + 1.2988T3 + 0.01 \tag{18}$$

Accordingly, in the case that the aluminum oxide film 81 having the grating pore patterns shown in FIG. 82 is used for a ¼ wave plate, setting the grating interval T3 and the period L3 in the range (the range same as the range F3 in FIG. 45) specified by the formulas (14) to (16) can set the phase difference between two polarization components perpendicular to each other near to 90° (within a range of 90°±10°) for light of all the red, infrared and blue wavelength regions. Setting the grating interval T3 and the period L3 in the range (the range same as the range F4 in FIG. 45) specified by the formulas (17) and (18) can set the phase difference between two polarization components perpendicular to each other near to 90° (within a range of 90°±10°) for light of at least the red and infrared wavelength regions. In the case that the aluminum oxide film 81 having the grating pore patterns shown in FIG. 82 is used for a ½ wave plate, the range of the grating interval T3 and the period L3 where the phase difference can be set near to 180° (within a range of 180°±20°) for light of all the red, infrared and blue wavelength regions corresponds to the range specified by the above formulas (14) to (16) (the range same as the range F3 in FIG. 45). The range of the grating interval T3 and the period L3 where the phase difference can be set near to 180° (within a range of 180°±20°) for light of at least the red and infrared wavelength regions corresponds to the range specified by the above formulas (17) and (18) (the range same as the range F4 in FIG. 45).

In the fifth embodiment, the grating interval T3 and the period L3 of the grating pore patterns of the aluminum oxide film 81 shown in FIG. 82 are set at the values within the range specified by the above formulas (14) to (16) (the range same as the range F3 in FIG. 45). Namely, in the fifth embodiment, in the case that the aluminum oxide film 81 having the grating pore patterns is used for a ¼ wave plate, the phase difference is set within the permissible range (90°±10°) in all of the red wavelength region, the infrared wavelength region and the blue wavelength region. In the case that the aluminum oxide film 81 having the grating pore patterns is used for a ½ wave plate, the phase difference is set within the permissible range (180°±20°) in all of the red wavelength region, the infrared wavelength region and the blue wavelength region.

Other construction of the fifth embodiment is similar to that of the aforementioned third or fourth embodiment.

In the fifth embodiment, as mentioned above, in the case that the aluminum oxide film 81 is used for a ¼ wave plate by setting the grating interval T3 and the period L3 of the grating pore patterns of the aluminum oxide film 81 composing a wave plate in the range (the range same as the range F3 in FIG. 45) specified by the formulas (14) to (16), the phase difference between two polarization components perpendicular to each other can be set near to 90° (within a range of 90°±10°) for light of all the red, infrared and blue wavelength regions. In the case that the aluminum oxide film 81 is used for a ½ wave plate, the phase difference between two polarization components perpendicular to each other can be set near to 180° (within a range of 180°±20°) for light of all the red, infrared and blue wavelength regions. As a result, it is possible to provide ¼ and ½ wave plates with preferable phase conversion characteristic over a wide wavelength range, similarly to the aforementioned third and fourth embodiments.

In the fifth embodiment, the diameter S32 of the small large micropore 81*b* is set to be not larger than the reference value obtained by multiplying the largest diameter in the plurality of micropores formed in the aluminum oxide film 81 by 0.5, thus, the small micropore 81*b* has small influence on the phase conversion characteristic. Accordingly, with the aluminum oxide film 81 having the large micropores 81*a* and the small micropores 81*b*, adjusting the period L3 of the grating pore patterns composed of the plurality of large micropores 81*a* can easily provide a wave plate with preferable phase conversion characteristic.

A process of manufacturing the wave plate according to the fifth embodiment is now described with reference to FIGS. 82 and 85 to 87.

Figure 85:
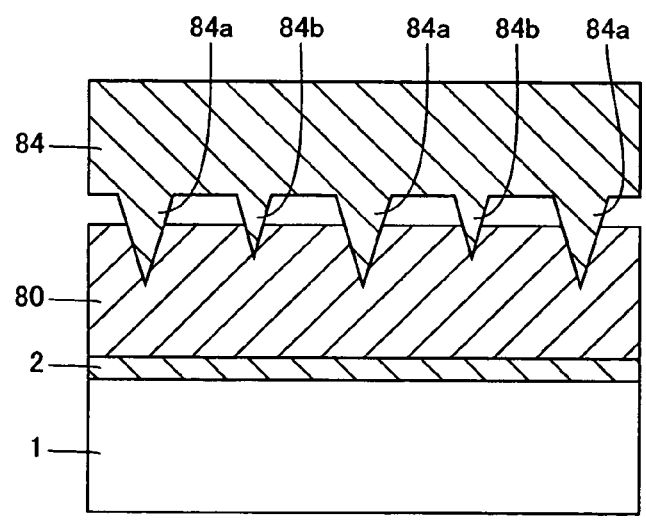
FIGS. 85 to 87 are sectional views and plan views for explanation of a manufacturing process of the wave plate according to the fifth embodiment shown in FIG. 82.

First, as shown in FIG. 85, with a process similar to the first embodiment shown in FIG. 33, the transparent conductor film 2 consisting of ITO or ZnO and an aluminum film 80 are successively formed on the glass substrate 1, and then texturing is performed on the aluminum film 80 by means of a press member 84 composed of a hard material such as SiC. The press member 84 has a plurality of conical projecting portions 84*a* and 84*b*. A plurality of the projecting portions including the projecting portions 84*a* and the projecting portions 84*b* are arranged in the form of a triangular lattice. The basal part of projecting portion 84*a* has a diameter larger than the basal part of projecting portion 84*b*. The large projecting portions 84*a* are arranged in a region corresponding to the micropore column 82 (see FIG. 82) of the aluminum oxide film 81 of the press member 84. The small projecting portions 84*b* are arranged to a region other than the region corresponding to the micropore column 82 of the press member 84.

Figure 86:
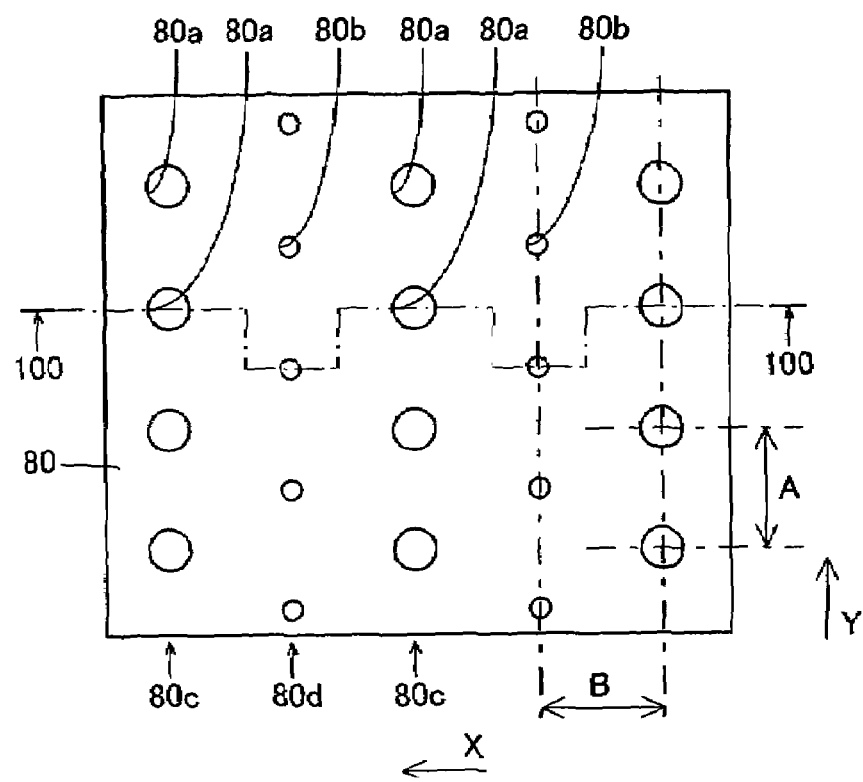
Figure 87:
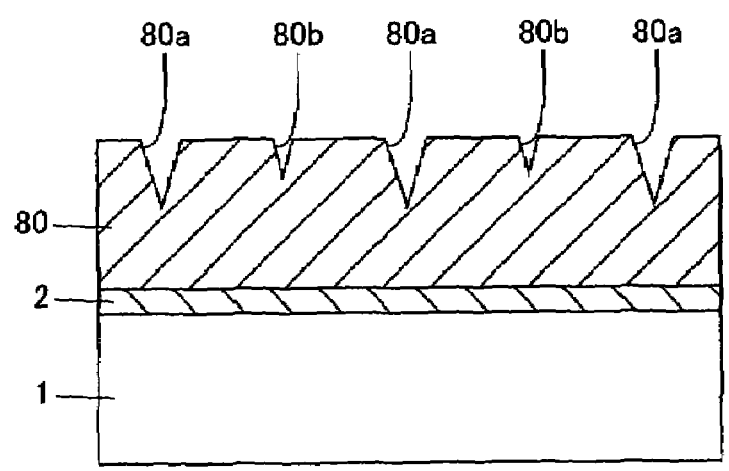

Accordingly, as shown in FIGS. 86 and 87, one concave-portion column 80*c* composed of a plurality of concave portions 80*a* with the large diameter, and one concave-portion column 80*d* composed of a plurality of concave portions 80*b* with the small diameter are alternately formed in the surface of the aluminum film 80 whereby being spaced at a center-line to center-line distance B in the direction (X directions) perpendicular to the direction that the optical axis extends (the Y direction). The plurality of concave portions 80*a* composing concave-portion column 80*c* are arranged in a column along the Y direction whereby being spaced at a center-to-center distance A from each other. The plurality of concave portions 80*b* composing concave-portion column 80*d* are arranged in a column along the Y direction whereby being spaced at the center-to-center distance A from each other. The concave portions 80*a* and 80*b* are arranged in the form of a triangular lattice.

Subsequently, the aluminum film 80 with the plurality of concave portions 80*a* and 80*b* formed therein is subjected to anodic oxidation by a process similar to the first embodiment shown in FIG. 36. Thus, the aluminum oxide film 81 having the grating pore patterns with the plurality of large micropores 81*a* and the plurality of small micropores 81*b* are formed as shown in FIG. 82. In the grating pore patterns, one micropore column 82 composed of the large micropores 81*a* and one micropore column 83 composed of the small micropores 81*b* are spaced at a predetermined interval from each other.

In the manufacturing process of the fifth embodiment, the concave portions 80*a* and 80*b* corresponding to the large micropores 81*a* and the small micropores 81*b* are arranged in the form of a triangular lattice as mentionrd above. Accordingly, anodic oxidation performed on the aluminum film 80 with the concave portions 80*a* and 80*b* formed therein can form the micropores 81*a* and 81*b* arranged in the form of a triangular lattice in the whole surface of the aluminum oxide film 81. In this case, since the center-to-center distance A of the concave portions 80*a* (80*b*) adjacent to each other in the direction that the optical axis extends (the Y direction) is nearly equal to the center-line to center-line distance B of the concave portions 80*a* and 80*b* adjacent to each other in the direction (the X direction) perpendicular to the direction that the optical axis extends, the anodic oxidation voltage can be set whereby being suitable for both the center-to-center distance A of the concave portions 80*a* (80*b*) adjacent to each other in the Y direction and the center-line to center-line distance B of the concave portions 80*a* and 80*b* adjacent to each other in the X direction. Therefore, it is possible to keep occurrence of branching of large micropores 81*a* that composes the grating pore patterns formed in the aluminum oxide film 81 inside the aluminum oxide film 81 in check.

Sixth Embodiment

Figure 88:
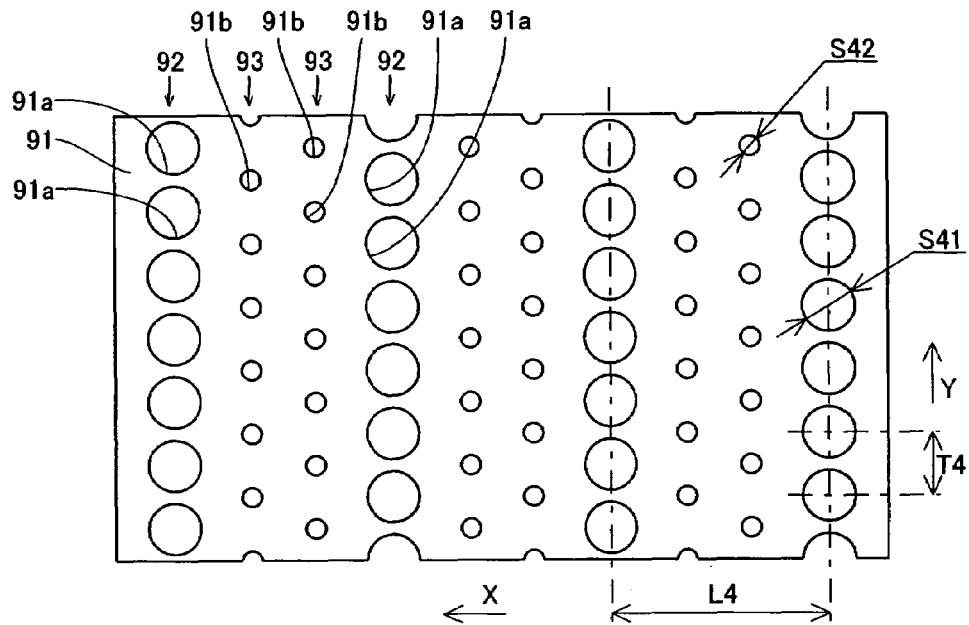
FIG. 88 is a plan view showing grating pore patterns of a wave plate according to a sixth embodiment of the present invention.

In a sixth embodiment, the following description describes the case where two micropore columns composed of a plurality of small micropores are arranged between micropore columns composed of a plurality of large micropores with reference to FIG. 88, dissimilarly to the aforementioned fifth embodiment.

In the sixth embodiment, as shown in FIG. 88, a plurality of the large micropores 91*a* with a diameter S41 and a plurality of small micropores 91*b* with a diameter S42 smaller than the diameter S41 of micropore 91*a* are formed on an aluminum oxide film 91 composing the wave plate. A plurality of micropores including the large micropores 91*a* and the small micropores 91*b* are arranged in the form of a triangular lattice. The aluminum oxide film 91 is an example of the "metal oxide film" in the present invention. The micropores 91*a* and 91*b* are examples of the "first pore" and the "second pore" in the present invention, respectively.

In the sixth embodiment, the grating pore patterns for phase conversion of incident light are composed of the plurality of large micropores 91a formed in the aluminum oxide film 91. The plurality of large micropores 91a composing the grating pore patterns are spaced at a predetermined interval from each other so that the micropores 91a adjacent to each other are not connected to each other in the direction of the arrow Y (the direction that the optical axis extends), and are arranged in columns along the direction of the arrow Y, and compose micropore columns 92. A plurality of the micropore columns 92 are spaced at a predetermined interval from each other in the direction of the arrow X that is perpendicular to the direction of the arrow Y so that the micropore columns 92 adjacent to each other are not connected to each other in the direction of the arrow X. Two micropore columns 93 composed of the plurality of small micropores 91b are arranged between the micropore columns 92 adjacent to each other in the direction of the arrow X. In other words, one micropore column 92 and two micropore columns 93 are alternately arranged so that they are spaced at a predetermined interval in the direction of the arrow X. The micropore column 92 is an example of the "pore column" in the present invention.

The following description describes definition of the micropore interval T4 and the period L4 of the grating pore patterns of the aluminum oxide film 91 composing the wave plate according to the sixth embodiment. The micropore interval T4 is a center-to-center distance of large micropores 91a adjacent to each other in the direction of the arrow Y. The period L4 is the center-line to center-line distance of micropore columns 92 adjacent to each other in the direction of arrow X. That is, definition of the micropore interval T4 and the period L4 is made based only on the large micropores 91a without consideration of the small micropores 91b.

The following description describes definition of the large micropore 91a and the small micropore 91b. The large micropore 91a is a micropore with a diameter larger than a reference value. The reference value is the value obtained by multiplying the largest diameter in the plurality of micropores formed in the aluminum oxide film 91 by 0.5. The small micropore 91b is a micropore with a diameter that is not larger than the above reference value.

In the case that the diameter S42 of the small micropore 91b is not larger than the above reference value, it is considered that the small micropore 91b has small influence on the phase conversion characteristic, similarly to the aforementioned fifth embodiment. Accordingly, in the case that the aluminum oxide film 91 having the grating pore patterns shown in FIG. 88 is used for a wave plate, it is considered that defining the grating interval T4 and the period L4 as mentioned above can show the range of the grating interval T4 and the period L4 of the grating pore patterns composed of the aluminum oxide film 91 capable of obtaining preferable phase conversion characteristic for light containing a plurality of different wavelength regions as the range similar to the third embodiment shown in FIG. 45. Accordingly, in the case that the grating pore patterns having the grating interval T4 and the period L4 shown in FIG. 88 are applied to a ¼ wave plate, the following formulas (19) to (21) similar to the formulas (9) to (11) of the aforementioned third embodiment can specify the range where the phase difference between two polarization components perpendicular to each other can be set near to 90° (within a range of 90°±10°) for light of all the red, infrared and blue wavelength regions.

$$L4 \leq 0.4 \tag{19}$$

$$L4 \geq -440.16T4^3 + 63.334T4^2 - 3.4273T4 + 0.3439 \tag{20}$$

$$L4 \geq 0.35(T4 - 0.0825)^{0.434} + 0.245 \tag{21}$$

The following formulas (22) and (23) similar to the formulas (12) and (13) of the aforementioned third embodiment can specify the range where the phase difference between two polarization components perpendicular to each other can be set near to 90° (within a range of 90°±10°) for light of at least the red and infrared wavelength regions.

$$L4 \leq 0.65 \tag{22}$$

$$L4 \geq -1.2018T4^3 + 0.3022T4^2 + 1.2988T4 + 0.01 \tag{23}$$

Accordingly, in the case that the aluminum oxide film 91 having the grating pore patterns shown in FIG. 88 is used for a ¼ wave plate, setting the grating interval T4 and the period L4 in the range (the range same as the range F3 in FIG. 45) specified by the formulas (19) to (21) can set the phase difference between two polarization components perpendicular to each other near to 90° (within a range of 90°±10°) for light of all the red, infrared and blue wavelength regions. Setting the grating interval T4 and the period L4 in the range (the range same as the range F4 in FIG. 45) specified by the formulas (22) and (23) can set the phase difference between two polarization components perpendicular to each other near to 90° (within a range of 90°±10°) for light of at least the red and infrared wavelength regions. In the case that the aluminum oxide film 91 having the grating pore patterns shown in FIG. 88 is used for a ½ wave plate, the range of the grating interval T4 and the period L4 where the phase difference can be set near to 180° (within a range of 180°±20°) for light of all the red, infrared and blue wavelength regions corresponds to the range specified by the above formulas (19) to (21) (the range same as the range F3 in FIG. 45). The range of the grating interval T4 and the period L4 where the phase difference can be set near to 180° (within a range of 180°±20°) for light of at least the red and infrared wavelength regions corresponds to the range specified by the above formulas (22) and (23) (the range same as the range F4 in FIG. 45).

In the sixth embodiment, the grating interval T4 and the period L4 of the grating pore patterns of the aluminum oxide film 91 shown in FIG. 88 are set at the values in the range specified by the above formulas (19) to (21) (the range same as the range F3 in FIG. 45). Namely, in the sixth embodiment, in the case that the aluminum oxide film 91 having the grating pore patterns is used for a ¼ wave plate, the phase difference is set within the permissible range (90°±10°) in all of the red wavelength region, the infrared wavelength region and the blue wavelength region. In the case that the aluminum oxide film 91 having the grating pore patterns is used for a ½ wave plate, the phase difference is set within the permissible range (180°±20°) in all of the red wavelength region, the infrared wavelength region and the blue wavelength region.

Other construction of the sixth embodiment is similar to that of the aforementioned third or fourth embodiment.

In the sixth embodiment, as mentioned above, in the case that the aluminum oxide film 91 is used for a ¼ wave plate by setting the grating interval T4 and the period L4 of the grating pore patterns of the aluminum oxide film 91 composing a wave plate in the range (the range same as the range F3 in FIG. 45) specified by the formulas (19) to (21), the phase difference between two polarization components perpendicular to each other can be set near to 90° (within a range of 90°±10°) for light of all the red, infrared and blue wavelength regions. In the case that the aluminum oxide film 91 is used for a ½ wave plate, the phase difference between two polarization components perpendicular to each other can be set near to 180° (within a range of 180°±20°) for light of all the red, infrared and blue wavelength regions. As a result, it is possible to provide ¼ and ½ wave plates with preferable phase conversion characteristic over a wide wavelength range, similarly to the aforementioned fifth embodiment.

In the sixth embodiment, the diameter S42 of the small micropore 91b is set to be not larger than the reference value obtained by multiplying the largest diameter in the plurality of micropores formed in the aluminum oxide film 91 by 0.5, thus, the small micropore 91b has small influence on the phase conversion characteristic. Accordingly, with the aluminum oxide film 91 having the large micropores 91a and the small micropores 91b, adjusting the period L4 of the grating pore patterns composed of the plurality of large micropores 91a can easily provide a wave plate with preferable phase conversion characteristic.

A process of manufacturing the wave plate according to the sixth embodiment is now described with reference to FIG. 88.

First, a plurality of concave portions (not shown) are formed in the surface of the aluminum film (not shown) whereby being arranged in the form of a triangular lattice by a process similar to the fifth embodiment shown in FIGS. 85 to 87. In the sixth embodiment, a press member (not shown) having large projecting portions (not shown) arranged in a region corresponding to the micropore column 92 of the aluminum oxide film 91, and small projecting portions (not shown) arranged in a region other than the region corresponding to the micropore column 92 is used. That is, one concave-portion column (not shown) composed of a plurality of the concave portions with a large diameter, and two concave-portion columns (not shown) composed of a plurality of the concave portions with a small diameter are alternately formed in the surface of the aluminum film in the direction perpendicular to the direction that the optical axis extends.

Subsequently, the aluminum film with a plurality of the concave portions formed therein is subjected to anodic oxidation by a process similar to the first embodiment shown in FIG. 36. Thus, the aluminum oxide film 91 having the grating pore patterns with the plurality of large micropores 91a and the plurality of small micropores 91b are formed as shown in FIG. 88. In the grating pore patterns, one micropore column 92 composed of the large micropores 91a and two micropore columns 93 composed of the small micropores 91b are spaced at a predetermined interval from each other.

In the manufacturing process of the sixth embodiment, the concave portions corresponding to the large micropores 91a and the small micropores 91b are arranged in the form of a triangular lattice as mentioned above. Accordingly, anodic oxidation performed on the aluminum film with the concave portions formed therein can form the micropores 91a and 91b arranged in the form of a triangular lattice in the whole surface of the aluminum oxide film. In this case, since the center-to-center distance of the concave portions adjacent to each other in the direction that the optical axis extends (the Y direction) is substantially equal to the center-line to center-line distance of the concave portions adjacent to each other in the direction (the X direction) perpendicular to the direction that the optical axis extends, the anodic oxidation voltage can be set whereby being suitable for both the center-to-center distance of the concave portions adjacent to each other in the Y direction and the center-line to center-line distance of the concave portions adjacent to each other in the X direction. Therefore, it is possible to keep occurrence of branching of large micropores 91a that composes the grating pore patterns formed in the aluminum oxide film 91 inside the aluminum oxide film 91 in check.

Seventh Embodiment

Figure 89:
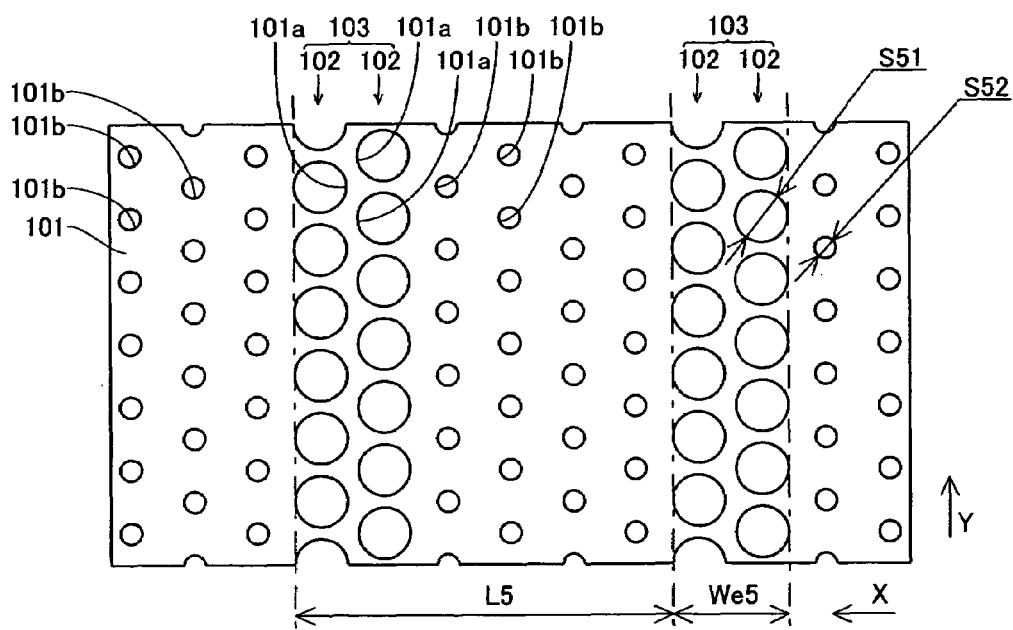
FIG. 89 is a plan view showing grating groove patterns of a wave plate according to a seventh embodiment of the present invention.

In a seventh embodiment, the following description describes a wave plate including an aluminum oxide film having linear grating pore patterns with a plurality of large micropores and a plurality of small micropores with reference to FIG. 89, dissimilarly to the aforementioned first and second embodiments. In the linear grating groove patterns, micropore groups including a plurality of micropore columns with a plurality of large micropores are spaced at a predetermined interval from each other.

In the seventh embodiment, as shown in FIG. 89, a plurality of the large micropore 110a with a diameter S51 and a plurality of small micropores 101b with a diameter S52 smaller than the diameter S51 of micropore 110a are formed on an aluminum oxide film 101 composing the wave plate. A plurality of micropores including the large micropores 101a and the small micropores 101b are arranged in the form of a triangular lattice. The aluminum oxide film 101 is an example of the "metal oxide film" in the present invention. The micropores 110a and 101b are examples of the "first pore" and the "second pore" in the present invention, respectively.

In the seventh embodiment, the linear grating groove patterns for phase conversion of incident light are composed of the plurality of large micropores 110a formed in the aluminum oxide film 101. The linear grating groove patterns have the construction in which a plurality of the micropore groups 103 including two micropore columns 102 composed of the plurality of large micropores 101a are spaced at the predetermined interval from each other in the direction of the arrow X that is perpendicular to the direction of the arrow Y (the direction that the optical axis extends). The micropore columns 102 composing the micropore group 103 are spaced at a predetermined interval from each other in the direction of the arrow X so that the micropore columns 102 adjacent to each other are not connected to each other in the direction of the arrow X. The plurality of micropores 101a of the micropore columns 102 are spaced at a predetermined interval from each other in the direction of the arrow Y so that the micropore 110a adjacent to each other are not connected to each other in the direction of the arrow Y. In the seventh embodiment, it is considered that the micropore group 103 composed of the plurality of micropores 110a that are not connected to each other is a groove of the linear grating groove patterns. The plurality of small micropores 101b are arranged in the form of a triangular lattice between the micropore groups 103 adjacent to each other in the direction of the arrow X. The micropore column 102 is an example of the "pore column" in the present invention. The micropore group 103 is an example of a "pore group" in the present invention.

The following description describes definition of the effective groove width We5 and the period L5 of the linear grating groove patterns of the aluminum oxide film 101 composing the wave plate according to the seventh embodiment. The effective groove width We5 is a mean value of the distance between lines tangent to the outermost ends on one side and another side of the pore group 103. The period L5 is a mean value of the distance between lines tangent to the outermost ends on one side of the micropore groups 103 adjacent to each other. That is, definition of the effective groove width We5 and the period L5 is made based only on the micropore groups composed of the large micropores 101a without consideration of the small micropores 101b. In this case, the effective duty ratio De of the linear grating groove patterns is obtained by the formula De=(L5−We5)/L5.

The following description describes definition of the large micropore 110a and the small micropore 101b. The large micropore 101a is a micropore with a diameter larger than a reference value. The reference value is the value obtained by multiplying the largest diameter in the plurality of micropores formed in the aluminum oxide film 101 by 0.5. The small micropore 101b is a micropore with a diameter that is not larger than the above reference value.

In the case that the diameter S52 of the small micropore 101b is not larger than the above reference value, it is considered that the small micropore 101b has small influence on the phase conversion characteristic, similarly to the aforementioned fifth embodiment. In the seventh embodiment, the area of small micropore 101b is set at ¼ or less the area of large micropore 110a. For this reason, it is considered that the small micropore 101b has very small influence on the phase conversion. In the seventh embodiment, the period L5 of the linear grating groove patterns composed of the plurality of large micropores 110a is designed to be close to the wavelength of the blue, red and infrared light. For this reason, it is considered that the linear grating groove patterns composed of the plurality of large micropores 110a has influence on the phase conversion that is larger than the small micropores 101b. Accordingly, in the case that the aluminum oxide film 101 having the linear grating groove patterns shown in FIG. 89 is used for a wave plate, it is considered that defining the effective duty ratio De (=(L5−We5)/L5) and the period L5 as mentioned above can show the range of the effective duty ratio De and the period L5 of the linear grating groove patterns composed of the aluminum oxide film 101 capable of obtaining preferable phase conversion characteristic for light containing a plurality of different wavelength regions as the range similar to the first embodiment shown in FIG. 2.

Accordingly, in the case that the grating pore patterns having the effective duty ratio De (=(L5−We5)/L5) and the period L5 shown in FIG. 89 are applied to a ¼ wave plate, the following formulas (24) to (27) similar to the formulas (1) to (4) of the aforementioned first embodiment can specify the range where the phase difference between two polarization components perpendicular to each other can be set near to 90° (within a range of 90°±10°) for light of all the red, infrared and blue wavelength regions.

$$De \geq 0.73 \tag{24}$$

$$L5 \leq 0.4 \tag{25}$$

$$L5 \geq 30.952De^3 - 74.751De^2 + 59.62De - 15.328 \tag{26}$$

$$L5 \leq 3.0776De^2 - 5.1863De + 2.5772 \tag{27}$$

The following formulas (28) to (31) similar to the formulas (5) to (8) of the aforementioned first embodiment can specify the range where the phase difference between two polarization components perpendicular to each other can be set near to 90° (within a range of 90°±10°) for light of at least the red and infrared wavelength regions.

$$L5 \leq 0.65 \tag{28}$$

$$L5 \geq 2 \times 10^{-14} e^{31.263De} \tag{29}$$

$$L5 \leq 6.0317De^2 - 10.352De + 5.0516 \tag{30}$$

$$(De-0.85)^2/0.44^2 + (L5-0.41)^2/0.39^2 \leq 1 \tag{31}$$

Accordingly, in the case that the aluminum oxide film 101 having the linear grating groove patterns shown in FIG. 89 is used for a ¼ wave plate, setting the effective duty ratio De and the period L5 in the range (the range same as the range F1 in FIG. 2) specified by the formulas (24) to (27) can set the phase difference between two polarization components perpendicular to each other near to 90° (within a range of 90°±10°) for light of all the red, infrared and blue wavelength regions. Setting the effective duty ratio De and the period L5 in the range (the range same as the range F2 in FIG. 2) specified by the formulas (28) to (31) can set the phase difference between two polarization components perpendicular to each other near to 90° (within a range of 90°±10°) for light of at least the red and infrared wavelength regions. In the case that the aluminum oxide film 101 having the linear grating groove patterns shown in FIG. 89 is used for a ½ wave plate, the range of the effective duty ratio De and the period L5 where the phase difference can be set near to 180° (within a range of 180°±20°) for light of all the red, infrared and blue wavelength regions corresponds to the range specified by the above formulas (24) to (27) (the range same as the range F1 in FIG. 2). The range of the effective duty ratio De and the period L5 where the phase difference can be set near to 180° (within a range of 180°±20°) for light of at least the red and infrared wavelength regions corresponds to the range specified by the above formulas (28) to (31) (the range same as the range F2 in FIG. 2).

In the seventh embodiment, the effective duty ratio De and the period L5 of the linear grating groove patterns of the aluminum oxide film 101 shown in FIG. 89 are set at the values within the range specified by the above formulas (24) to (27) (the range same as the range F1 in FIG. 2). Namely, in the seventh embodiment, in the case that the aluminum oxide film 101 having the linear grating groove patterns is used for a ¼ wave plate, the phase difference is set within the permissible range (90°±10°) in all of the red wavelength region, the infrared wavelength region and the blue wavelength region. In the case that the aluminum oxide film 101 having the linear grating groove patterns is used for a ½ wave plate, the phase difference is set within the permissible range (180°±20°) in all of the red wavelength region, the infrared wavelength region and the blue wavelength region.

Other construction of the seventh embodiment is similar to that of the aforementioned first or second embodiment.

In the seventh embodiment, as mentioned above, in the case that the aluminum oxide film 101 is used for a ¼ wave plate by setting the effective duty ratio De (=(L5−We5)/L5) and the period L5 of the linear grating groove patterns of the aluminum oxide film 101 composing a wave plate in the range (the range same as the range F1 in FIG. 2) specified by the formulas (24) to (27), the phase difference between two polarization components perpendicular to each other can be set near to 90° (within a range of 90°±10°) for light of all the red, infrared and blue wavelength regions. In the case that the aluminum oxide film 101 is used for a ½ wave plate, the phase difference between two polarization components perpendicular to each other can be set near to 180°

(within a range of 180°±20°) for light of all the red, infrared and blue wavelength regions. As a result, it is possible to provide ¼ and ½ wave plates with preferable phase conversion characteristic over a wide wavelength range, similarly to the aforementioned first and second embodiments.

In the seventh embodiment, the diameter S52 of the small micropore 101b is set to be not larger than the reference value obtained by multiplying the largest diameter in the plurality of micropores formed in the aluminum oxide film 101 by 0.5, thus, the small micropore 101b has small influence on the phase conversion characteristic. Accordingly, with the aluminum oxide film 101 having the large micropores 101a and the small micropores 11b, adjusting the period L5 (a mean value of the distance between lines tangent to the outermost ends on one side of the micropore groups 103 adjacent to each other) of the grating pore patterns composed of the plurality of large micropores 110a can easily provide a wave plate with preferable phase conversion characteristic.

A process of manufacturing the wave plate according to the seventh embodiment is now described with reference to FIG. 89.

First, a plurality of concave portions (not shown) are formed in the surface of the aluminum film (not shown) whereby being arranged in the form of a triangular lattice by a process similar to the fifth embodiment shown in FIGS. 85 to 87. In the seventh embodiment, a press member (not shown) having large projecting portions (not shown) arranged in a region corresponding to the micropore group 103 of the aluminum oxide film 101, and small projecting portions (not shown) arranged in a region other than the region corresponding to the micropore group 103 is used. That is, concave-portion groups (not shown) including two concave-portion columns composed of a plurality of the concave portions with a large diameter are formed in the surface of the aluminum film whereby being spaced at a predetermined interval from each other in the direction perpendicular to the direction that the optical axis extends. A plurality of the concave portions with a small diameter are formed in the form of a triangular lattice between the concave-portion groups in the surface of the aluminum film adjacent to each other in the direction perpendicular to the direction that the optical axis extends.

Subsequently, the aluminum film with a plurality of the concave portions formed therein is subjected to anodic oxidation by a process similar to the first embodiment shown in FIG. 36. Thus, the aluminum oxide film 101 having the linear grating groove patterns with the plurality of large micropores 110a and the plurality of small micropores 101b are formed as shown in FIG. 89. In the linear grating groove patterns, a plurality of the micropore groups 103 including two micropore columns 102 that are composed of the plurality of large micropores 110a are spaced at a predetermined interval from each other.

In the manufacturing process of the seventh embodiment, the concave portions corresponding to the large micropores 110a and the small micropores 101b are arranged in the form of a triangular lattice as mentionrd above. Accordingly, anodic oxidation performed on the aluminum film with the concave portions formed therein can form the micropores 110a and 101b arranged in the form of a triangular lattice in the whole surface of the aluminum oxide film 101. In this case, since the center-to-center distance of the concave portions adjacent to each other in the direction that the optical axis extends (the Y direction) is substantially equal to the center-line to center-line distance of the concave portions adjacent to each other in the direction (the X direction) perpendicular to the direction that the optical axis extends, the anodic oxidation voltage can be set whereby being suitable for both the center-to-center distance of the concave portions adjacent to each other in the Y direction and the center-line to center-line distance of the concave portions adjacent to each other in the X direction. Therefore, it is possible to keep occurrence of branching of large micropores 110a that composes the linear grating groove patterns formed in the aluminum oxide film 101 inside the aluminum oxide film 101 in check.

The following manufacturing process may be used as a modified embodiment based on the above manufacturing process of the seventh embodiment. First, after a plurality of concave portions with the same diameter are formed in the form of a triangle lattice in the surface of the aluminum film, and then the aluminum film is subjected to anodic oxidation. Thus, the aluminum oxide film 101 having the plurality of concave portions 101b with the same size that are arranged in the form of a triangle lattice therein is formed. After that, a photoresist is formed on a region other than the region corresponding to the micropore group 103 (see FIG. 89) of the aluminum oxide film 101. Subsequently, the aluminum oxide film 101 having the plurality of small micropores 101b with the same size that are arranged in the form of a triangle lattice therein is etched by an aqueous solution of phosphoric acid group, thus, only the diameter of small micropore 101b located in the region corresponding to the micropore group 103 is enlarged. Accordingly, the aluminum oxide film 101 having the linear grating groove patterns with the plurality of large micropores 101a and the plurality of small micropores 101b are formed as shown in FIG. 89. In the linear grating groove patterns, a plurality of the micropore groups 103 including two micropore columns 102 that are composed of the plurality of large micropores 101a are spaced at a predetermined interval from each other.

Eighth Embodiment

Figure 90:
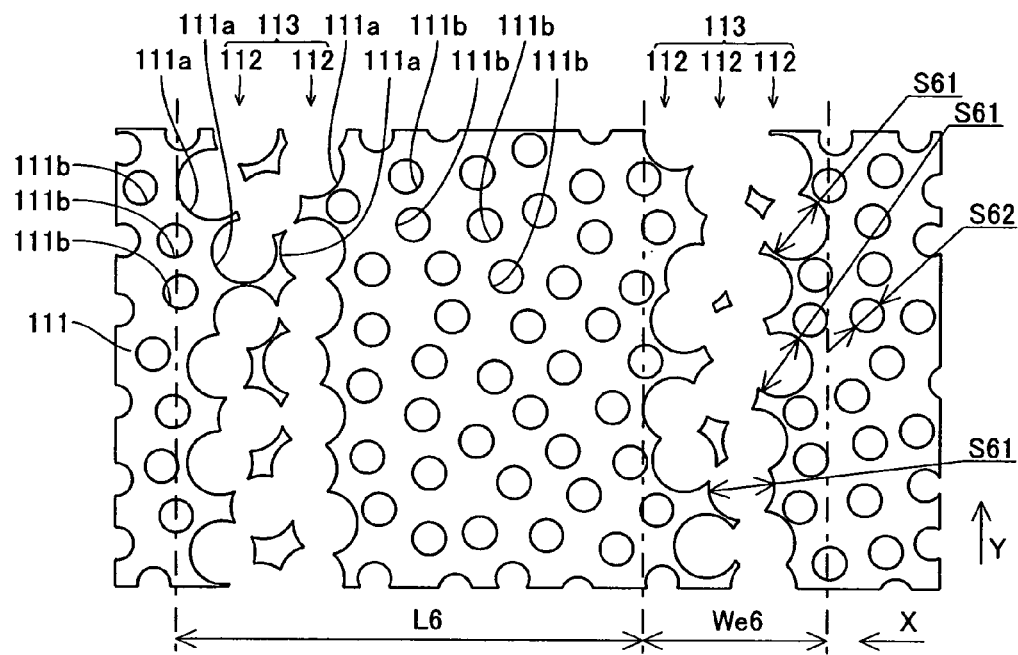
FIG. 90 is a plan view showing grating groove patterns of a wave plate according to an eighth embodiment of the present invention.

In an eighth embodiment, the following description describes the case where a plurality of large micropores of a micropore group that composes linear grating groove patterns are connected to at least one large micropore adjacent to them with reference to FIG. 90, dissimilarly to the aforementioned seventh embodiment.

In the eighth embodiment, as shown in FIG. 90, a plurality of the large micropore 111a with a diameter S61 and a plurality of small micropores 111b with a diameter S62 smaller than the diameter S61 of micropore 111a are formed on an aluminum oxide film 111 composing a wave plate. A plurality of micropores including the large micropores 111a and the small micropores 111b are arranged over the whole surface. The aluminum oxide film 111 is an example of the "metal oxide film" in the present invention. The micropores 111a and 111b are examples of the "first pore" and the "second pore" in the present invention, respectively.

In the eighth embodiment, the linear grating groove patterns for phase conversion of incident light are composed of the plurality of large micropores 111a formed in the aluminum oxide film 111. The linear grating groove patterns have the construction in which a plurality of the micropore groups 113 including a plurality of micropore columns 112 composed of the plurality of large micropores 111a are spaced at the predetermined interval from each other in the direction of the arrow X that is perpendicular to the direction of the arrow Y (the direction that the optical axis extends). The plurality of large micropores 111a of the micropore column 112 that composes the micropore group 113 is arranged so that they are connected to at least one large micropore adjacent to them. The plurality of small micropores 111b are arranged between the micropore groups adjacent to each other in the direction of the arrow X so as not to be connected to each other. The micropore column 112 is an example of the "pore column" in the present invention. The micropore group 113 is an example of the "pore group" in the present invention.

The following description describes definition of the effective groove width We6 and the period L6 of the linear grating groove patterns of the aluminum oxide film 111 composing the wave plate according to the eighth embodiment. The effective groove width We6 is a mean value of the distance between lines tangent to the outermost ends on one side and another side of the pore group 113. The period L6 is a mean value of the distance between lines tangent to the outermost ends on one side of the micropore groups 113 adjacent to each other. That is, definition of the effective groove width We6 and the period L6 is made based only on the large micropores 111a without consideration of the small micropores 111b. In this case, the effective duty ratio De of the linear grating groove patterns is obtained by the formula De=(L6−We6)/L6.

The following description describes definition of the large micropore 111a and the small micropore 111b. The large micropore 111a is a micropore with a diameter larger than a reference value. The reference value is the value obtained by multiplying the largest diameter in the plurality of micropores formed in the aluminum oxide film 111 by 0.5. The small micropore 111b is a micropore with a diameter that is not larger than the above reference value.

In the case that the diameter S62 of the small micropore 111b is not larger than the above reference value, it is considered that the small micropore 111b has small influence on the phase conversion characteristic, similarly to the aforementioned fifth embodiment. In the eighth embodiment, the area of small micropore 111b is set at ¼ or less the area of large micropore 111a. For this reason, it is considered that the small micropore 111b has very small influence on the phase conversion. In the eighth embodiment, the period L6 of the linear grating groove patterns composed of the plurality of large micropores 111a is designed to be close to the wavelength of the blue, red and infrared light. For this reason, it is considered that the linear grating groove patterns composed of the plurality of large micropores 111a have influence on the phase conversion that is larger than the small micropores 111b. Accordingly, in the case that the aluminum oxide film 111 having the linear grating groove patterns shown in FIG. 90 is used for a wave plate, it is considered that defining the effective duty ratio De (=(L6−We6)/L6) and the period L6 as mentioned above can show the range of the effective duty ratio De and the period L6 of the linear grating groove patterns composed of the aluminum oxide film 111 capable of obtaining preferable phase conversion characteristic for light containing a plurality of different wavelength regions as the range similar to the first embodiment shown in FIG. 2.

Accordingly, in the case that the grating pore patterns having the effective duty ratio De (=(L6−We6)/L6 and the period L6) shown in FIG. 90 are applied to a ¼ wave plate, the following formulas (32) to (35) similar to the formulas (1) to (4) of the aforementioned first embodiment can specify the range where the phase difference between two polarization components perpendicular to each other can be set near to 90° (within a range of 90°±10°) for light of all the red, infrared and blue wavelength regions.

$$De \geq 0.73 \tag{32}$$

$$L6 \leq 0.4 \tag{33}$$

$$L6 \geq 30.952De^3 - 74.751De^2 + 59.62De - 15.328 \tag{34}$$

$$L6 \leq 3.0776De^2 - 5.1863De + 2.5772 \tag{35}$$

The following formulas (36) to (39) similar to the formulas (5) to (8) of the aforementioned first embodiment can specify the range where the phase difference between two polarization components perpendicular to each other can be set near to 90° (within a range of 90°±10°) for light of at least the red and infrared wavelength regions.

$$L6 \leq 0.65 \tag{36}$$

$$L6 \geq 2 \times 10^{-14} e^{31.263 De} \tag{37}$$

$$L6 \leq 6.0317De^2 - 10.352De + 5.0516 \tag{38}$$

$$(De - 0.85)^2/0.44^2 + (L6 - 0.41)^2/0.39^2 \leq 1 \tag{39}$$

Accordingly, in the case that the aluminum oxide film 111 having the linear grating groove patterns shown in FIG. 90 is used for a ¼ wave plate, setting the effective duty ratio De and the period L6 in the range (the range same as the range F1 in FIG. 2) specified by the formulas (32) to (35) can set the phase difference between two polarization components perpendicular to each other near to 90° (within a range of 90°±10°) for light of all the red, infrared and blue wavelength regions. Setting the effective duty ratio De and the period L6 in the range (the range same as the range F2 in FIG. 2) specified by the formulas (36) to (39) can set the phase difference between two polarization components perpendicular to each other near to 90° (within a range of 90°±10°) for light of at least the red and infrared wavelength regions. In the case that the aluminum oxide film 111 having the linear grating groove patterns shown in FIG. 90 is used for a ½ wave plate, the range of the effective duty ratio De and the period L6 where the phase difference can be set near to 180° (within a range of 180°±20°) for light of all the red, infrared and blue wavelength regions corresponds to the range specified by the above formulas (32) to (35) (the range same as the range F1 in FIG. 2). The range of the effective duty ratio De and the period L6 where the phase difference can be set near to 180° (within a range of 180°±20°) for light of at least the red and infrared wavelength regions corresponds to the range specified by the above formulas (36) to (39) (the range same as the range F2 in FIG. 2).

In the eighth embodiment, the effective duty ratio De and the period L6 of the linear grating groove patterns of the aluminum oxide film 111 shown in FIG. 90 are set at the values within the range specified by the above formulas (32) to (35) (the range same as the range F1 in FIG. 2). Namely, in the eighth embodiment, in the case that the aluminum oxide film 111 having the linear grating groove patterns is used for a ¼ wave plate, the phase difference is set within the permissible range (90°±10°) in all of the red wavelength region, the infrared wavelength region and the blue wavelength region. In the case that the aluminum oxide film 111 having the linear grating groove patterns is used for a ½ wave plate, the phase difference is set within the permissible range (180°±20°) in all of the red wavelength region, the infrared wavelength region and the blue wavelength region.

Other construction of the eighth embodiment is similar to that of the aforementioned first or second embodiment.

In the eighth embodiment, as mentioned above, in the case that the aluminum oxide film 111 is used for a ¼ wave plate by setting the effective duty ratio De (=(L6−We6)/L6) and the period L6 of the linear grating groove patterns of the aluminum oxide film 111 composing a wave plate in the range (the range same as the range F1 in FIG. 2) specified by the formulas (32) to (35), the phase difference between two polarization components perpendicular to each other can be set near to 90° (within a range of 90°±10°) for light of all the red, infrared and blue wavelength regions. In the case that the aluminum oxide film 111 is used for a ½ wave plate, the phase difference between two polarization components perpendicular to each other can be set near to 180° (within a range of 180°±20°) for light of all the red, infrared and blue wavelength regions. As a result, it is possible to provide ¼ and ½ wave plates with preferable phase conversion characteristic over a wide wavelength range, similarly to the aforementioned seventh embodiment.

In the eighth embodiment, the diameter S62 of the small large micropore 111b is set to be not larger than the reference value obtained by multiplying the largest diameter in the plurality of micropores formed in the aluminum oxide film 111 by 0.5, thus, the small micropore 111b has small influence on the phase conversion characteristic. Accordingly, with the aluminum oxide film 111 having the large micropores 111a and the small micropores 111b, adjusting the period L6 (a mean value of the distance between lines tangent to the outermost ends on one side of the micropore groups 113 adjacent to each other) of the grating pore patterns composed of the plurality of large micropores 111a can easily provide a wave plate with preferable phase conversion characteristic.

A process of manufacturing the wave plate according to the eighth embodiment is now described with reference to FIG. 90.

First, a plurality of concave portions (not shown) are formed in the surface of the aluminum film (not shown) whereby being arranged by a process similar to the fifth embodiment shown in FIGS. 85 to 87. In the eighth embodiment, a press member (not shown) having a plurality of projecting portions, and large projecting portions (not shown) arranged in a region corresponding to the micropore group 113 of the aluminum oxide film 111, and small projecting portions (not shown) arranged in a region other than the region corresponding to the micropore group 113 is used. That is, concave-portion groups (not shown) including a plurality of concave-portion columns composed of a plurality of concave portions with a large diameter are formed in the surface of the aluminum film whereby being spaced at a predetermined interval from each other in the direction perpendicular to the direction that the optical axis extends. A plurality of the concave portions with a small diameter are formed between the concave-portion groups in the surface of the aluminum film adjacent to each other in the direction perpendicular to the direction that the optical axis extends.

Subsequently, the aluminum film with a plurality of the concave portions formed therein is subjected to anodic oxidation by a process similar to the first embodiment shown in FIG. 36. Thus, the aluminum oxide film 111 having the linear grating groove patterns with the plurality of large micropores 111a and the plurality of small micropores 111b are formed as shown in FIG. 90. In the linear grating groove patterns, a plurality of the micropore groups 113 including a plurality of micropore columns 112 that are composed of the plurality of large micropores 111a are spaced at a predetermined interval from each other.

In the manufacturing process of the eighth embodiment, the concave portions corresponding to the large micropores 111a and the small micropores 111b are arranged over the whole surface as mentioned above. Accordingly, anodic oxidation performed on the aluminum film with the concave portions formed therein can form the micropores 111a and 111b arranged over the whole surface of the aluminum oxide film 111. In this case, since the difference between the center-to-center distance of the concave portions adjacent to each other in the direction that the optical axis extends (the Y direction) and the center-line to center-line distance of the concave portions adjacent to each other in the direction (the X direction) perpendicular to the direction that the optical axis extends can be small, the anodic oxidation voltage can be set whereby being suitable for both the center-to-center distance of the concave portions adjacent to each other in the Y direction and the center-line to center-line distance of the concave portions adjacent to each other in the X direction. Therefore, it is possible to keep occurrence of branching of large micropores 111a that composes the linear grating groove patterns formed in the aluminum oxide film 111 inside the aluminum oxide film 111 in check.

The following manufacturing process may be used as a modified embodiment based on the above manufacturing process of the eighth embodiment. First, the aluminum film in which the concave portions are not formed is subjected to anodic oxidation. Thus, the aluminum oxide film 111 having the plurality of small micropores 111b with the same size that are arranged at random therein is formed. After that, a photoresist is formed on a region other than the region corresponding to the micropore group 113 (see FIG. 90) of the aluminum oxide film 111. Subsequently, the aluminum oxide film 111 having the plurality of small micropores 111b with the same size that are arranged at random therein is etched by an aqueous solution of phosphoric acid group, thus, only the diameter of small micropore 111b located in the region corresponding to the micropore group 113 is enlarged. Thus, the aluminum oxide film 111 having the linear grating groove patterns with the plurality of large micropores 111a and the plurality of small micropores 111b are formed as shown in FIG. 90. In the linear grating groove patterns, a plurality of the micropore groups 113 including a plurality of micropore columns 112 that are composed of the plurality of large micropores 111a are spaced at a predetermined interval from each other.

Although the present invention has been described and illustrated in detail, it is clearly understood that the same is by way of illustration and example only and is not to be taken by way of limitation, the spirit and scope of the present invention being limited only by the terms of the appended claims.

For example, in the aforementioned first or second embodiment, the effective duty ratio De and the period L1 of the linear grating groove patterns of the aluminum oxide film are set at values within the range F1 (for example, De: 0.88, L1: 0.38 (the coordinate point P in FIG. 2)) specified by the four formulas (1) to (4), however, the present invention is not limited to this but they may be set at values within the range F2 specified by the foregoing four formulas (5) to (8). In this case, it is possible to provide a wave plate with preferable phase conversion characteristics at least in the red wavelength region and the infrared wavelength region.

In the aforementioned first or second embodiment, though the wave plate according to the present invention is applied to a CD-R/DVD compatible optical pickup device or a liquid crystal projector device as an optical device, the present invention is not limited to this, but it may be applied to optical devices which need a wave plate with preferable phase conversion characteristic over a wide wavelength range other than a CD-R/DVD compatible optical pickup device and a liquid crystal projector device. In addition, the wave plate according to the aforementioned third or fourth embodiment may be applied to optical devices which need a wave plate with preferable phase conversion characteristic over a wide wavelength range.

Furthermore, while the transparent conductor film is formed between the glass substrate and the aluminum oxide film in each of the aforementioned first to fourth embodiments, the present invention is not limited to this but the transparent conductor film may not be formed between the glass substrate and the aluminum oxide film.

Still further, while the grating groove patterns or the grating pore patterns are formed by anodic oxidation in each of the aforementioned first to fourth embodiments, the present invention is not limited to this but the grating groove patterns or the grating pore patterns may be formed by a method other than anodic oxidation as long as grating groove patterns or grating pore patterns having a large depth with a uniform groove width and diameter along the depth direction can be formed.

Still further, while the grating groove patterns or the grating pore patterns are formed by anodic oxidation performed on the aluminum film, the present invention is not limited to this but the grating groove patterns or the grating pore patterns may be formed by anodic oxidation performed on another valve metal such as titanium or tantalum. In this case, it is necessary to specify the range of the effective duty ratio and the period of grating groove patterns (wave plate) capable of maintaining particular characteristics for light containing a plurality of different wavelength regions anew. Additionally, it is necessary to specify the range of the pore interval and the period of grating groove patterns or the grating pore patterns (wave plate) capable of maintaining particular characteristics for light containing a plurality of different wavelength regions anew.

Still further, while the electrolyte employed for anodic oxidation is prepared from phosphoric acid in each of the aforementioned first to fourth embodiments, the present invention is not limited to this but the electrolyte may alternatively be prepared from sulfuric acid or oxalic acid or the like.

Still further, while the cathode employed for anodic oxidation is prepared from platinum in each of the aforementioned first to fourth embodiments, the present invention is not limited to this but the cathode may alternatively be prepared from another material.

Still further, in the third or fourth embodiment, the micropore interval T2 and the period L2 of the grating pore patterns of the aluminum oxide film are set at values within the range F3 (for example, T2: 0.10, L2: 0.35 (the coordinate point Q in FIG. 45)) specified by the foregoing three formulas (9) to (11), however the present invention is not limited to this but they may be set at values within the range F4 specified by the foregoing two formulas (12) and (13). In this case, it is possible to provide a wave plate with preferable phase conversion characteristics at least in the red wavelength region and the infrared wavelength region.

Figure 91:
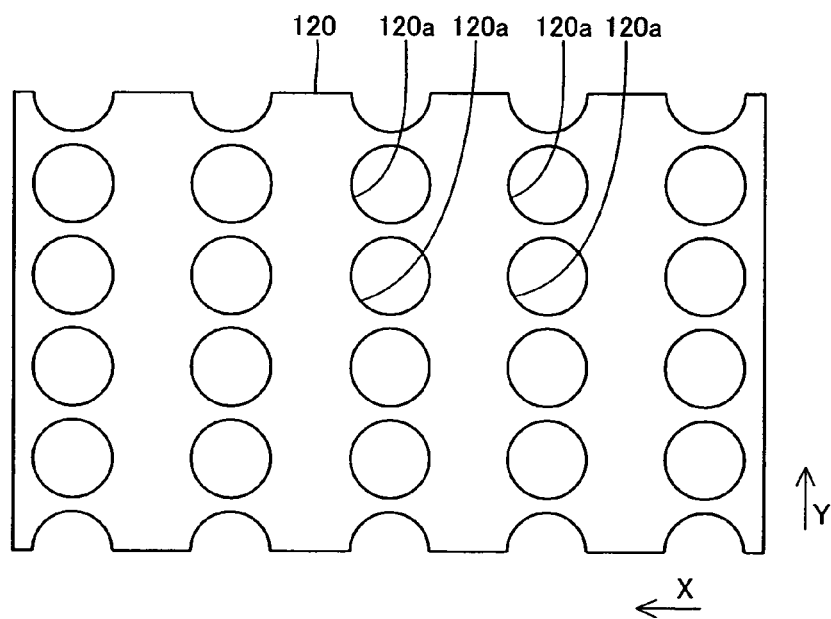
FIG. 91 is a plan view showing grating pore patterns of a wave plate according to a modified embodiment based on the third and fourth embodiment.
Figure 92:
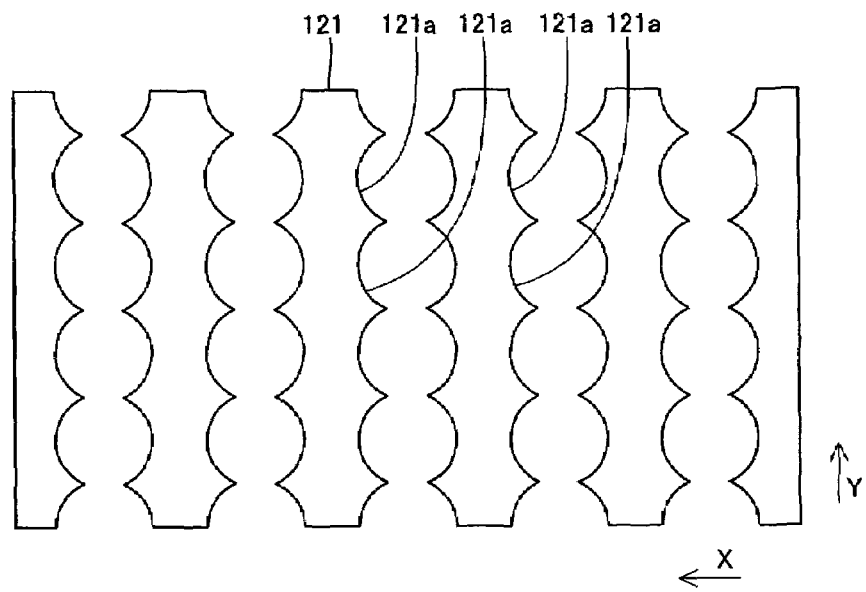
FIG. 92 is a plan view showing grating pore patterns of a wave plate according to a modified embodiment based on the third and fourth embodiment.
Figure 93:
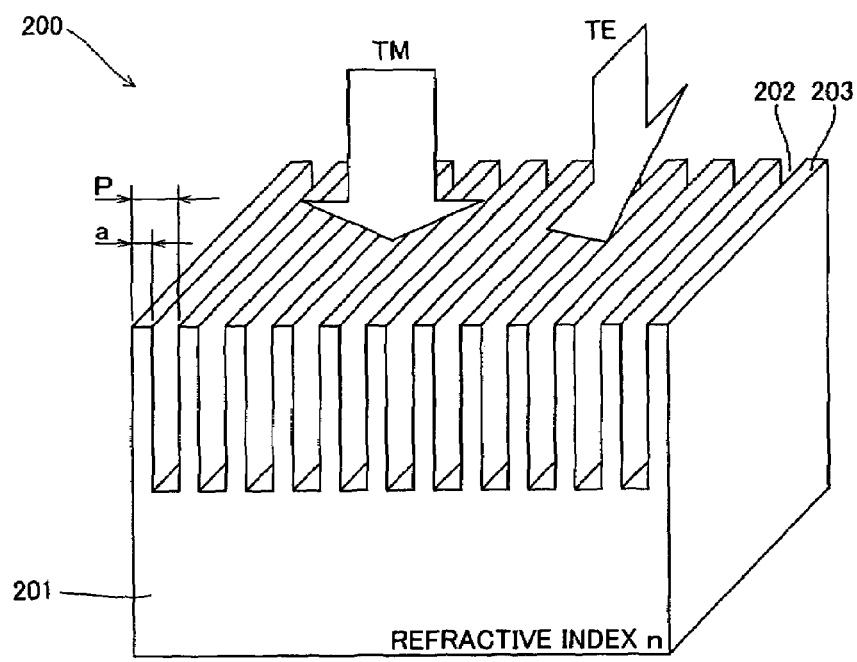
FIG. 93 is a perspective view showing the concept of a conventional wave plate having linear grating groove patterns.
Figure 94:
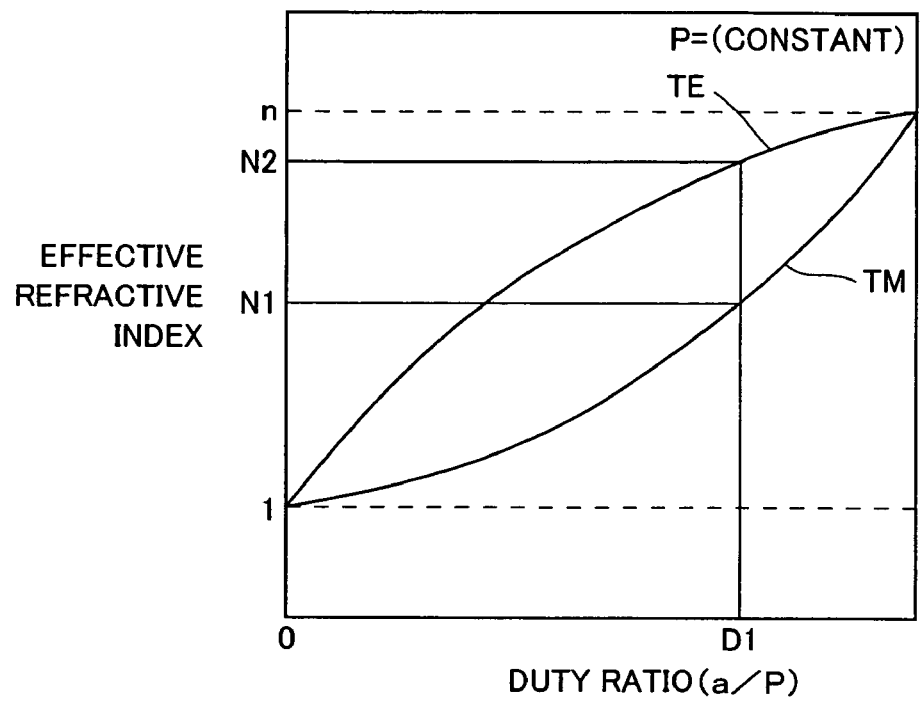
FIG. 94 is a correlation diagram showing the relationship between the effective refractive index and the duty ratio of the conventional wave plate shown in FIG. 93.
Figure 95:
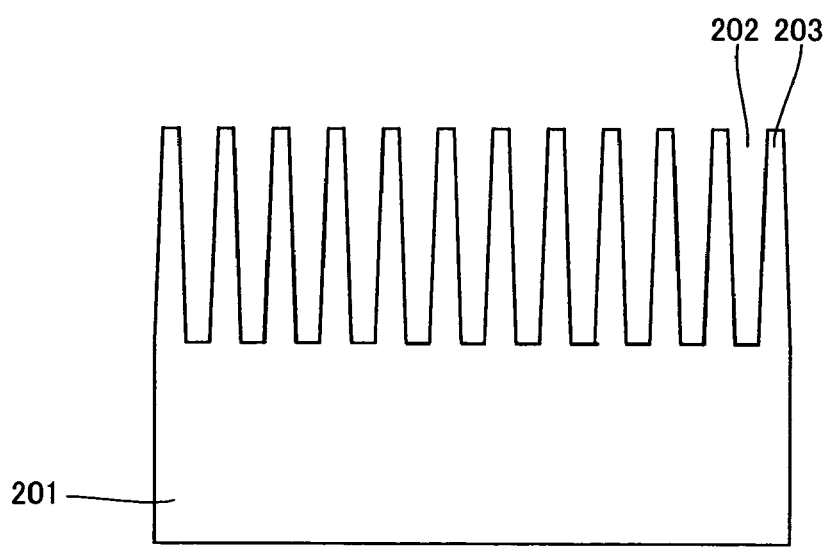
FIG. 95 is a sectional view of a wave plate having grating groove patterns formed by conventional photolithography and etching.
Figure 96:
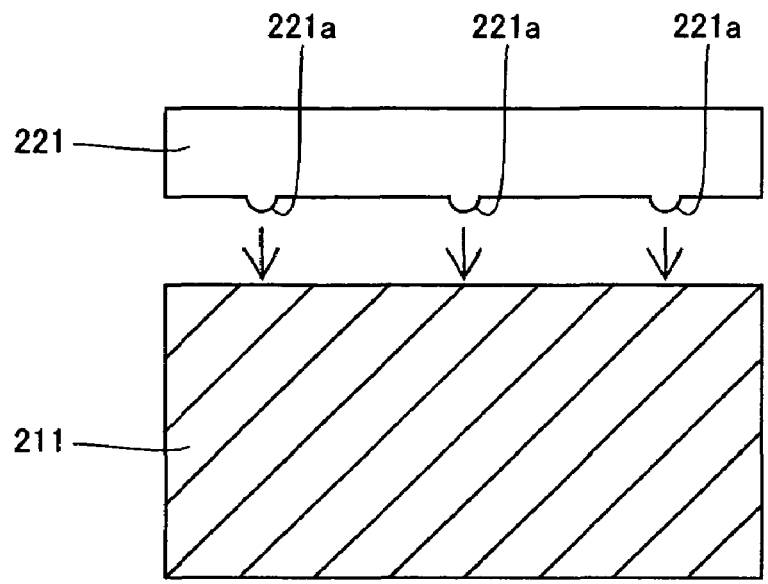
FIGS. 96 to 99 are sectional views for illustrating a conventional process of manufacturing a triangular lattice pattern by anodic oxidation.
Figure 97:
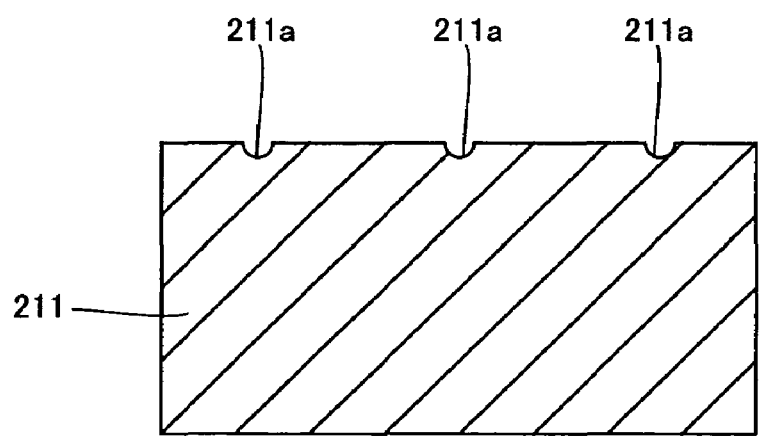
Figure 98:
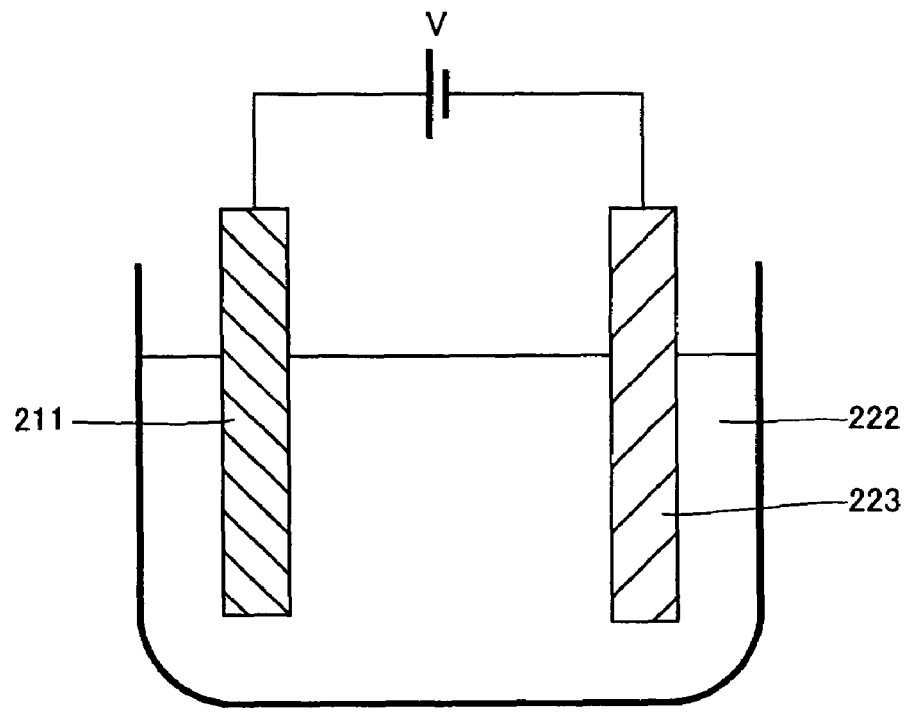
Figure 99:
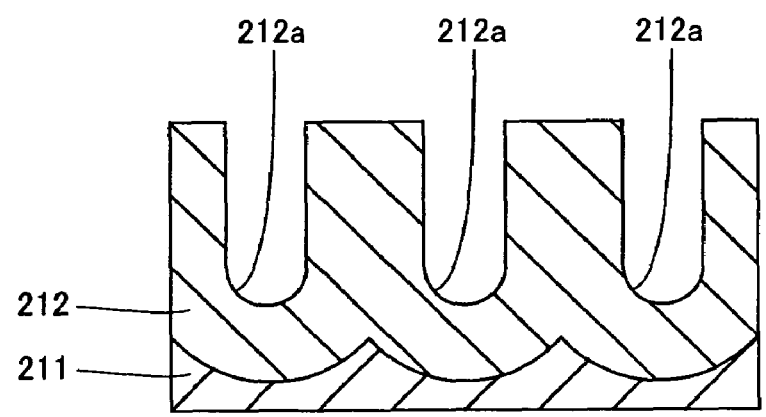
Figure 100:
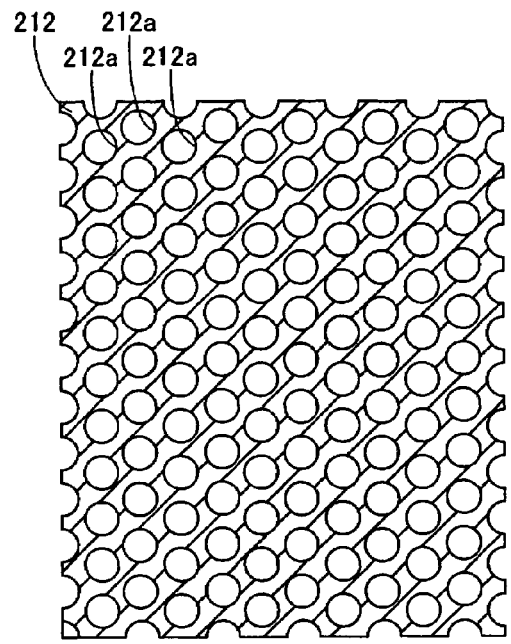
FIG. 100 is a plan view showing a two-dimensional photonic crystal formed by conventional anodic oxidation.
Figure 101:
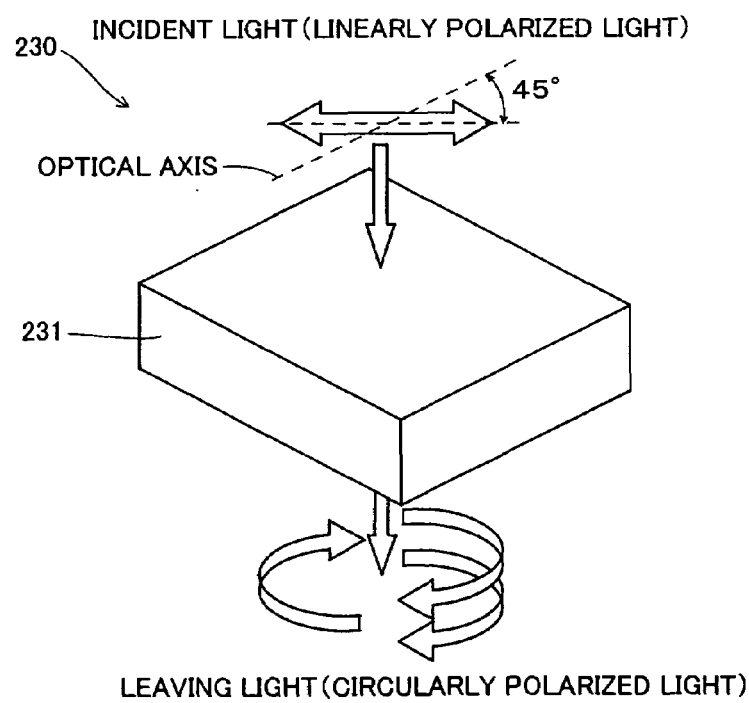
FIGS. 101 is a perspective view showing the concept of ¼ wave plate consisting of quartz crystal.
Figure 102:
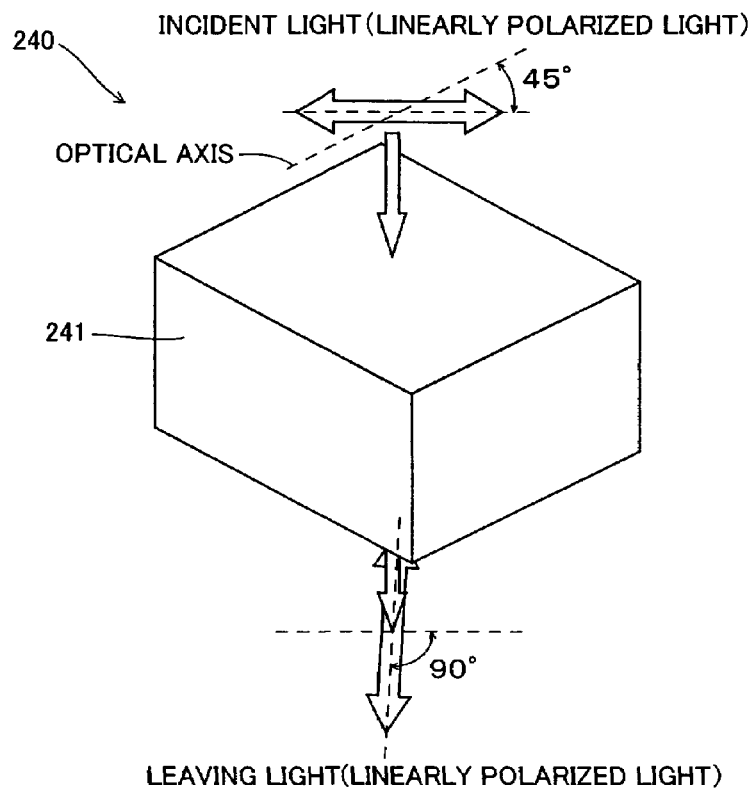
FIGS. 102 is a perspective view showing the concept of ½ wave plate consisting of quartz crystal.
Figure 103:
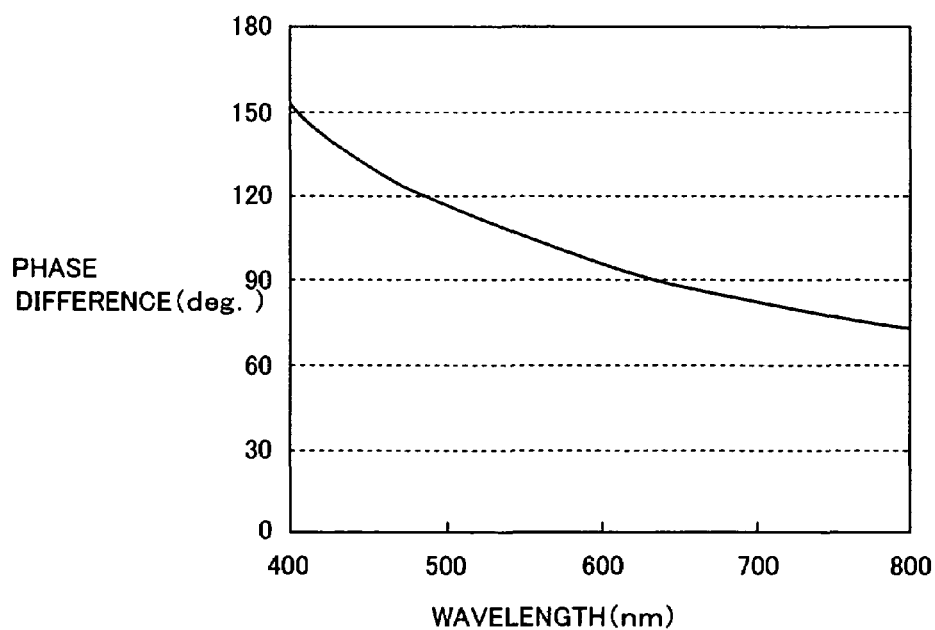
FIG. 103 shows a simulation result of relationship between a wavelength and a phase difference of a ¼ wave plate consisting of quartz crystal.

Still further, while the aluminum oxide film having grating pore patterns with a plurality of micropores that are arranged in the form of a triangular lattice is used as an aluminum oxide film composing a wave plate in the third or fourth embodiment, however the present invention is not limited to this but an aluminum oxide film 120 having grating pore patterns with a plurality of micropores 120a that are arranged in the form of a quadrangle lattice may be formed as shown in FIG. 91. In addition, an aluminum oxide film 121 may be formed whereby having grating groove patterns with in a plurality of micropore 121a arranged in the form of a quadrangle lattice where the micropores 121a adjacent to each other in the direction of the arrow Y (the direction that the optical axis extends) are connected to each other as shown in FIG. 92. However, when an aluminum film is oxidized by anodic oxidation, micropores arranged in the form of a triangle lattice tend to be formed in a self-organized manner. For this reason, it is preferable to use an aluminum oxide film having grating pore patterns or grating groove patterns of a plurality of micropores arranged in the form of a triangular lattice.

Still further, while the plurality of large concave portions and the plurality of small concave portions are formed in the surface of the aluminum film by texturing by means of the press member having the plurality of large projecting portions and small projecting portions in each of the aforementioned fifth to eighth embodiments, the present invention is not limited to this but the plurality of small concave portions may be formed by forming asperities in the region on the surface of the aluminum film other than the region where the large concave portions are formed after only the plurality of large concave portions are formed on the surface of the aluminum film by texturing by means of the press member having only the plurality of large projecting portions. Anode oxidation on the aluminum film with the concave portions formed therein as mentioned above forms the large micropores in the region on the surface of the aluminum film corresponding to the large concave portions, and forms the small micropores in the region on the surface with asperities formed therein corresponding to a triangle lattice patterns. In the case that asperities are formed on the surface of the aluminum film, it is preferable that the surface of the aluminum film is etched at power of about 100 to about 500 W for about 10 minutes with $CF_4$ gas and $H_2$ gas by the RIE (Reactive Ion Etching) method. Furthermore, asperities may be formed on the surface of the aluminum film by annealing the surface of the aluminum film in inert gases under the temperature condition of about 200 to about 600° C. for 30 minutes.

Still further, while one or two micropore column(s) composed of the plurality of small micropores is/are arranged between micropore columns, which are composed of the plurality of large micropores, composing the grating pore patterns in the aforementioned fifth or sixth embodiment, the present invention is not limited to this but three or more micropore columns composed of the plurality of small micropores may be arranged between micropore columns, which are composed of the plurality of large micropores, composing the grating pore patterns.

Moreover while the small micropores are not arranged between micropore columns of the micropore groups, which are composed of the plurality of large micropores, composing the grating groove patterns in the aforementioned seventh embodiment, the present invention is not limited to this but the small micropores may be arranged between micropore columns of the micropore groups, which are composed of the plurality of large micropores, composing the grating groove patterns. In this case, the definition of the effective groove width and the period of the grating groove patterns is similar to the effective groove width We5 and the period L5 of the grating groove patterns in the seventh embodiment. That is, the small micropore arranged between the micropore columns of the micropore group, which is composed of the large micropores, composing the grating groove patterns does not take into consideration.

In the aforementioned embodiments, "triangular" means not only a regular triangle but also other triangles in a broad sense.

What is claimed is:

1. A wave plate comprising:
a substrate; and
an aluminum oxide film formed on said substrate, the aluminum oxide film having linear grating groove patterns, wherein
the period L (μm) of said linear grating groove patterns, and the duty ratio De defined as a ratio of the substantial width of said aluminum oxide film between said grating groove patterns adjacent to each other to said period L (μm) are set at values within the first range specified by the following four formulas:

$L \leq 0.65$ $L \geq 2 \times 10^{-14} e^{31.263 De}$ $L \leq 6.0317 De^2 - 10.352 De + 5.0516$ $(De - 0.85)^2 / 0.44^2 + (L - 0.41)^2 / 0.39^2 \leq 1$.

2. The wave plate according to claim 1, wherein said period L (μm) and said duty ratio De within said first range are applied to light of at least the red and infrared wavelength regions.

3. The wave plate according to claim 1, wherein the period L (μm) and the duty ratio De of said linear grating groove patterns are further set at values within the second range specified by the following four formulas:

$De \geq 0.73$ $L \leq 0.4$ $L \geq 30.952 De^3 - 74.751 De^2 + 59.62 De - 15.328$ $L \leq 3.0776 De^2 - 5.1863 De + 2.5772$ 4. The wave plate according to claim 3, wherein said period L (μm) and said duty ratio De within said second range are applied to light of all the red, infrared and blue wavelength regions.

5. The wave plate according to claim 1, wherein said aluminum oxide film has a plurality of pores, and said plurality of pores are classified into a first pore with a diameter larger than a reference value and a second pore with a diameter not larger than said reference value when said reference value is defined as the value obtained by multiplying the largest diameter in said plurality of pores by 0.5, and the period L (μm) of said grating groove patterns is the period of the grating groove patterns composed of a plurality of said first pores.

6. The wave plate according to claim 5, wherein the grating groove patterns composed of said plurality of first pores are composed of pore groups including a plurality of pore columns with said plurality of first pores and being spaced at a predetermined interval from each other, and said period L (μm) of the grating groove patterns is a mean value of the distance between lines tangent to the outermost ends on one side of said pore groups adjacent to each other.

7. A wave plate comprising:
a substrate; and
an aluminum oxide film formed on said substrate, the aluminum oxide film having linear grating groove patterns with a plurality of connected pores or grating pore patterns with a plurality of pores spaced at a predetermined interval from each other, wherein
said plurality of pores composing said grating groove patterns or said grating pore patterns included in said aluminum oxide film are arranged in columns and composes pore columns so that said pores adjacent to each other are spaced at a center-to-center distance of a pore interval T (μm) in a first direction from each other, and a plurality of said pore columns are arranged with a period L (μm) that is larger than said pore interval T (μm) in a second direction perpendicular to said first direction, and
said period L (μm) and said pore interval T (μm) are set at values within the first range specified by the following two formulas:

$L \leq 0.65$ $L \geq -1.2018 T^3 + 0.3022 T^2 + 1.2988 T + 0.01$

8. The wave plate according to claim 7, wherein said period L (μm) and said pore interval T (pm) within said first range are applied to light of at least the red and infrared wavelength regions.

9. The wave plate according to claim 7, wherein said period L (μm) and said pore interval T (μm) are further set at values within the second range specified by the following three formulas:

$L \leq 0.4$ $L \geq -440.16 T^3 + 63.334 T^2 - 3.4273 T + 0.3439$ $L \geq -0.35(T - 0.0825)^{0.434} + 0.245$ 10. The wave plate according to claim 9, wherein said period L (μm) and said pore interval T (μm) within said second range are applied to light of all the red, infrared and blue wavelength regions.

11. The wave plate according to claim 7, wherein said plurality of pores are classified into a first pore with a diameter larger than a reference value and a second pore with a diameter not larger than said reference value when said reference value is defined as the value obtained by multiplying the largest diameter in said plurality of pores by 0.5, and the period L (μm) of said grating groove patterns or said grating pore patterns is the period of the grating groove patterns composed of the plurality of said first pores or the grating pore patterns composed of said plurality of first pores.

12. The wave plate according to claim 11, wherein the grating groove patterns composed of said plurality of first pores or the grating pore patterns composed of said plurality of first pores are composed of pore groups including a plurality of pore columns with said plurality of first pores and being spaced at a predetermined interval from each other, and the period L (μm) of said grating groove patterns or said grating pore patterns is a mean value of the distance between lines tangent to the outermost ends on one side of said pore groups adjacent to each other.

13. An optical device comprising:
a light source having a plurality of wavelength regions; and
a wave plate for producing a predetermined phase difference between two polarization components perpendicular to each other of light from said light source, the wave plate including a substrate and a metal oxide film, which includes an aluminum oxide film, that is formed on said substrate and has a linear grating groove patterns with birefringence property or a grating pore patterns with birefringence property, wherein said metal oxide film includes an aluminum oxide film having the linear grating groove patterns, and the period L (μm) of said linear grating groove patterns, and the duty ratio be defined as a ratio of the substantial width of said aluminum oxide film between said grating groove patterns adjacent to each other to said period L (μm) are set at values within the first range specified by the following four formulas:

$L \leq 0.65$ $L \geq 2 \times 10^{-14} e^{31.263 De}$ $L \geq 6.0317 De^2 - 10.352 De + 5.0516$ $(De - 0.85)^2 / 0.44^2 + (L - 0.41)^2 / 0.39^2 \leq 1$.

14. The optical device according to claim 13, wherein said wave plate having said period L (μm) and said duty ratio be within said first range is used for light of at least the red and infrared wavelength regions.

15. The optical device according to claim 13, wherein the period L (μm) and the duty ratio De of said linear grating groove patterns are further set at values within the second range specified by the following four formulas:

$De \geq 0.73$ $L \leq 0.4$ $L \geq 30.952 De^3 - 74.751 De^2 + 59.62 De - 15.328$ $L \leq 3.0776 De^2 - 5.1863 De 2.5772$ 16. The optical device according to claim 15, wherein said wave plate having said period L (μm) and said duty ratio De within said second range is used for light of all the red, infrared and blue wavelength regions.

17. An optical device comprising:
a light source having a plurality of wavelength regions; and
a wave plate for producing a predetermined phase difference between two polarization components perpendicular to each other of light from said light source, the wave plate including a substrate and a metal oxide film, which includes an aluminum oxide film, that is formed on said substrate and has a linear grating groove patterns with birefringence property or a grating pore patterns with birefringence property, wherein said metal oxide film includes an aluminum oxide film having said linear grating groove patterns with a plurality of connected pores or said grating pore patterns with a plurality of pores spaced at a predetermined interval from each other, and said plurality of pores composing said grating groove patterns or said grating pore patterns included in said aluminum oxide film are arranged in columns and composes pore columns so that said pores adjacent to each other are spaced at a center-to-center distance of a pore interval T (μm) in a first direction from each other, and a plurality of said pore columns are arranged with a period L (μm) that is larger than said pore interval T (μm) in a second direction perpendicular to said first direction, and said period L (μm) and said pore interval T (μm) are set at values within the first range specified by the following two formulas:

$L \leq 0.65$ $L \geq -1.2018 T^3 + 0.3022 T^2 + 1.2988 T + 0.01$

18. The optical device according to claim 17, wherein said wave plate having said period L (μm) and said pore interval T (μm) within said first range is used for light of at least the red and infrared wavelength regions.

19. The optical device according to claim 17, wherein said period L (μm) and said pore interval T (μm) are further set at values within the second range specified by the following three formulas:

$L \leq 0.4$ $L \geq -440.16 T^3 + 63.334 T^2 - 3.4273 T + 0.3439$ $L \leq 0.35 (T - 0.0825)^{0.434} + 0.245$ 20. The optical device according to claim 19, wherein said wave plate having said period L (μm) and said pore interval T (μm) within said second range is used for light of all the red, infrared and blue wavelength regions.

* * * * *